(12) United States Patent
Van Horn et al.

(10) Patent No.: US 7,480,627 B1
(45) Date of Patent: Jan. 20, 2009

(54) SYSTEM AND METHOD FOR EXTENSION OF GROUP BUYING THROUGHOUT THE INTERNET

(75) Inventors: Tom Van Horn, Bellevue, WA (US); Richard V. Halbert, Redmond, WA (US); Dale A. Woodford, Redmond, WA (US)

(73) Assignee: Vulcan Portals, Inc., Seattle, WA (US)

( * ) Notice: Subject to any disclaimer, the term of this patent is extended or adjusted under 35 U.S.C. 154(b) by 62 days.

(21) Appl. No.: 09/686,778

(22) Filed: Oct. 10, 2000

Related U.S. Application Data

(63) Continuation-in-part of application No. 09/409,237, filed on Sep. 30, 1999, now Pat. No. 6,934,690.

(60) Provisional application No. 60/142,471, filed on Jul. 6, 1999.

(51) Int. Cl.
*G06Q 30/00* (2006.01)

(52) U.S. Cl. .............................. 705/26; 705/27; 705/28; 705/14; 705/400; 715/205

(58) Field of Classification Search ................... 705/25, 705/26–27, 14, 28, 400; 715/205
See application file for complete search history.

(56) References Cited

U.S. PATENT DOCUMENTS

| | | | | |
|---|---|---|---|---|
| 3,581,072 | A | 5/1971 | Nymeyer | 235/152 |
| 4,567,359 | A | 1/1986 | Lockwood | 235/381 |
| 4,789,928 | A | 12/1988 | Fujisaki | 364/401 |
| 4,949,248 | A | 8/1990 | Caro | 364/200 |
| 5,148,365 | A | 9/1992 | Dembo | 364/402 |
| 5,255,184 | A | 10/1993 | Hornick et al. | 364/407 |

(Continued)

FOREIGN PATENT DOCUMENTS

WO   WO 00/11570   3/2000

(Continued)

OTHER PUBLICATIONS

U.S. Appl. No. 09/233,274, Leibzon, et al., filed Jan. 19, 1999.

(Continued)

*Primary Examiner*—Yogesh C Garg
(74) *Attorney, Agent, or Firm*—Fenwick & West LLP

(57) ABSTRACT

A method and system are provided that enable partner sites to join in the sale of products/services via an on-line group-buying sale business method. A seller registers a list of products/services to be displayed on partner sites. Customers/visitors who access partner sites may link to one or more on-line group-buying sales conducted on an owner's main site. Accordingly, the method and system enable a super demand aggregation for products/services offered for sale by the on-line group-buying sale business method. The invention provides a partner menu tree that allows partners to pre-select products/categories for display to customers linking to the on-line group-buying sale from their partner site. Sellers may provide particular products, services, categories, and abstract terms to help partners select which products/services to display for customers from among all the on-line group-buying sale products/services. The invention has applicability to sales paradigms other than the on-line group-buying sale business method.

18 Claims, 47 Drawing Sheets

U.S. PATENT DOCUMENTS

| | | | |
|---|---|---|---|
| 5,270,921 A | 12/1993 | Hornick | 364/407 |
| 5,377,095 A | 12/1994 | Maeda et al. | 364/401 |
| 5,394,324 A | 2/1995 | Clearwater | |
| 5,576,951 A | 11/1996 | Lockwood | 395/227 |
| 5,640,569 A | 6/1997 | Miller et al. | 395/729 |
| 5,712,985 A | 1/1998 | Lee et al. | 395/207 |
| 5,724,521 A | 3/1998 | Dedrick | 395/226 |
| 5,727,165 A | 3/1998 | Ordish et al. | 395/237 |
| 5,729,700 A | 3/1998 | Melnikoff | 395/236 |
| 5,745,882 A | 4/1998 | Bixler et al. | 705/26 |
| 5,758,327 A | 5/1998 | Gardner et al. | 395/226 |
| 5,758,328 A | 5/1998 | Giovannoli | 395/201.226 |
| 5,765,143 A | 6/1998 | Sheldon et al. | 705/28 |
| 5,794,207 A | 8/1998 | Walker et al. | 705/23 |
| 5,794,219 A | 8/1998 | Brown | 705/37 |
| 5,797,127 A | 8/1998 | Walker et al. | 705/5 |
| 5,799,284 A | 8/1998 | Bourquin | 705/26 |
| 5,806,047 A | 9/1998 | Hackel et al. | 705/36 |
| 5,809,144 A | 9/1998 | Sirbu et al. | 380/25 |
| 5,818,914 A | 10/1998 | Fujisaki | 379/93.12 |
| 5,826,244 A | 10/1998 | Hubermann | 705/26 |
| 5,832,459 A | 11/1998 | Cameron et al. | 705/26 |
| 5,835,896 A | 11/1998 | Fisher et al. | 705/37 |
| 5,842,178 A | 11/1998 | Giovannoli | 705/26 |
| 5,845,265 A | 12/1998 | Woolston | 705/37 |
| 5,845,266 A | 12/1998 | Lupien et al. | 705/37 |
| 5,873,069 A | 2/1999 | Reuhl et al. | |
| 5,890,137 A | 3/1999 | Koreeda | 705/26 |
| 5,890,138 A | 3/1999 | Godin et al. | 705/26 |
| 5,895,454 A | 4/1999 | Harrington | 705/26 |
| 5,897,639 A | 4/1999 | Greef et al. | 707/103 |
| 5,913,210 A | 6/1999 | Call | 707/4 |
| 5,915,209 A | 6/1999 | Lawrence | 455/31.2 |
| 5,933,811 A | 8/1999 | Angles et al. | |
| 5,950,176 A | 9/1999 | Keiser et al. | 705/37 |
| 5,956,709 A | 9/1999 | Xue | 707/3 |
| 5,970,472 A * | 10/1999 | Allsop et al. | 705/26 |
| 5,970,475 A | 10/1999 | Barnes et al. | |
| 5,983,199 A | 11/1999 | Kaneko | 705/26 |
| 5,991,740 A | 11/1999 | Messer | |
| 5,999,914 A | 12/1999 | Blinn et al. | |
| 6,014,644 A | 1/2000 | Erickson | 705/37 |
| 6,021,398 A | 2/2000 | Ausubel | |
| 6,026,383 A | 2/2000 | Ausubel | |
| 6,032,125 A | 2/2000 | Ando | |
| 6,035,288 A | 3/2000 | Solomon | 705/37 |
| 6,041,308 A | 3/2000 | Walker et al. | |
| 6,049,774 A | 4/2000 | Roy | |
| 6,055,504 A | 4/2000 | Chou et al. | 705/1 |
| 6,067,528 A | 5/2000 | Breed et al. | 705/26 |
| 6,076,070 A | 6/2000 | Stack | 705/37 |
| 6,078,897 A | 6/2000 | Rubin et al. | |
| 6,081,789 A | 6/2000 | Purcell | 705/37 |
| 6,085,169 A | 7/2000 | Walker et al. | |
| 6,101,484 A | 8/2000 | Halbert et al. | |
| 6,112,189 A | 8/2000 | Rickard et al. | 705/37 |
| 6,119,101 A | 9/2000 | Peckover | 705/26 |
| 6,141,653 A | 10/2000 | Conklin et al. | |
| 6,141,666 A | 10/2000 | Tobin | |
| 6,192,382 B1 * | 2/2001 | Lafer et al. | 715/205 |
| 6,260,024 B1 * | 7/2001 | Shkedy | 705/37 |
| 6,269,343 B1 * | 7/2001 | Pallakoff | 705/26 |
| 6,324,522 B2 | 11/2001 | Peterson et al. | |
| 6,332,129 B1 | 12/2001 | Walker et al. | |
| 6,418,415 B1 | 7/2002 | Walker et al. | |
| 6,473,740 B2 | 10/2002 | Cockrill et al. | |
| 6,516,302 B1 | 2/2003 | Deaton et al. | |
| 6,584,451 B1 | 6/2003 | Shoham et al. | |
| 6,604,089 B1 * | 8/2003 | Van Horn et al. | 705/26 |
| 6,629,135 B1 * | 9/2003 | Ross et al. | 709/218 |
| 6,631,356 B1 * | 10/2003 | Van Horn et al. | 705/26 |
| 6,876,983 B1 * | 4/2005 | Goddard | 705/37 |

FOREIGN PATENT DOCUMENTS

| | | |
|---|---|---|
| WO | WO 00/30004 | 5/2000 |
| WO | WO 00/30005 | 5/2000 |
| WO | WO 00/34841 | 6/2000 |
| WO | WO 00/34842 | 6/2000 |
| WO | WO 00/34843 | 6/2000 |
| WO | WO 00/34886 | 6/2000 |
| WO | WO 00/43928 | 7/2000 |
| WO | WO 00/43929 | 7/2000 |
| WO | WO 00/43938 | 7/2000 |
| WO | WO 00/45318 | 8/2000 |
| WO | WO 00/48104 | 8/2000 |
| WO | WO 00/59224 | 10/2000 |

OTHER PUBLICATIONS

U.S. Appl. No. 09/249,727, Ehrlich, et al., filed Feb. 13, 1999.
U.S. Appl. No. 09/250,039, Grossman, filed Feb. 12, 1999.
U.S. Appl. No. 09/348,812, Reddi, filed Jul. 7, 1999.
U.S. Appl. No. 60/097,932, Pallakoff, filed Aug. 25, 1998.
U.S. Appl. No. 60/097,933, Pallakoff, filed Aug. 25, 1998.
U.S. Appl. No. 60/116,729, Reddi, filed Jan. 22, 1999.
U.S. Appl. No. 60/118,189, Ehrlich, et al., filed Feb. 1, 1999.
Search Report dated Aug. 24, 1999 for U.S. Appl. No. 09/270,219.
Search Report dated Sep. 8, 1999 for U.S. Appl. No. 09/281,859.
Search Report dated Nov. 22, 1999 for U.S. Appl. No. 09/409,237.
Search Report dated Sep. 21, 2000 for U.S. Appl. No. 09/596,921.
Dialog, The Gale Group Newsletter, "New Twist to Online Shopping: Service Hopes to Break Customer Apathy," InternetWeek, 1(7), May 22, 1995.
Dialog, The Gale Group Newsletter, "In Year 2020, Auctions and Agents to Rule Web," Newsbytes, Mar. 23, 1998.
Dialog, "New Tricks in Pet Supplies" by Minkoff, J., Discount Merchandiser, 34 (12) 70-72, 1994.
Online Document from Software Patent Institute Database of Software Technology, http://m.spi.org/, Record 1: "Management Data Processing," Ser. No. acmr6512.0039, Printed Sep. 20, 1999.
Online Document from Software Patent Institute Database of Software Technology, http://m.spi.org/, Record 2: "Management Science," Ser. No. ACMGCL89.1066, Printed Sep. 20, 1999.
Online Document from Software Patent Institute Database of Software Technology, http://m.spi.org/, Record 17: "Distribution Resource Planning," Ser. No. HPAPPS.2620, Printed Sep. 20, 1999.
Online Document from IBM Intellectual Property Network, http://www.patents.ibm.com/, Titled: Personalized Optimized Decision/Transaction Program, Jan. 1995, Reprinted Nov. 24, 1999.
Online Document from Agorics, Inc., http://www.agorics.com/, Sections: "A Survey of Auctions," "English Auction," "A Dutch Auction," "The First Price Auction," "The Vickrey Auction," "The Double Auction," "Auction Offshoots," "Auction Strategies," "Auction Histories," "Government Securities—Auctioned Off," "Collusion in Auctions," "Auction Bibliography," Dated 1996, Reprinted Oct. 25, 1999.
Online Document from Forbes.com, http://www.forbes.com, Forbes Global, Computer Science Section of Dec. 28, 1998, "Coming Soon—Cyber Co-ops" by Karlgaard, Printed Nov. 16, 1999.
Management and Specialist Team, LetsBuyIt.com, http://www.euroferret.com, Jan. 15, 1999; Online Document, http://www.alumni.se/e-commerce/default.htm, Jan. 15, 1999, Printed Nov. 19, 1999.
Online Document from Bid.com, http://www.bid.com/dutch, Printed Sep. 3, 1999.
Online Document from Bullnet Online Auctions, http://www.bullnet.com.uk/auctions/info.htm, Printed Sep. 3, 1999.
Online Document from Who's Who for The Commerce Standard, http://www.gii.com/standard/who/index.html. Printed Nov. 19, 1999.
Online Document from Cooperative Educational Service Agency, http://www.cesa5.k12.wi.us/buying.htm, Printed Sep. 20, 1999.
Online Document from Franklin Regional Council Governments, http://www.frcog.or/purch.html, Printed Sep. 20, 1999.

Online Document from Klik-Klok Online Dutch Auction, http://www.klik-klok.com/how.htm, Printed Sep. 3, 1999.
Online Document, ComputerSweden, "Icon-grundare satsar närmare halv miljard på e-handel," http://nyheter.idg.se, Jan. 23, 1999 (w/English translation).
Online Document from Artiklar från AffärsData ("Resumé"), http://www.ad.se, Feb. 25, 1999 (w/ English translation).
Online Document from ComputerSweden, "Lke;; Spångberg. . . ," http://nyheter,idg.se, Mar. 3, 1999.
Online Document from Accompany: About Team, http://www.ac-company.com/about_press_faq.asp , Printed Mar. 3, 1999.
Online Document from Accompany: About US, http://www.accompany.com/about_press_0.asp, Printed Mar. 3, 1999.
Online Document from Accompany: About Team, http://www.ac-company.com/about_team.asp, Printed Mar. 3, 1999.
Online Document from Accompany: About Team Advisors, http://www.accompany.com/about_team_advisors.asp, Printed Mar. 3, 1999.
Online Document from Accompany: About Team, http://www.ac-company.com/about_press_analyst.asp, Printed Mar. 3, 1999.
Online Document from Accompany: About Team Advisors, http://www.accompany.com/about_teampartnes.asp, Printed Mar. 3, 1999.
Online Document from Accompany: Contact, http://www.accompany.com/about_contact.asp, Printed Mar. 3, 1999.
Online Document from Ask Reggie Domain Search, Accompany.com Domain contacts, http://www.askreggie.com, Printed Mar. 3, 1999.
Online Document from Accompany: About US, http://www.accompany.com/about_press_background.asp, Printed Mar. 3, 1999.
Online Document from ZDNN, http://www.zdnet.com/stories/news, Printed Mar. 3, 1999.
NewsAlert, "Accompany, Inc. to Revolutionize Commerce; Buys Come Together for Best Value," http://www.accompany.com, Printed Mar. 3, 1999.
Online Document from Yahoo, "Web startup pushes volume shopping," http://dailynews.yahoo.com, Printed Mar. 4, 1999.
Internet World (Mecklermedia), Cliff Figallo, "Hosting Web Communities," Building Relationships, Increasing Customer Loyality, and Maintaining a Competitive Edge.Published by John Wiley & Sons, Inc., Copyright 1998.
Abstract, World Reporter, Dagens Industri, "Expected success for internet shopping," WL 5900897, Mar. 12, 1999.
Article from Sportfack, "Letsbuyit.com Kommer," Feb. 12, 1999. (w/English translation).
IBM Technical Disclosure Bulletin, "Multi-Product Delivery System Optimization Procedure," 38(4) :502-503, Apr. 1995.
Kroll et al., "World Weary Web," Forbes, Dec. 28, 1998, pp. 98-100.
Pant et al., "Business on the Web: Strategies and Economics," Fifth International WWW Conference, May 6-10, 1996, Paris, France.
Rockoff et al., "Design of an Internet-based System for Remote Dutch Auctions," *Internet Research: Electronic Networking Applications and Policy,* 5(4) :10-16, 1995.
Stang et al., "Scans" Section, *Wired,* Sep. 1995, pp. 51, 54, 56, and 58.
Woolley, "Price War!," *Forbes,* Dec. 14, 1998, pp. 182-184.
Online Document from OCM, http://www.cynric.org/OCM/administration/management/services/coop.html, Printed Sep. 20, 1999.
Online Document from Dagens Industri, "Rush into Net-shopping," http://www.di.se/Scripts/, Document dated Mar. 12, 1999, Printed Jan. 19, 2000 (with English Translation).
Online Document, "US-IL-Chicago-Cargo Revenue Management Analyst," "US-IL-Chicago—Revenue Manager," "US-IN-Indianapolis—Yield Analyst," "US-CA-San Jose—Financial Analyst," http://jobsearch.monster.com, Printed Mar. 24, 1999.
Online Document from hotjobs.com, "Filenet Corporation," http://www.hotjobs.com, Printed Mar. 24, 1999.
Online Document from The Revenue Management Home Page, "Revenue Management Defined," wysiwyg://212/http://www.geocities.com/WallStreet/Floor/4921/, Printed Mar. 18, 1999.
Online Document from The Revenue Management Home Page, "Articles on Revenue Management," wysiwyg://212/http://www.geocities.com/WallStreet/Floor/4921/articles.htm, Printed Mar. 18, 1999.
Online Document from The Revenue Management Home Page, "Companies Practicing Revenue Management," wysiwyg://212/http://www.geocities.com/WallStreet/Floor/4921/rmcomps.htm, Printed Mar. 18, 1999.
Online Document from Revenue Management Systems, Inc., "What is Revenue Management?" http://www.revenuemanagement.com/whatisrm.htm, Printed Mar. 19, 1999.
Online Document from profitoptim.com, "Definition of Revenue Management," http://www.profitoptim.com/papersdirectory/rmdaybrief/sld063.htm, Printed Mar. 19, 1999.
Online Document from profitoptim.com, "What is Revenue Management (cont.)?" http://www.profitoptim.com/papersdirectory/resexpo97/sld006.htm, Printed Mar. 19, 1999.
Online Document from American Way, "How Airline Pricing Works," http://www.aa.com/away/Vantage/Vantage-may98.htm, Printed Mar. 18, 1999.
Online Document from Airline Discount, http://faculty.darden.edu/pfeiferp/airline.htm, Printed Mar. 18, 1999.
Online Document from The Innovation Network, "1994 Innovation Collection," http://198.49.220.47/texis/si/sc/i...e/+KoeMUi3WwBme+It0x0www/full.html, Printed Mar. 19, 1999.
Online Article by W. Lieberman of Veritec Solutions, Inc., "Yield Management: System or Program?" http://www.veritecsolutions.com, Site visited on Mar. 19, 1999.
Online Article by W. Lieberman of Veritec Solutions, Inc., "Making Yield Management Work for You: Ten Steps to Enhanced Revenues," http://www.veritecsolutions.com, Site visited on Mar. 19, 1999.
Online Article by W. Lieberman of Veritec Solutions, Inc., "Debunking the Myths of Yield Management" http://www.veritecsolutions.com, Site visited on Mar. 19, 1999.
Online Document from StoreSearch Internet Shopping Guide, http://www.storesearch.com/, Site visited on Aug. 31, 1999.
Online Document from Netscape Netcenter, http://shop.netscape.com/auctions/main.adp, Site visited on Aug. 31, 1999.
Online Document from Yahoo! Auctions, http:auctions.yahoo.com/, Site visited on Aug. 31, 1999.
Online Document from Lycos: Sales & Specials, http://www.lycos.com/Shopping/sales_and_specoals/, Sited visited on Aug. 31, 1999.
Hutchinson "E-Commerce: Building a Model," Communications Week, pp. 57-60, Mar. 17, 1997.
M2 Communications, "Icentral Inc: Web Retailers Band Together to Build Traffic and Sales," M2 Presswire, Feb. 25, 1997.
Berryman et al., "Electronic commerce: Three Emerging Strategies," McKinsey Quarterly, No. 1, pp. 152-159, 1998.
"BuyItOnline Revolutionizes Internet Retailing for Small Business Merchants," Business Wire, Sep. 8, 1998.
Press Release from MobShop, formerly known as Accompany, Inc., obtained from the Internet at http://www.mobshop.com/press_release?release=20 on Apr. 10, 2000, which explains that Accompany, Inc. received a Notice of Allowance from the U.S. Patent and Trademark Office.
Press Release from iCoop, Inc. obtained from the Internet at http://www.icoop.com/press_pressrelease2.htm on Apr. 10, 2000, which explains that iCoop.com, Inc. has filed two patent applications and has provisional patent applications which were filed on Jan. 22, 1999.
Press Release from beMANY! obtained from the Internet at http://www.bemany.com/press02112000_bemany.html on Apr. 10, 2000, which explains that beMANY! has a "patent pending process."
Press Release from the company BazaarE.com obtained from the Internet at http://www.bazaare.com/pr_03111999.cfm?CFID=62916&CFTOKEN=75630214 on Apr. 10, 2000, which explains that BazaarE.com has a "patent-pending platform."
Bailey et al., "An Exploratory Study of the Emerging Role of Electronic Intermediaries," International Journal of Electronic Commerce, 1(3):7-20 (1997).
"Retail Federation Group Buying," HFD-The Weekly Home Furnishing Newspaper, v0, n0, p9, Dec. 26, 1994.
"Frontier Rings Up a Sale with National Retail Federation," PR Newswire, p119NYM057, Jan. 19, 1998.
"NRF: home page on World Wide Web (National Foundation Launches Site)," The Weekly Newspaper for the Home Furnishing Network, v70, N. 42, p. 10(1), Oct. 14, 1996.

"Retail Federation Group Buying Set," HFD—The Weekly Home Furnishings Newspaper, v68, n52, p. 9(1), Dec. 26, 1994.

"Mosher Views ARA as Survival Kit for Small Specialty Stores," Daily News Record, v24, n22, p. 4(1), Feb. 2, 1994.

"KMART Targets GE as EDI Provider Signals GE's Re-Commitment to EDI," EDI News, v11, n21, Oct. 13, 1997.

"National Retail Federation Selects GE Information Services for EDI Service Partnership," PR Newswire, p1006DCM009, Oct. 6, 1997.

Mielczarski, W.; Michalik, G.; Widjaja, M.; "Bidding strategies in electricity markets,"PIC Proceedings of the 21st 1999 IEEE International Conference, pp. 71-76, May 16-21, 1999, Cat.#99CH36351, 1999.

Online document from Savvio.com, "Savvio.com: Our Story," wysiwyg://8/http://www.savvio.com/about/aboutUs.jsp, Printed Sep. 28, 2000.

Online Document from MediaBuyingExchange.com, "On-line Media Negotiation Room Coming to Media Buying Exchange," http://www.mediabuyingexchange.com/negotiating.html, Visited Sep. 7, 2000.

Online document from MediaBuyingExchange.com, "This just in . . . ," http://www.mediabuyingexchange.com/index2.html, pp. 1-2, Visited Sep. 7, 2000.

Hagel III et al., "The new infomediaries," *The McKinsey Quarterly*, 1997 No. 4, pp. 54-71.

Negromante, Nicholas, "Psst? Transactions," Forbes, 80th Issue, Jul. 7, 1997.

Search Report (Ref.: COOL01-10024).

Online Document: Cooperative Purchasing, http://www.cynric.org/OCM/administration/management/services/coop.html, Printed Sep. 20, 1999.

U.S. Appl. No. 60/119,220 Filing Receipt and Specification, "A Method and Apparatus for Creating and Managing Groups for Increasing Buyer Power on the World Wide Web," Feb. 8, 1999.

US 6,000,826, 12/1999, Parunak et al. (withdrawn)

* cited by examiner

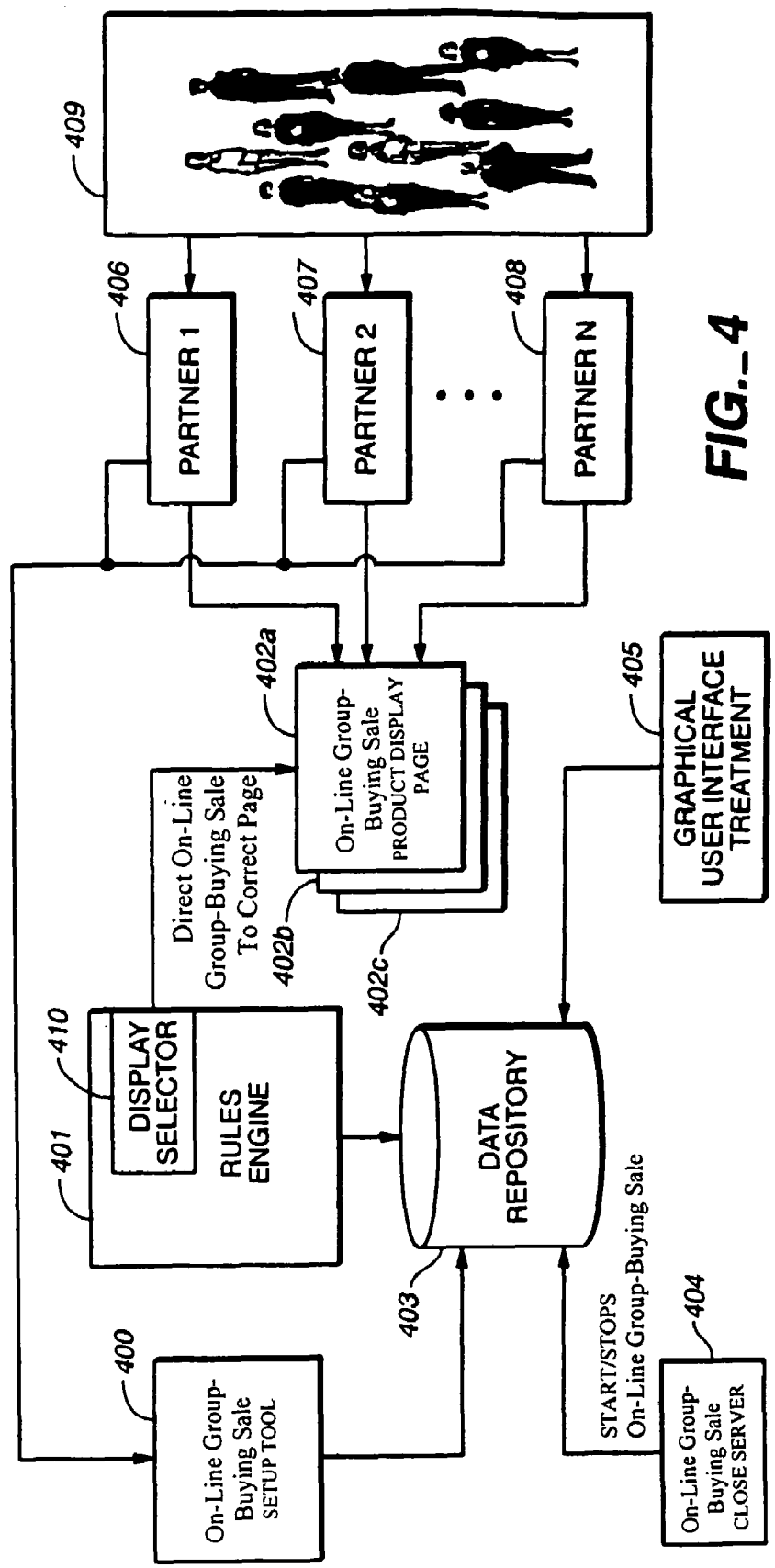
FIG._4

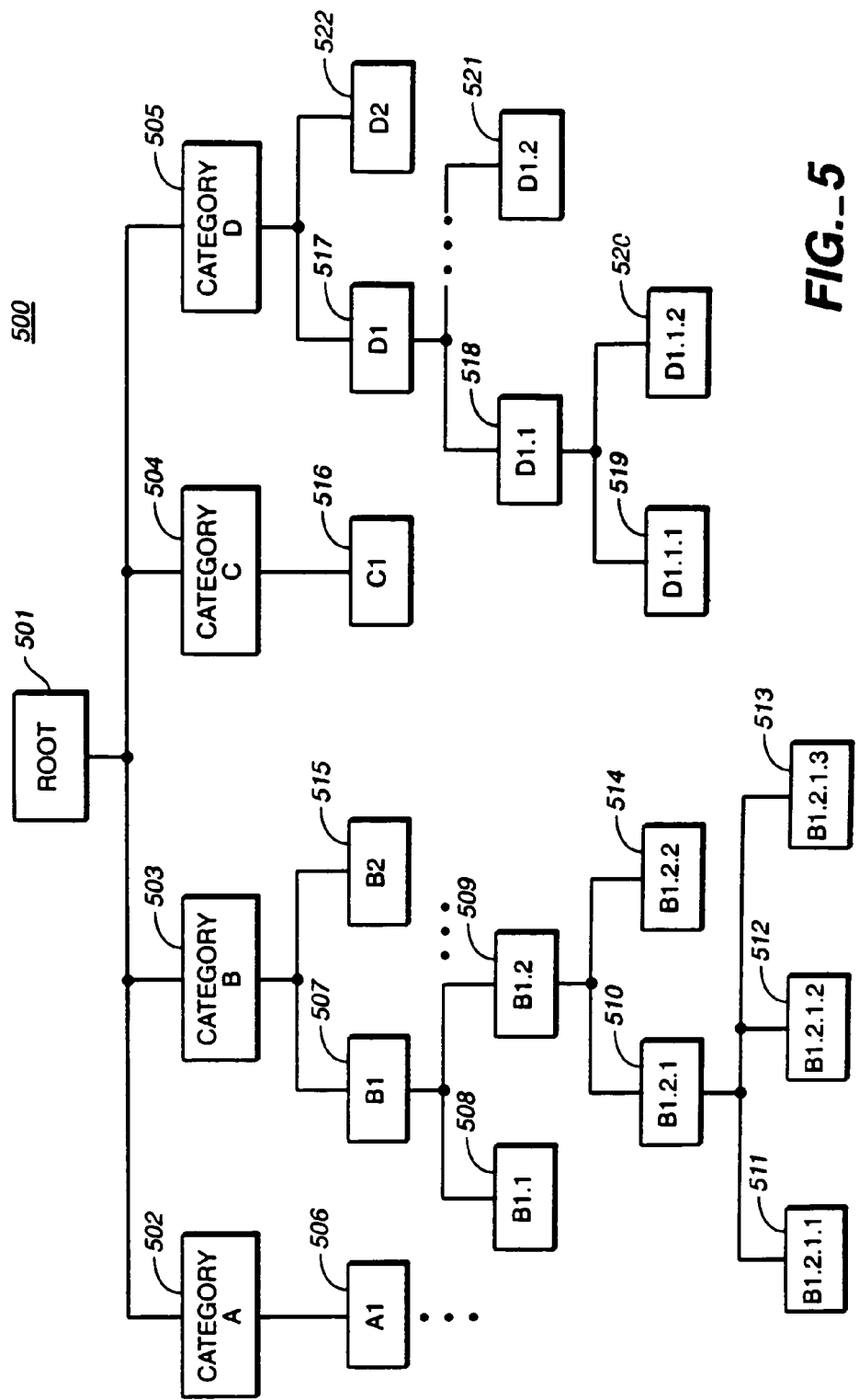
FIG._5

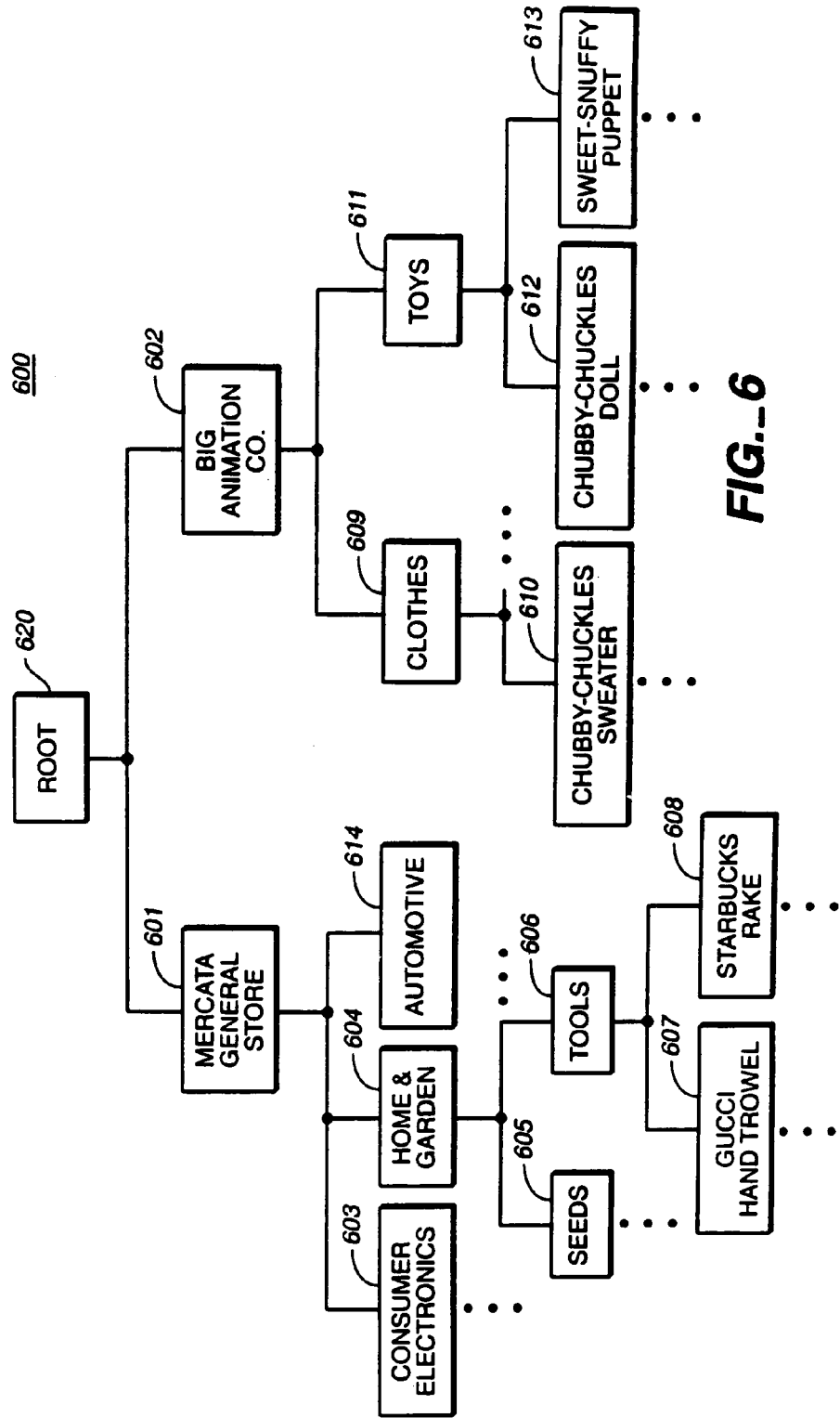
FIG._6

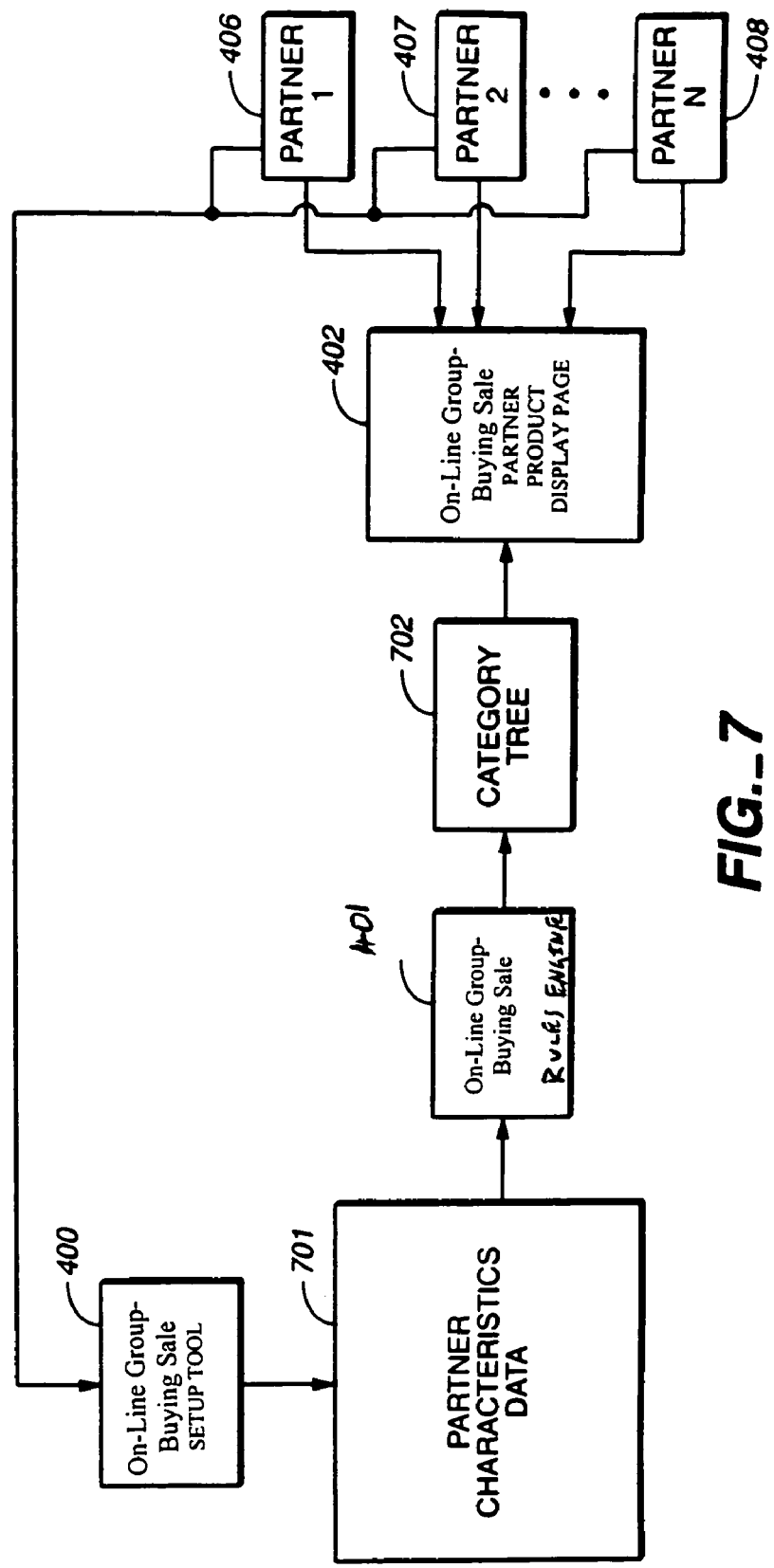
FIG._7

| NAME 801 | ADDRESS 802 |
|---|---|
| GOODS FOR SALE 803 | MAX. QUANTITY 804 |
| DESCRIPTION OF GOODS 805 ||
| INITIAL PRICE 806 | MINIMUM PRICE 807 |
| MIN. SALE QUANTITY 808 | ORDER QUANTITY LIMIT 809 |
| OFFER REJECT THRESHOLD 810 | PRICING SCHEME 811 |
| COST CURVE 812 | IGNORE SCHEME 813 / WINDOW PRICE 814 |
| BONUS PROGRAM - SELLER 815 | BONUS PROGRAM - BUYER 816 |
| PRODUCT DELIVERY INFORMATION 817 | ABSTRACT FOR PARTNER SITES 818 |
| SELLER SECURITY / CERTIFICATION DATA 819 ||

| TROOP 36 - BELLEVUE  901 | TROOP36@MSN.COM  902 |
|---|---|
| COOKIES  903 | 200 BOXES  904 |
| THIN MINT GIRL SCOUT COOKIES - PLEASE HELP OUR TROOP AND FIGHT MUSCULAR DYSTROPHY, TOO! WE DONATE $1 TO MS FOR EACH BOX SOLD.  905 ||
| $5.00  906 | $3.00  907 |
| NONE  908 | NONE  909 |
| $3.00  910 | PowerBuy™ AUTOMATIC  ( SHOW ME ) — 911a  911 |
| PowerBuy™ AUTOMATIC ( SHOW ME ) — 912a  912 | PowerBuy™ AUTOMATIC ( SHOW ME ) — 913a  913 · PowerBuy™ ( SHOW ME ) — 914a  914 |
| MERCATA BONUS BUCKS  915 | NONE  916 |
| SHIPPED VIA UPS AT 50¢ / BOX  917 | KING COUNTY; SNOHOMISH CO.; GIRL SCOUTS; CHARITY; YOUTH; FOOD;  918 |
| WELLS FARGO BANK; MS. BONNIE JONES  919 ||

FIG._9

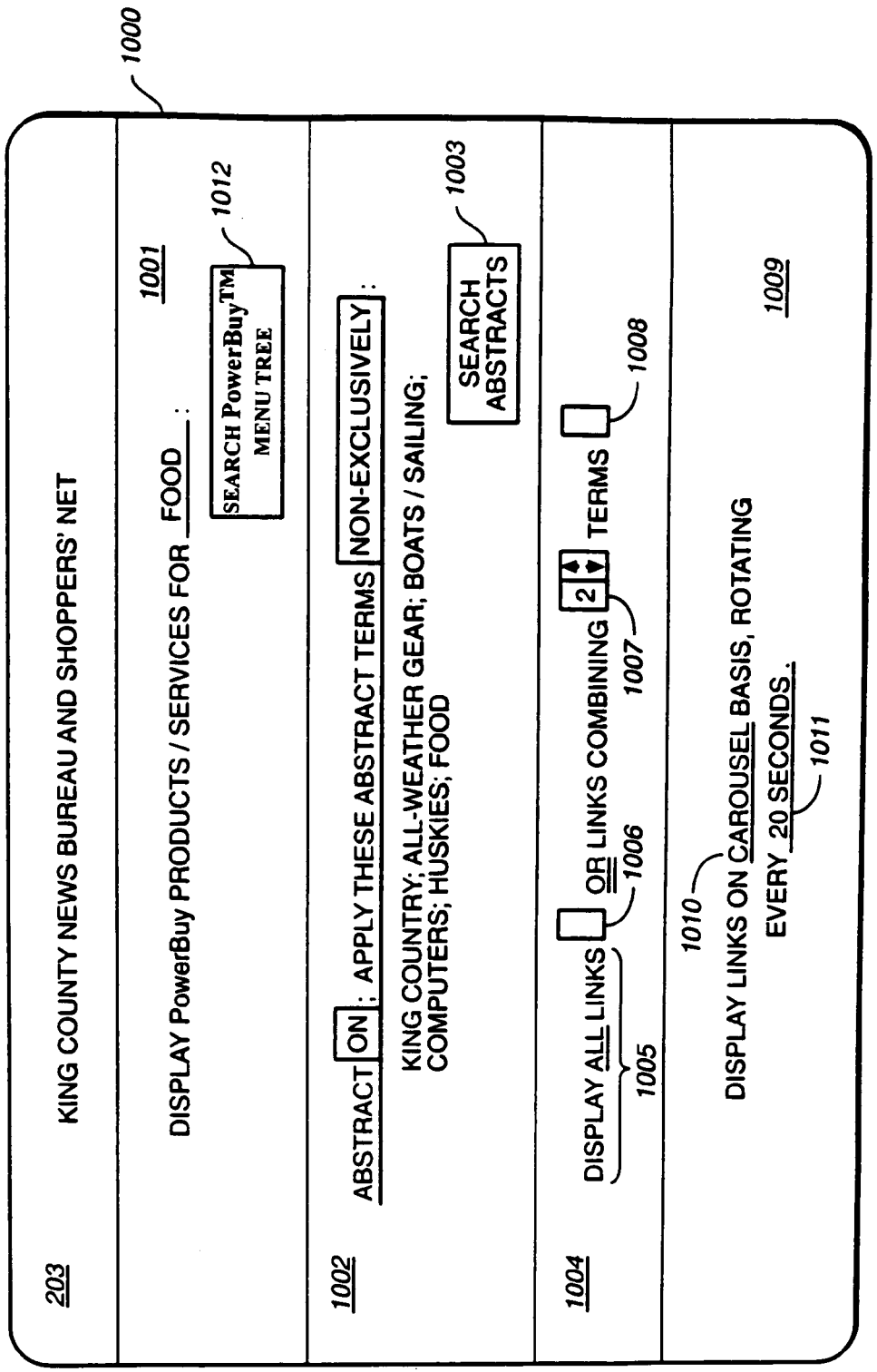
FIG._10

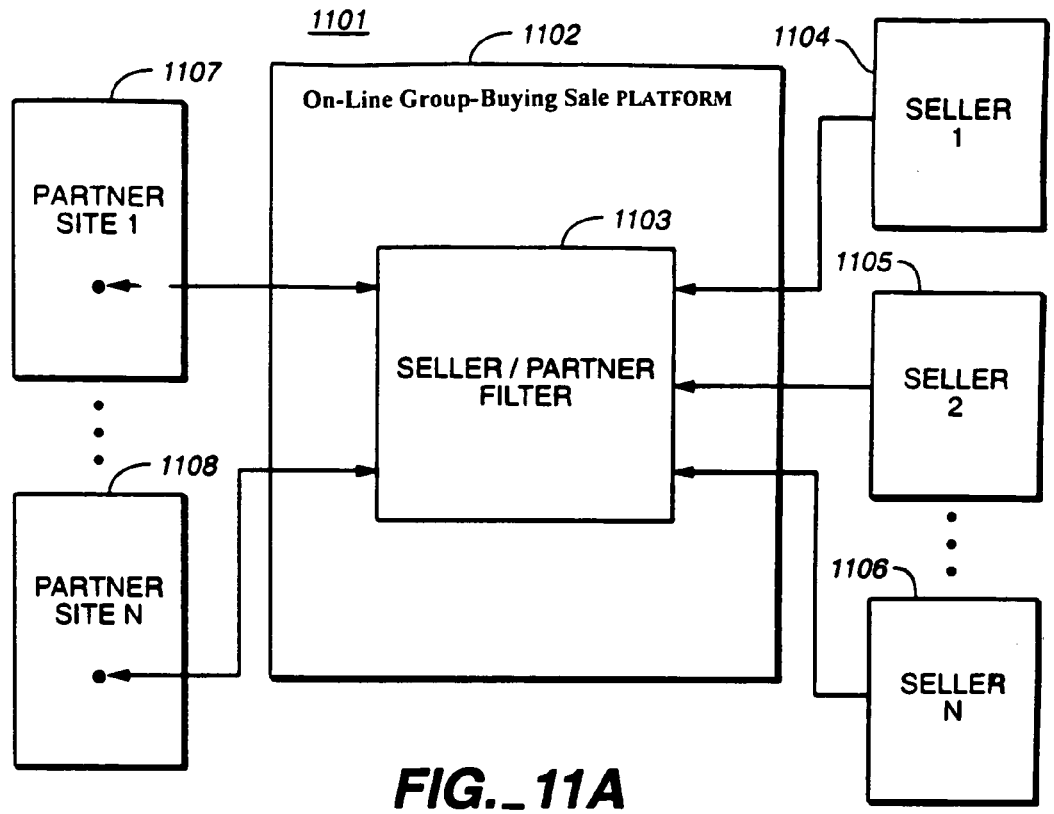
FIG._11A
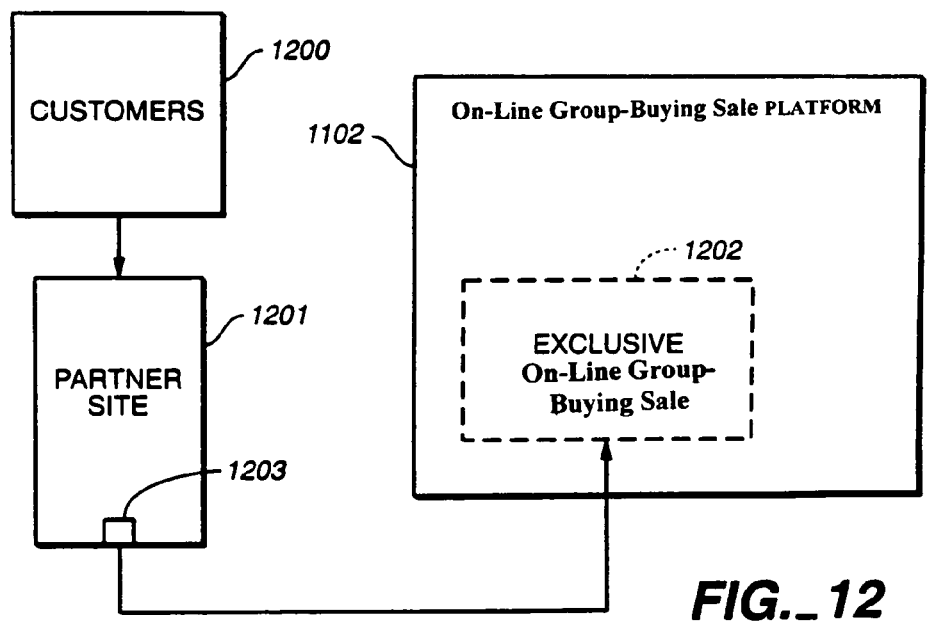
FIG._12

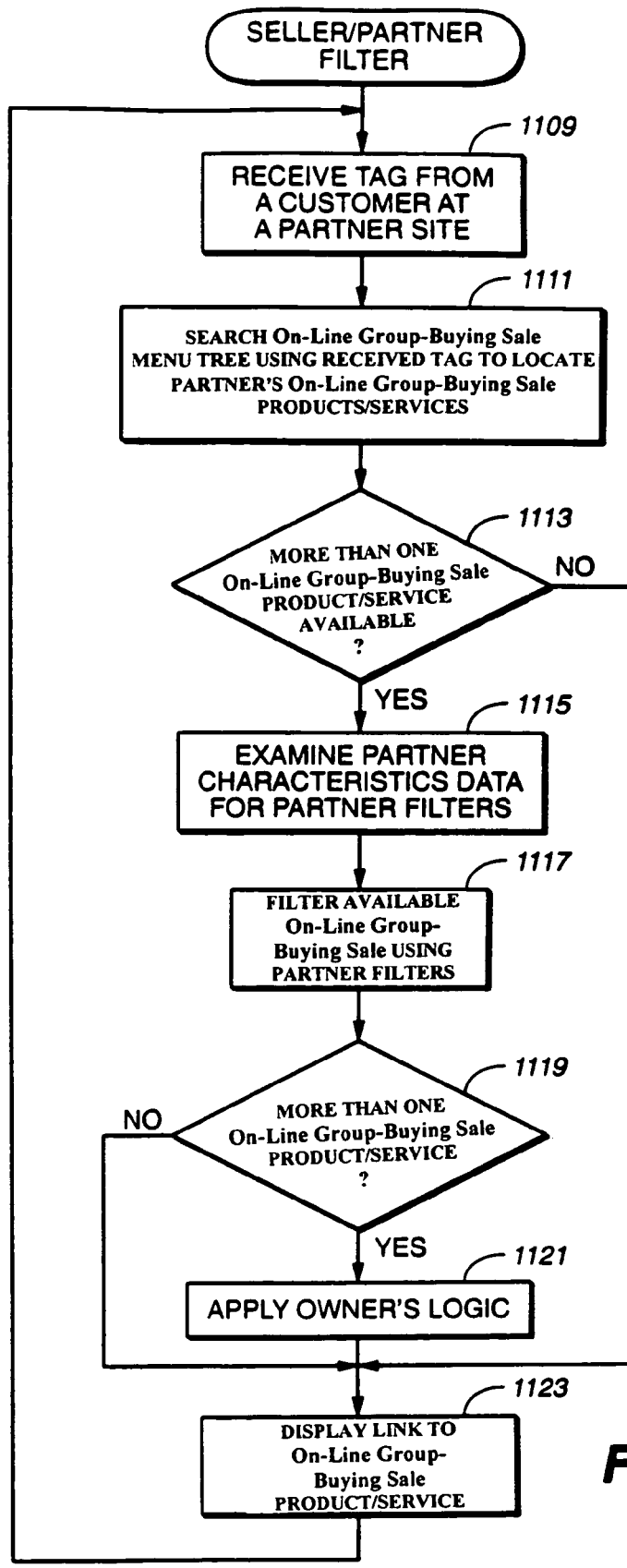
FIG._11B

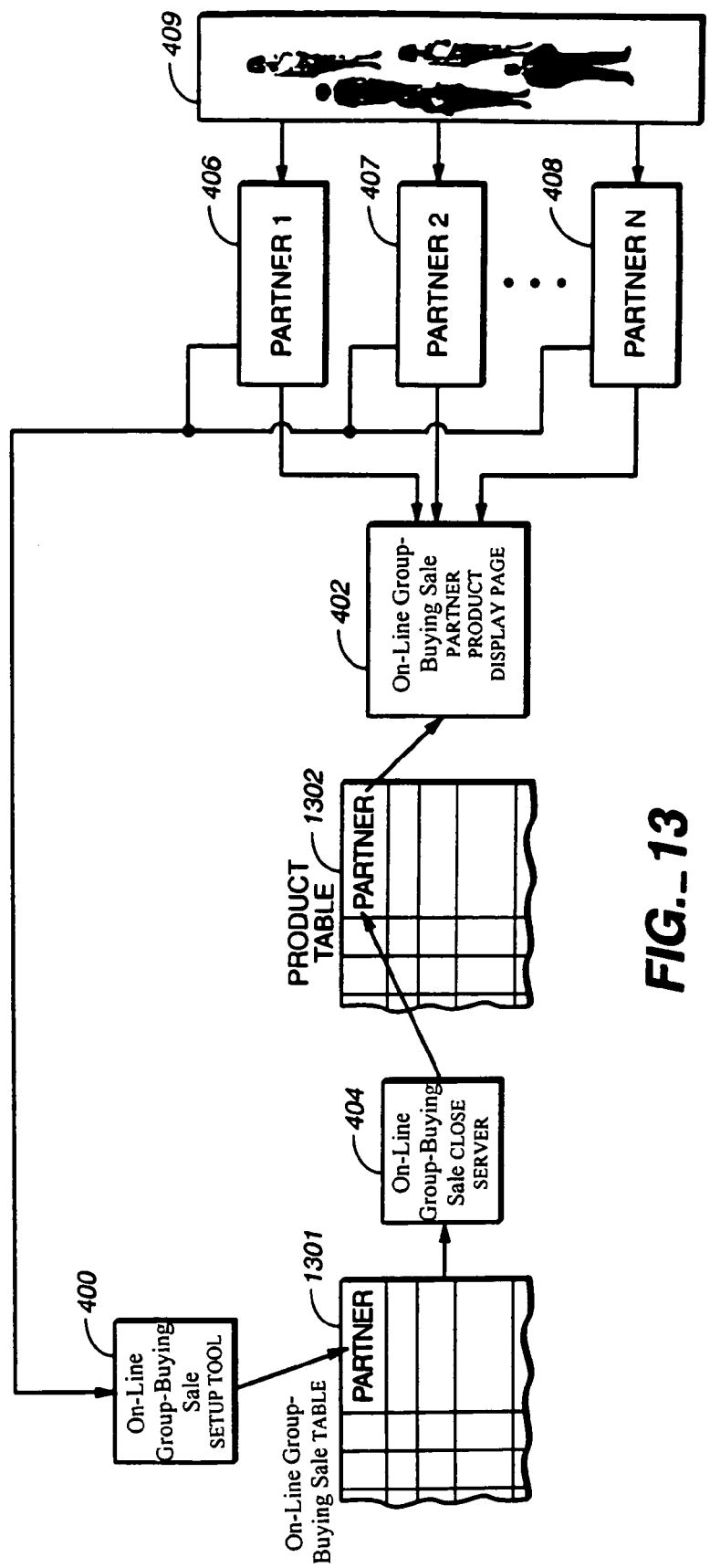
FIG._13

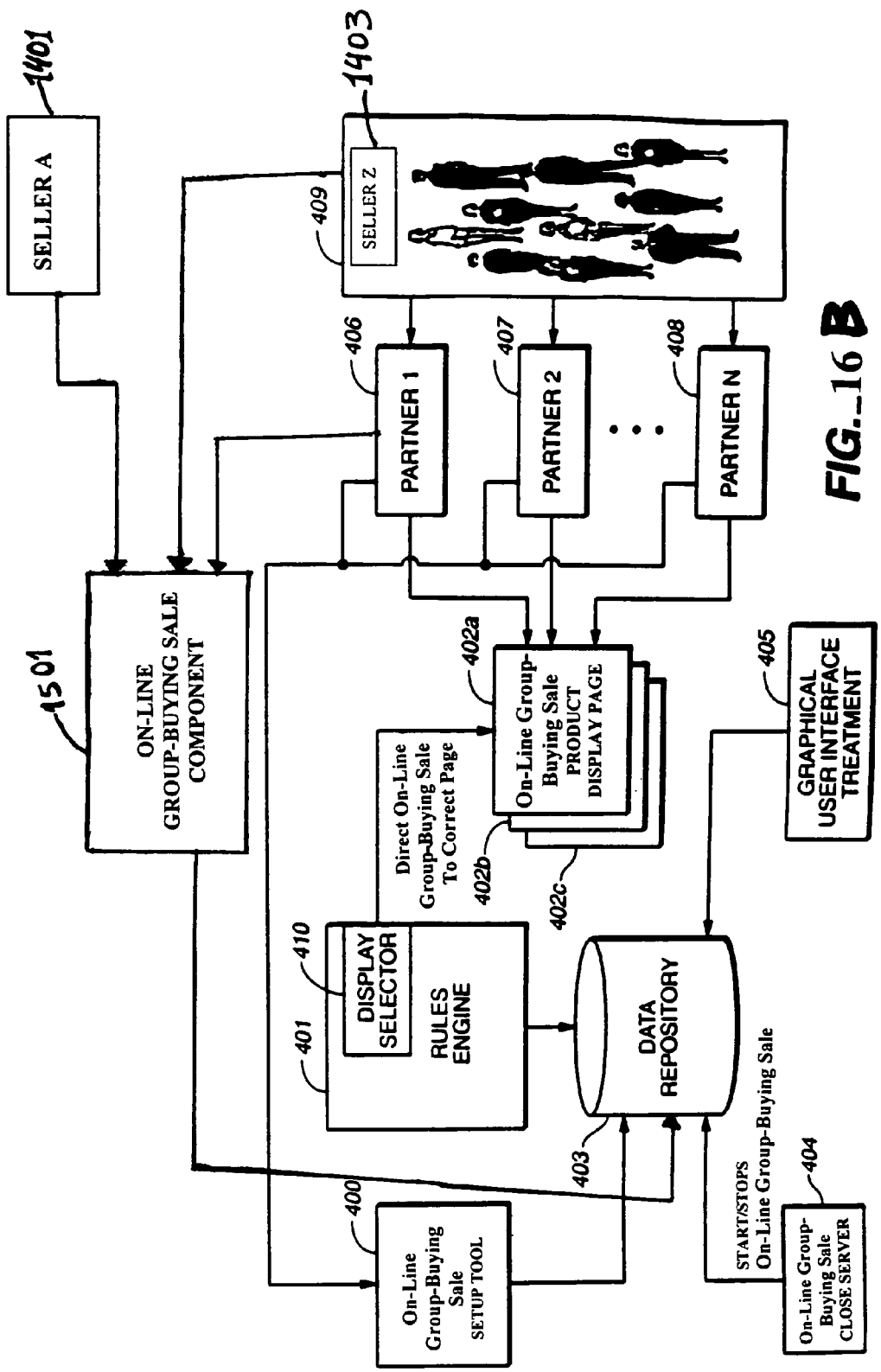
FIG._16 B

| TAHITI  |
| Project |

The more people who buy the lower the price.

| Buy at Mercata | Buy at Marketplace | Become a Seller |

Home | Home Map | Your Account | Seller Center | How It Works | Help
　　1801　　　1805　　　　1807　　　　　1809　　　　　1811　　1813

Seller Center

Selling in Mercata's self-service PowerBuy™ is fast, easy and fun - and it's way better than auctions!
If you already have a Mercata account (as a customer or seller), you can begin now by using these links to:

Set up items
View/edits items
Run a PowerBuy™
View/Edit Seller information

Dont' have an account? Create a new account now.

── 2601

The A-B-Cs of selling on Mercata's self-service PowerBuys™ Read Seller Intro.

Featured place-ments, bold titles and other merchandising tips help you make more $$. Read Seller Tips.

Many questions, many answers. Read Seller FAQs.

Your Recent Orders

Click on a Order # for order or offer details.

| Item | Seller | Date of Sale | Order Number | Shipping Status | |
|---|---|---|---|---|---|
| Aare Twin Minute Bed Portable Matress IGt.06721 | Mercata | 07/17/00 | N0264529 | Shipped-07/19/2000 UPS #17A9561803401441246 | $47.64 |
| Skyway "Kingston" Rolling Duffel, Midnight Teal | Mercata | 04/01/00 | N0178466 | Shipped-04/05/2000 UPS # 17096EDW0348152534 | $24.38 |
| English Heirloom 3-Piece Ergonomic Gardening Tool Set | Mercata | 02/18/00 | N0162357 | Shipped-02/23/2000 UPS #17A9851803600067021 | $9.97 |
| Motorola 14-channel TalkAbout 2-Way Radio (Anthracite), TALK250SA | Mercata | 02/1/00 | N0150877 | Shipped-02/15/2000 UPS #17223A8903400000003 | $162.74 |

Your Account History

Review all orders, including past purchases and Mercata spent and earned.

Seller Account Information
- View Current PowerBuys™
- View Futrue PowerBuys™
- View Closed PowerBuys™
- View Your Seller Account Balance
- Setup Items
- View/Edit Items
- Run a PowerBuy™
- View Seller Information

TAHITI Project

The more people who buy the lower the price.

| Buy at Mercata | Buy at Marketplace | Become a Seller |

1801 — Home | 1805 — Home Map | Your Account | 1807 — Seller Center | 1809 — How It Works | 1811 — Help — 1813

Seller Agreement

This is where the seller agreement goes.

List of all things must be agreed upon registering:

1. I am an adult... at least 18 years old.. etc
   ☐ I agree (required)
2. Mercata's Marketplace does not control the content.. etc.. etc..
   ☐ I agree (required)
3. I will not provide fraudulent... etc.. etc
   ☐ I agree (required)
4. I understand that this is a binding agreement... etc... etc
   ☐ I agree (required)

Help for Sellers
• Helpful material

TAHITI Project

Buy at Mercata | Buy at Marketplace | Become a Seller
 1801           1805              1807
Home | Home Map | Your Account | Seller Center | How It Works | Help
                                        1809         1811         1813

The more people who buy the lower the price.

These are your current default settings that will appear on your item's detail page.

Seller Information

Seller Name:
Seller Description:
Seller E-mail:

Shipping Options:

Return Policy:

Payment Methods Accepted:

Tax Collected In:

Customer Service Info:

Save changes

TAHITI Project

Buy at Mercata | Buy at Marketplace | Become a Seller
Home | Home Map | Your Account | Seller Center | How It Works | Help
1801　　1805　　1807　　1809　　1811　　1813

The more people who buy the lower the price.

3301

PowerBuy™ Pricing

Product Name:
Item Number: *
Quantity Available:
Beginning Price:
Price Floor:
Max. # of Units per buyer:

Start and End Times of PowerBuys™ are at 10PM PST

Starting Date: Today,.....  ▶
PowerBuy™ Duration: (choices) 1,3,5,7 days  ▶

On-Line Group-Buying Sale Exclusivity 3304

Recalculate　　Continue

Insertion Options
☐ Bold $x.xx
☐ Category Feature $x.xx
☐ Home Page Feature $x.xx
☐ Hot Icon $x.xx

FIG. 33

TAHITI Project

The more people who buy the lower the price.

| Buy at Mercata | Buy at Marketplace | Become a Seller |

1801 — Home | 1805 — Home Map | Your Account | 1807 — Seller Center | 1809 — How It Works | 1811 — Help — 1813

Insertion Confirmation

Product Name:
Category:
Description:
Seller Name: (display here)
Seller Description: (display here)
Seller E-mail: (display here)
Return Policy: (display here)
Payment Methods Accepted: (display here)
Tax Collected In: (display here)
Customer Service Info: (display here)

Image URL:
Image (displayed):

Bold Listing:
Category Feature:

Confirm

TAHITI Project

The more people who buy the lower the price.

| Buy at Mercata | Buy at Marketplace | Become a Seller |
| 1801 | 1805 | 1807 |
| Home | Home Map | Your Account | Seller Center | How It Works | Help |
| | 1803 | 1809 | 1811 | 1813 |

PowerBuy™ List- (Current, Future or Past)

Click the "Fees" link to see a detailed breakdown of all of fees associated with a particular PowerBuy™. Click on the icon to the right of the listing to reschedule that PowerBuy™. (**)

Click to see all On-Line Group-Buying Sales for this featuerd item

| Start | End | Item # | Description | Committed | Total | Price | Inv. | Fees |
|---|---|---|---|---|---|---|---|---|
| 8/28/00 | 8/30/00 | 123456789 | Samsung DVD Player | 5 | 10 | $194.56 | 20 | $135.00 ** |
| 8/28/00 | 8/30/00 | 123456789 | Toshiba DVD Player | 57 | 65 | $550.19 | 200 | $110.00 ** |
| 8/28/00 | 8/30/00 | 987654321 | JVC DVD Player | 12 | 40 | $65.76 | 55 | $230.00 ** |

Click on description to see more details of this insertion takes seller to On-Line Group-Buying Sale details display 3901 (Fig. 39)

Links to fee_detail display 4100 (Fig. 41)

Links to powerbuy-setup_1 display 3301 (Fig. 33)

FIG. 36

TAHITI Project

| Buy at Mercata | Buy at Marketplace | Become a Seller | | The more people who buy the lower the price. |
|---|---|---|---|---|
| —1801 | —1805 | —1807 | | |
| Home | Home Map | Your Account | Seller Center | How It Works | Help |
| | | —1809 | —1811 | —1813 |

List of PowerBuy™ by Item

Item Description: Samsung DVD Player
Item Number: 123456789 offers

| Start Date | End Date | Committed | Total | Final Price | Units Sold | Inv. | Fees |
|---|---|---|---|---|---|---|---|
| 8/27/00 | 8/30/00 | 5 | 15 | $235.87 | 15 | 30 | $134 |
| 8/24/00 | 8/26/00 | 9 | 12 | $218.24 | 12 | 30 | $28 |
| 8/20/00 | 8/23/00 | 8 | 11 | $240.07 | 11 | 30 | $26 |
| 8/15/00 | 8/21/00 | 2 | 19 | $255.81 | 19 | 30 | $55 |

Run this item on PowerBuy™ again

| TAHITI | | The more people who buy the lower the price. |
| Project | | |

Buy at Mercata | Buy at Marketplace | Become a Seller
—1801 —1805 —1807 —1809 —1811 —1813
Home | Home Map | Your Account | Seller Center | How It Works | Help

PowerBuy™ Fee Details

Below is a breakdown of fees associated with the following PowerBuy group purchase:

Platinum Nose Hair Clippers w/Carrying Case
Closed 08/21/00. Item #89097657

| | | |
|---|---|---|
| Insertion | 8/16/00 | $15.00 |
| Special Placement/Gallery | 8/16/00 | $10.00 |
| Special Placement/Category | 8/16/00 | $8.00 |
| Extra Display/Bold Title | 8/16/00 | $4.00 |
| Final Value | 8/21/00 | $18.00 |

Total Charges  $48.25

(Questions? Read fee descriptions)

| TAHITI Project | | The more people who buy the lower the price. |

Buy at Mercata / Buy at Marketplace / Become a Seller
1801  1805  1807
Home | Home Map | Your Account | Seller Center | How It Works | Help
         1809              1811    1813

Click on Order # for an itemized list of charges

Past Charges

| Date of Charge | Amount | Reason |
|---|---|---|
| 8/1/00 | $185.00 | Swept balance to order # (N12345) |
| 8/7/00 | $123.50 | Swept balance to order # (N55555) |
| 8/15/00 | $187.29 | Swept balance to order # (N54321) |

Pending Charges

| 8/18/00 | ($5.00) | Inserting Fee for Item # 123456789 |
| 8/18/00 | ($20.00) | Featured Listing Fee for Item # 123456789 |
| 8/18/00 | ($2.00) | Bold Listing Fee for Item # 123456789 |
| 8/22/00 | ($43.67) | Final Value Fee for Item # 123456789 |
| 8/23/00 | ($5.00) | Insertion Fee for Item # 987654321 |

| TAHITI  | The more people who buy the lower the price. |
| Project | |

Buy at Mercata | Buy at Marketplace | Become a Seller
1801    1805    1807
Home | Home Map | Your Account | Seller Center | How It Works | Help
                 1809              1811            1813

Charge Details

Below is a breakdown of charges associated with the following Order #:

N468363

| Insertion | 08/16/00 | $15.00 |
| Special Placement/Gallery | 08/16/00 | $10.00 |
| Special Placement/Category | 08/16/00 | $8.00 |
| Extra Display/Bold Title | 08/16/00 | $4.00 |
| Final Value | 08/21/00 | $18.00 |
| Insertion | 08/25/00 | $8.00 |
| Extra Display/Bold Title | 08/25/00 | $4.00 |

Total Charges $145.36

(Questions? Read fee descriptions)

SYSTEM AND METHOD FOR EXTENSION OF GROUP BUYING THROUGHOUT THE INTERNET

CROSS-REFERENCE TO RELATED APPLICATIONS

This application is a continuation-in-part of U.S. patent application Ser. No. 09/409,237, filed Sep. 30, 1999, now U.S. Pat. No. 6,934,690 which claims priority from U.S. Provisional Patent Application Ser. No. 60/142,471, filed Jul. 6, 1999, each of which is incorporated by reference herein.

FIELD OF INVENTION

The present invention relates to the expansion of group buying over electronic networks such as the Internet through creation of a computerized platform whereby selling opportunities may be expanded to a wide range of sellers. In addition, the invention allows individual group buying opportunities to be extended to any or all websites on the Internet. More particularly, the invention relates to a platform to extend e-commerce applications, such as on-line buying groups of the type described and claimed in a related pending, commonly owned application filed Mar. 15, 1999 in the names of Tom Van Horn, Niklas Gustafsson and Dale Woodford, entitled "Demand Aggregation Through Online Buying Groups," U.S. application Ser. No. 09/270,219, the disclosure of which is incorporated herein by this reference. In one form, this invention refers to a technique whereby the on-line buying groups technology can be imbedded in other parties' websites and managed remotely by a company, such as the owner of this application, hereinafter referred to as "owner." In another form, the invention further relates to a method of permitting third party website owners to create, manage, and share aggregation of their own online group buying opportunities within the context of this platform. Embodiments of the invention further allow sellers, even small concerns, to submit products/services for sale in a group-buying opportunity.

BACKGROUND OF THE INVENTION

Embodiments of this invention provide a method and apparatus to achieve an unprecedented aggregation of purchasing power (a "super aggregation") by allowing each location or presence on an electronic network such as the Internet to select for display from its location, channel, or website any combination of the owner's limited-time, product-specific on-line group-buying opportunities (sometimes referred to as "PowerBuys™") then appearing in the owner's menu of current and upcoming on-line group-buying sales. Embodiments of the invention further allow the owner's platform to provide a self-service on-line group-buying sale capability that enables sellers, even small concerns, to prepare products/services for sale by on-line group-buying sales on the owner's platform. The owner's platform preferably displays an on-line group-buying sale menu as a configurable product tree, although other display paradigms may be used. Such third party display may be on either an exclusive or a shared aggregation basis. The result is the super aggregation of a unique set of partner locations/websites that will concurrently offer, or sponsor, each one of the owner's on-line group-buying sales, and/or certain third-party on-line group-buying sales.

Embodiments of the invention also provide a method and apparatus that permits certain retailers, suppliers and/or other third parties (including customers) to create, manage and share aggregation, if desired, on on-line group-buying sales featuring their own products or services. This may be accomplished, in part, through such third parties' direct use of all or part of the owner's on-line group-buying sale set up and management tools described in the above referenced commonly assigned application, as well as a related commonly owned patent, U.S. Pat. No. 6,101,484, that issued Aug. 8, 2000 in the names of Richard V. Halbert, Niklas Gustafsson and John M. Thrun, entitled "Dynamic Market Equilibrium Management System, Process and Article of Manufacture," formerly U.S. application Ser. No. 09/281,859, the disclosure of which is incorporated herein by this reference.

The owner's on-line group-buying sale offerings are already available to customers visiting the owner's main site (e.g., the owner's website). Other customers may arrive at the owner's site from links appearing on third-party websites, such as links that direct traffic to the site in a general way, e.g., the home page or the first page of all current on-line group-buying sales. These existing links do not direct visitors to specific on-line group-buying sales selected on the basis of the originating link. Further, the sender may not presently tailor its traffic exposure to a defined set of on-line group-buying sales that the seller deigns most likely to be of interest to its customers. While general links generate some level of participation in the owner's on-line group-buying sales, they do not deliberately funnel traffic to the owner's on-line group-buying sales on an item-by-item basis, nor do general links promote the most efficient or logical aggregation of demand for each individual on-line group-buying sale. Consequently, the methods in place may not fully harness the aggregation potential of the owner's group buying method over the Internet.

Furthermore, no sales channel is presently believed to exist through which a supplier, manufacturer, or retailer of goods and services (especially a small concern) can readily turn to create directly a potentially global market for a given product or service across a vast number of websites on the Internet. While suppliers of products and services can achieve large volume sales through the owner's demand aggregation invention (i.e., the on-line group-buying sale), all such sales are now possible for such third parties only indirectly through the owner, functioning as an Internet retailer. An aspect of this invention permits suppliers, distributors, retailers, and others to create and control their own on-line group-buying sales in either an exclusive or shared aggregation format. In this implementation, the owner's site functions as a true platform for such third party sales. As such, the owner likely will be compensated by some combination of licensing revenue (for the use of its on-line group-buying sale set up and management tools), and/or a transaction fee based on these third party managed sales, or a revenue/margin sharing arrangement.

BENEFITS OF THE INVENTION

This invention may make online demand aggregation more effective by expanding its presence on an item-by-item and/or product-category basis concurrently to all web communities having an interest in the given item or product category. Consequently, the invention potentially leverages all traffic over an electronic network, such as the Internet, to enable unprecedented aggregation of demand, or a super demand aggregation. In addition, on-line group-buying sale selection on an item-by-item and/or category basis permits the super aggregation to occur in a highly efficient and targeted manner. Participating sellers (e.g., seller websites) may include everything from major portal sites having generalized traffic, to niche community sites centered on particular hobbies or other commonalties of interest, as well as Internet retailer sites.

General traffic sites might select a broad array of on-line group-buying sales, while the niche sites likely may select only on-line group-buying sales featuring items of specific interest to their community.

Specifically, a major portal might select an array of popular consumer electronic and sports equipment on-line group-buying sales with relatively wide appeal, while a community site focusing on hiking and fishing might select on-line group-buying sales featuring specific items of camping, hiking and fishing equipment. Sites catering exclusively to women might select items such as gifts, kitchen electronics and sporting equipment geared toward women and the like. An Internet retailer might choose to focus solely on on-line group-buying sales featuring items they offer for resale.

In addition, product manufacturers, service providers, and distributors can broaden their role from simply that of a product or service supplier to a direct reseller of those items though appropriate links and revenue sharing arrangements on on-line group-buying sale sales of their own merchandise and, where appropriate, merchandise or services supplied by others. The self-service on-line group-buying sale capability described herein further aids these sellers in such sales efforts.

A relatively small seller of goods may use the expanded on-line group-buying sale network to offer goods and services to a wider consumer market and a more focused consumer market. For example, a seller may expand on-line group-buying sale offerings to more general Internet locations near the seller's geographical location while also providing the offerings worldwide through Internet locations logically related to the seller's goods/services.

The result to the buyer taking advantage of the super aggregation enabled by this invention may be appreciably greater purchasing power, and perhaps a strengthened sense of community through an enhanced ability to connect with similarly situated buyers. Connections among similarly situated buyers may be enhanced by access to group communication media, such as message boards and chat facilities, which allow purchasers to share ideas about products and accessories.

Participating partner sites benefit by offering unique, valuable content to their site visitors that can be tailored to suit such visitor's needs and interests. Further, the invention may give participating suppliers and Internet retailers a stronger means to target and accumulate demand throughout the Internet for products and services on an item-by-item basis.

In addition, the embodiments of the invention that permit third parties such as suppliers, distributors and Internet retailers to create and control their own on-line group-buying sales may offer, among other things, the ability for such third parties to achieve unprecedented inventory leveling capabilities, directly make real-time yield management decisions, test price sensitivity on new products, etc.—all with the benefit of the true market data made possible by the above referenced commonly assigned inventions. Self-service on-line group-buying sales may open a large market for sellers, and, in some instances, may even eliminate barriers to scalability facing both owner/operators of on-line group-buying sale platforms and sellers.

SUMMARY OF THE INVENTION

1. Definitions

Abstract Terms—as a supplement to selecting on-line group-buying sales exclusively on the basis of a particular product/service or category, a partner site may also select on-line group-buying sales on the basis of terms descriptive of the product/services offered. Of course, customers may also use abstract terms as well in selecting products/services of interest. The abstract terms become increasingly crucial to the operation of the on-line group-buying sale sales method as the number of products/services offered grows increasingly larger.

Customer—a person (e.g., a visitor) who participates in an on-line group-buying sale sales method by either accessing the on-line group-buying sale from the owner's main site or from a partner site. Customers also include prospective buyers as well as sellers who access the owner's main site to sell products/services, either through the owner's main store, one or more partner sites, or through a self-service on-line group-buying sale.

Display—to show an on-line group-buying sale item on a partner site by way of a link to pages on the owner's main site. A page is a specific portion of the totality of the owner's main site and does not necessarily refer to any particular method of displaying the page to a viewer/customer. Of course, display also includes showing an on-line group-buying sale item to a customer at the owner's main site. Moreover, the on-line group-buying sale item may be displayed on any type of display device, including a computer monitor, a telephone, a portable computer, a pager, and a television. The display may also include audible information.

Electronic Network—an electronic communication medium across which sellers and buyers may communicate, especially when communicating through the owner's main site. Representative electronic networks include the Internet, intranets, the public switched telephone network ("PSTN"), wireless voice and data networks, and television networks, such as satellite, broadcast, cable television, and two-way interactive cable. Electronic networks further include hybrid systems, such as those in which sellers communicate to buyers via one medium, such as cable television, and buyers communicate to sellers via another medium, such as the Internet. Electronic networks additionally include aggregated electronic networks, such as when buyers communicate to sellers via multiple media, such the Internet, the telephone, and cable television.

Featured Item—a product or service, or groups of products and services, offered for sale in an on-line group-buying sale sales method. Services may include any type of service, such as product service agreements, one-time services like vacations, and semi-permanent services, such as janitorial services. Featured Items may also include a bundle of products/services, such as a DVD player, a case, an extended warranty, one-year theft insurance, and two free DVDs. For bundled featured items, demand aggregation in an on-line group-buying sale need not necessarily arise on specific items in the bundle or identical purchases of the full bundle but may also arise in a piecemeal fashion via purchases of individual items or subsets of items within the bundle, which may potentially increase the volume discount on any or all items within the bundle and/or purchases of the bundle as a whole.

On-Line Group-Buying Sale—a business method and its variants in which buyers wishing to purchase a particular product or service, or groups of products and services, within a given time frame join forces in a buying group formed across an electronic network specifically to accomplish the desired purchase. On-line group-buying sales are sometimes referred to as "PowerBuys™," a specific format for on-line group-buying sales presently practiced by Mercata.com of Bellevue, Wash. In an on-line group-buying sale, the buying group potentially enables individual buyers to leverage their combined purchasing power to achieve an economic bargain superior to that attainable by any one buyer acting alone. A superior bargain for buyers may often be reflected in terms of a lower price. For example, as more buyers join the buying group, the desired item's price typically declines. At the end of the purchase period, the owner (and/or seller) allows all successful buyers (i.e., those with offers at or above the final on-line group-buying sale price) to purchase the item at a final (low) price even if some buyers have submitted irrevocable offers specifying a price ceiling higher than the final (low) price. In some embodiments, the owner may complete the sales transaction with each buyer by accepting offers at or above the final price, debiting each successful buyer (e.g., via credit card transaction) at the time the purchased featured item is shipped to the buyer. In other embodiments, the owner may not complete purchase transactions directly with the buyers but may instead refer irrevocable and revocable purchase offers (or other expressions of interest in the featured item) to a partner or third-party seller who may then complete individual buyer transactions within the buying group by accepting any desirable irrevocable purchase offers and/or pursuing buyers' expressions of interest in a featured item. The interested reader will find more information about embodiments of on-line group-buying sales by reading U.S. Pat. No. 6,101,484, entitled "Dynamic Market Equilibrium Management System, Process and Article of Manufacture," which issued on Aug. 8, 2000.

On-Line Group-Buying Sale Menu Tree—a catalog maintained by the owner listing current and upcoming on-line group-buying sales and/or products/services ("featured items") from which partner sites may select for display from their respective network location or website. Of course, the owner's listing of current and upcoming on-line group-buying sales may be made available to customers visiting the owner's main site. In a preferred embodiment of the invention, the on-line group-buying sale menu tree is organized as a tree structure having selectable categories/products. By selecting one location on the on-line group-buying sale menu tree, a partner selects that location and any locations below it. Likewise, a seller may use the on-line group-buying sale Menu Tree's product categories as an aid in determining where a new featured item should be placed. As discussed herein, an ordinary artisan will recognize that different structures may be used to accomplish a similar purpose.

Owner—the party owning and/or having a license for the right to operate the computerized platform hosting on-line group-buying sales and/or facilitating on-line group-buying sale displays on partner sites. For example, the owner may be the owner of the invention described herein and the related inventions cross-referenced herein, or a licensee of such owner. The terms "owner" and "operator" are generally synonymous in this context.

Owner's Main Site—a computer-operated location, such as a website, on which the on-line group-buying sale platform or hub resides, also known as the owner's site. For purposes of at least one embodiment of the invention, this site is an owner's site on which the on-line group-buying sale method of sales is being practiced in accordance with the commonly assigned inventions referred to above. An ordinarily skilled artisan will recognize that the on-line group-buying sale platform may provide a virtual presence only, with a substantial portion of the actual computing power driving the on-line group-buying sale sales method located elsewhere. In addition, embodiments of the invention are not limited to a single owner's main site. Embodiments of the invention are not limited to websites and/or communications using HTTP and may include computer-operated locations such as cable TV, digital interactive cable, etc.

Partner Parameters—a field within the set up code for each on-line group-buying sale that controls which on-line group-buying sales each customer may access, according to an alternative embodiment of the invention. For purposes of an embodiment of this invention, the location or link from which each individual customer arrives at the owner's main site may be a key determinant in determining the Product Category.

Partner Site—any third-party owned or operated location, such as a website, within an electronic network, such as the Internet, that has been configured to display one or more on-line group-buying sales at its network location or website. The universe of partner sites potentially could encompass an entire network such as the Internet and/or a channel(s) of a cable television network and/or wireless voice and data networks. However, it is expected that certain network locations or websites would be barred from participation for various reasons, e.g., inappropriate content. Of course, partner sites, seller sites, and/or an operator's site may be combined into one location accessible via an electronic network (e.g., a website).

Product Category—a category, product/service, or combined category and product/service selectable from the on-line group-buying sale tree structure. The Product Category controls which on-line group-buying sales each customer shall be able to access. For purposes of an embodiment of this invention, the location or link from which each individual customer arrives at the owner's main site may be a key determinant in determining the Product Category. For example, a customer arriving from a partner's site may typically be directed to Product Categories selected by or in association with the partner while customer's arriving on their own may typically be directed to either the owner's featured items and/or featured items from a seller/customer store.

Self-Service On-line Group-Buying Sale—an on-line group-buying sale format in which sellers may directly submit to the owner's main site data related to featured items to be sold via one or more on-line group-buying sales. In some embodiments, the owner's main site may group products/services for self-service on-line group-buying sales together, such that the resulting Seller/Customer Store often comprises products/services offered by more than one seller. The owner's main site typically provides sellers with the functionality for establishing a self-service on-line group-buying sale such that the sellers may typically enter products/services for sale by on-line group-buying sale by merely entering certain data requested by the owner. The self-service on-line group-buying sale functionality is typically provided on the owner's website in the form of a computer program; however, the self-service on-line group-buying sale functionality may be accomplished in other ways.

Seller—a manufacturer, retailer, service provider, or other party (e.g., another customer) offering products/services for sale to customers, business, or other buyers via the on-line group-buying sale sales method. The owner, its partners, and other customers may be sellers in some embodiments of the invention.

Seller/Customer Store—a portion of the on-line group-buying sale Menu Tree reserved for self-service on-line group-buying sales. The seller/customer store's highest node typically represents a senior node in the on-line group-buying sale menu tree, typically on par with the owner's store and various partner stores. The seller/customer store may include below the highest node a number of Product Categories which correspond with other product/service categories found in other portions of the on-line group-buying sale Menu Tree.

Other terms used in this application that are defined in the related applications and referenced patent incorporated herein have the meanings used in those applications, except where re-defined herein.

2. Summary Description

Embodiments of the invention provide a system and method for aggregating demand in group-buying sales conducted across an electronic network. Accordingly, a computerized facility may be configured to conduct group-buying sales and operably coupled to the electronic network. The computerized facility may include specification software executable on the computerized facility, the specification software may be configured to receive item data from a seller that defines a featured item for a first group-buying sale. The seller may transmit the data over the electronic network to the computerized facility. The specification software may also receive sale data from the seller, the sale data providing the seller's directions for the first group-buying sale, wherein the seller transmits the data over the electronic network to the computerized facility. The specification software may also store the received item data and the received sale data in a data repository, wherein the computerized facility uses the received sale data in conducting the first group-buying sale of the featured item defined by the received item data.

Embodiments of the invention additionally provide a system and method for aggregating demand in group-buying sales conducted across an electronic network. A featured item set-up module may be configured to assist sellers provide data that describes featured items to be sold in group-buying sales conducted on a computerized system in communication across an electronic network with buyer computing systems. A group-buying set-up module may be configured to assist the sellers provide the data that directs the computerized system in conducting the group-buying sales for the featured items. In addition, an account set-up module may be configured to allow the sellers to establish accounts with a group-buying sale host associated with the computerized facility.

Embodiments of the invention may also provide a system and method that offers self-service group-buying seller services over an electronic network. A featured item description component may be configured to receive a seller's description of a featured item to be sold in a first group-buying sale conducted on a computerized facility coupled to buyer computing systems over the electronic network. In addition, a sale parameter component may be configured to receive the seller's instructions for the group-buying sale and configured to provide the received instructions to the computerized facility.

Embodiments of the invention may additionally provide a system and method that offers self-service group-buying seller services over an electronic network. A first computing system may contain software executable on the first computing system. The software may be configured to send first data describing a featured item to be sold in a first group-buying sale to a second computing system hosting a group-buying sale. The first computing system may be operably coupled to the second computing system over an electronic network. The software may send second data providing instructions for the group-buying sale to the second computing system. The software may also receive scheduling data about the group-buying sale from the second computing system.

Embodiments of the invention may further provide a computer-readable data transmission medium containing a data structure. The data structure may include a first portion that defines a featured item for a first group-buying sale, with the first group-buying sale conducted by a computerized facility over an electronic network operably coupled to potential buyers' computing systems. The data structure may also include a second portion that provides directions to the computerized facility for conducting the first group-buying sale, and a third portion that identifies a seller of the featured item.

Embodiments of the invention additionally provide a computer-readable medium having computer-executable instructions for performing a method for aggregating demand in group-buying sales conducted across an electronic network. The instructions may direct the receipt of item data from a seller that defines a featured item for a first group-buying sale. The seller may transmit the item data over the electronic network to a computerized facility configured to conduct group-buying sales over the electronic network. The instructions may also direct the receipt of sale data from the seller that provides the seller's directions for the first group-buying sale, wherein the seller transmits the sale data over the electronic network to the computerized facility. The instructions may further direct storage of the received item data and the received sale data in a data repository, wherein the computerized facility uses the received sale data in conducting the first group-buying sale of the featured item defined by the received item data.

In other embodiments of the invention, each partner site must typically select at least one product or product category from the on-line group-buying sale menu tree in order to permit a targeted aggregation of a unique set of partner sites that concurrently displays each featured item offered in an on-line group-buying sale. The partner site may also select product categories from the on-line group-buying sale menu tree for display on sub-communities within its network location or website. For example, this may be achieved by displaying a list of all current and upcoming on-line group-buying sales on password-protected pages within the owner's site and/or on other site locations. The partner site could then communicate its choices by "checking off" each desired item.

In order to permit access in a manner consistent with partner sites' selections, the owner will typically examine the portions of the on-line group-buying sale menu tree associated with each on-line group-buying sale to determine the set of partner sites having selections relevant to the on-line group-buying sale, according to an embodiment of the invention. The on-line group-buying sale menu tree controls which items are accessible and which are hidden for each particular visitor based on how such visitor came to the owner's site (i.e., whether the visitor's session originated from a link from a particular partner site, versus any number of general links or direct hits to the owner's main site). The on-line group-buying sale management and set up tools, which have been modified to permit the described personalization necessary for this invention, are more fully described in the applications for the commonly assigned inventions referred to above.

In the case of exclusive on-line group-buying sales, the partner's abbreviated name, or another appropriate identifier, would be the only set value placed within the on-line group-buying sale menu tree for a relevant portion of the on-line group-buying sale menu tree so that those on-line group-buying sales are shown only to visitors linking directly from that partner site, according to an embodiment of the invention. On-line group-buying sales so designated as exclusive must also be hidden from the product category tree within the owner's main site so they will not be displayed to the owner's other customers (e.g., those coming from general links, search engines, or by typing in the URL of the owner's main site), where such a restriction is appropriate. In the case of shared aggregation on-line group-buying sales, the value set within the partner parameter would include a string of partner site code names (i.e., all partners choosing such item) such that visitors originating from all such sources, as well as those arriving through the owner's main site, would have joint and simultaneous access to the on-line group-buying sale item. This method is generally preferable as it permits the fullest aggregation of demand.

Each partner site is then given a reference marker, such as a URL, for its link(s) to the owner's main site through which its visitors will have access to all such partner-selected on-line group-buying sales when visiting the owner's site through such a link, according to an embodiment of the invention. Such visitors may also have click-through access to other portions of the owner's main site (such as pages displaying other nonexclusive on-line group-buying sales on such site) depending upon the specific page layout and design appearing on such visitor's initial access pages. The partner may supply images and any URLs necessary and appropriate to link back to its own site from the selected on-line group-buying sale pages that are viewed by visitors utilizing its links. In a shared aggregation embodiment of the invention, visitors from a particular site would be shown only the link back to the originating site. All other partner site links would be hidden from that visitor.

In an alternative embodiment, a "partner parameter" field can be associated with each on-line group-buying sale set up code so as to permit access in a manner consistent with partner sites' selections. The owner examines the portions of the partner parameter within the on-line group-buying sale set up code for each on-line group-buying sale to look for all the relevant abbreviated partner code names assigned to that on-line group-buying sale. The partner parameter field within the on-line group-buying sale set up code controls which items are accessible and which are hidden for each particular visitor based on how such visitor came to the owner's site (i.e., whether the visitor's session originated from a link from a particular partner site, versus any number of general links or direct hits to the owner's main site).

BRIEF DESCRIPTION OF THE DRAWINGS

FIG. 4 is a simplified block diagram representing the technical schema underlying an embodiment of the invention.

FIG. 5 shows an exemplary tree structure 500 that may be used to retain on-line group-buying sale product/service data, such as for use in an on-line group-buying sale menu tree, according to an embodiment of the invention.

FIG. 6 illustrates another exemplary tree structure 600 that may be used to categorize product/service data available for on-line group-buying sales, according to an embodiment of the invention.

FIG. 7 further illustrates a partner's on-line group-buying sale product/service selections using the on-line group-buying sale setup tool 400, according to an embodiment of the invention.

FIG. 8 shows an exemplary seller's screen 800 that may be used to describe a product/service for an on-line group-buying sale, according to an embodiment of the invention.

FIG. 9 shows an exemplary seller's screen 900 as completed by a particular seller, a Girl Scout troop from Bellevue, Wash., for the sale of a specific lot of goods, Girl Scout thin mint cookies, according to an embodiment of the invention.

FIG. 10 illustrates an exemplary partner screen 1000 that could be used by a partner to select which on-line group-buying sales to display, according to an embodiment of the invention.

FIG. 11A illustrates a multi-seller, multi-partner system 1101, according to an embodiment of the invention.

FIG. 11B is a flowchart showing the seller/partner filter's processing of partner tags arriving at the on-line group-buying sale platform 1102 from customers at the partner sites, according to an embodiment of the invention.

FIG. 12 illustrates the on-line group-buying sale platform 1102 hosting an exclusive on-line group-buying sale, according to an embodiment of the invention.

FIG. 13 shows the data flow that occurs when on-line group-buying sales are selected by an operator of a third party site for use in connection with that site, according to an alternative embodiment of the invention.

FIG. 16B illustrates how sellers may interact with the self-service on-line group-buying sale component 1501 to provide products/services for sale by on-line group-buying sales on the owner's site and in association with the seller's partners, according to another embodiment of the invention.

FIG. 26 is a representative display 2601 that may be shown to a seller upon selecting the seller center entry 1809, according to an embodiment of the invention.

FIG. 28 is an agreement display 2801 of the owner's seller agreement 2503, according to an embodiment of the invention.

FIG. 29 is a profile display 2901 of the seller profile entry 2505, according to an embodiment of the invention.

FIG. 33 is an on-line group-buying sale setup display 3301 that provides sellers with the on-line group-buying sale setup functionality entry 2517, according to an embodiment of the invention.

FIG. 34 is a confirmation display 3401 that provides sellers with the confirmation report entry 2519, according to an embodiment of the invention.

FIG. 36 illustrates an exemplary list display 3601 that displays a given Seller's on-line group-buying sales, according to an embodiment of the invention.

FIG. 37 shows an exemplary item display 3701 that provides information related to a series of on-line group-buying sales for a given product/service over time, according to an embodiment of the invention.

FIG. 39 shows an exemplary fee detail display 3901 for an on-line group-buying sale associated with a grooming product, according to an embodiment of the invention.

FIG. 40 shows a balance display 4001 for a particular seller that includes the seller's past charges and the seller's pending charges, according to an embodiment of the invention.

FIG. 41 shows a fee display 4100 for a given owner's site, according to an embodiment of the invention.

DETAILED DESCRIPTION OF THE INVENTION

Embodiments of the invention provide a self-service on-line group-buying sale capability that enables sellers to enter new products/services for sale by on-line group-buying sale at an owner's site without necessarily requiring any specific intervention or assistance from the owner. For example, as discussed below with respect to FIGS. 8 and 9, the owner may allow sellers, especially relatively small commercial entities, to describe products/services for an on-line group-buying sale and to also provide directions for conducting the on-line group-buying sale itself. Embodiments of the owner's site may even allow ordinary customers visiting the owner's site to become sellers as well as buyers. As will be discussed below, the self-service on-line group-buying sale capability may exist on the owner's site alongside the owner's own product/service offerings and partner product/service offerings.

Figure 1:
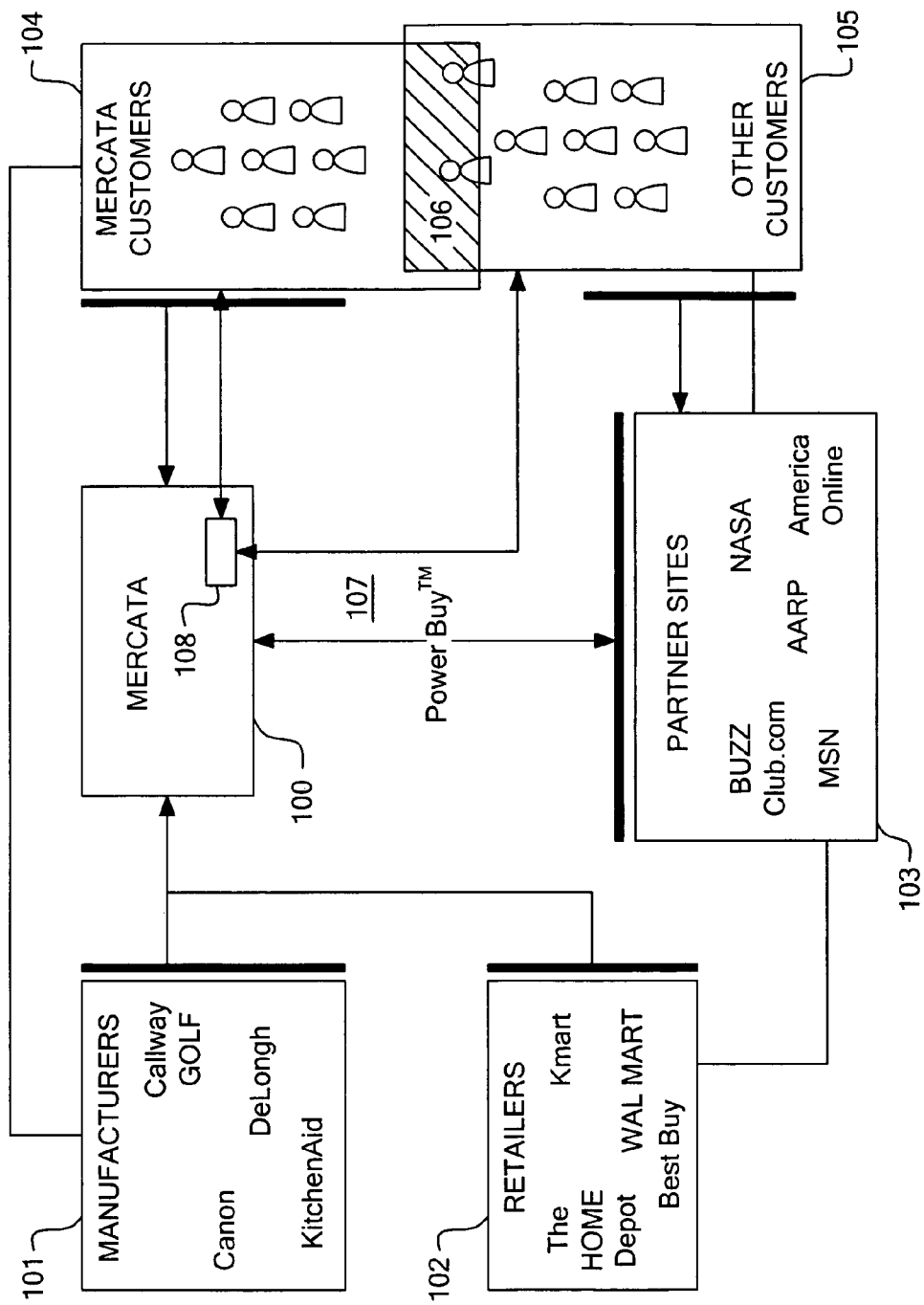
FIG. 1 is a simplified diagrammatic representation of a model that shows how embodiments of the invention may expand aggregation through multiple avenues of traffic flow to the owner's on-line group-buying sales.

FIGS. 1-12 of the drawings show preferred forms of a system and process for implementing an embodiment of the invention that pertains to allowing partners of the owner to select products/services for sale by on-line group-buying sale for display to their customers. As shown in FIG. 1, an embodiment of the invention combines for a given on-line group-buying sale 107 an owner's main site (i.e., Mercata 100) and its customers (i.e., customers 104) with traffic coming from partner sites 103 and their respective customers 105. Of course, an overlap 106 may be expected between the customers 104 and the customers 105. Nevertheless, the invention may achieve a super aggregation of demand for the on-line group-buying sale 107 beyond that provided by the customers 104 alone. In addition, a number of sellers 101, 102 may increase due to the attraction of the super demand aggregation provided by embodiments of the invention. The customers 105 may arise from an unlimited combination of partner websites, including major portals, broad and niche community sites, manufacturer websites, Internet retailer sites and the like. Communications among the customers 104, 105 may be enhanced by access to a group communication medium 108 which allows the customers 104, 105 to share ideas about products and accessories offered on the owner's main site 100. The group communication medium 108 also facilitates communications within groupings of the customers 104, 105. The group communication medium 108 may be one or more group communication mediums, such as message boards and chat facilities.

Figure 2:
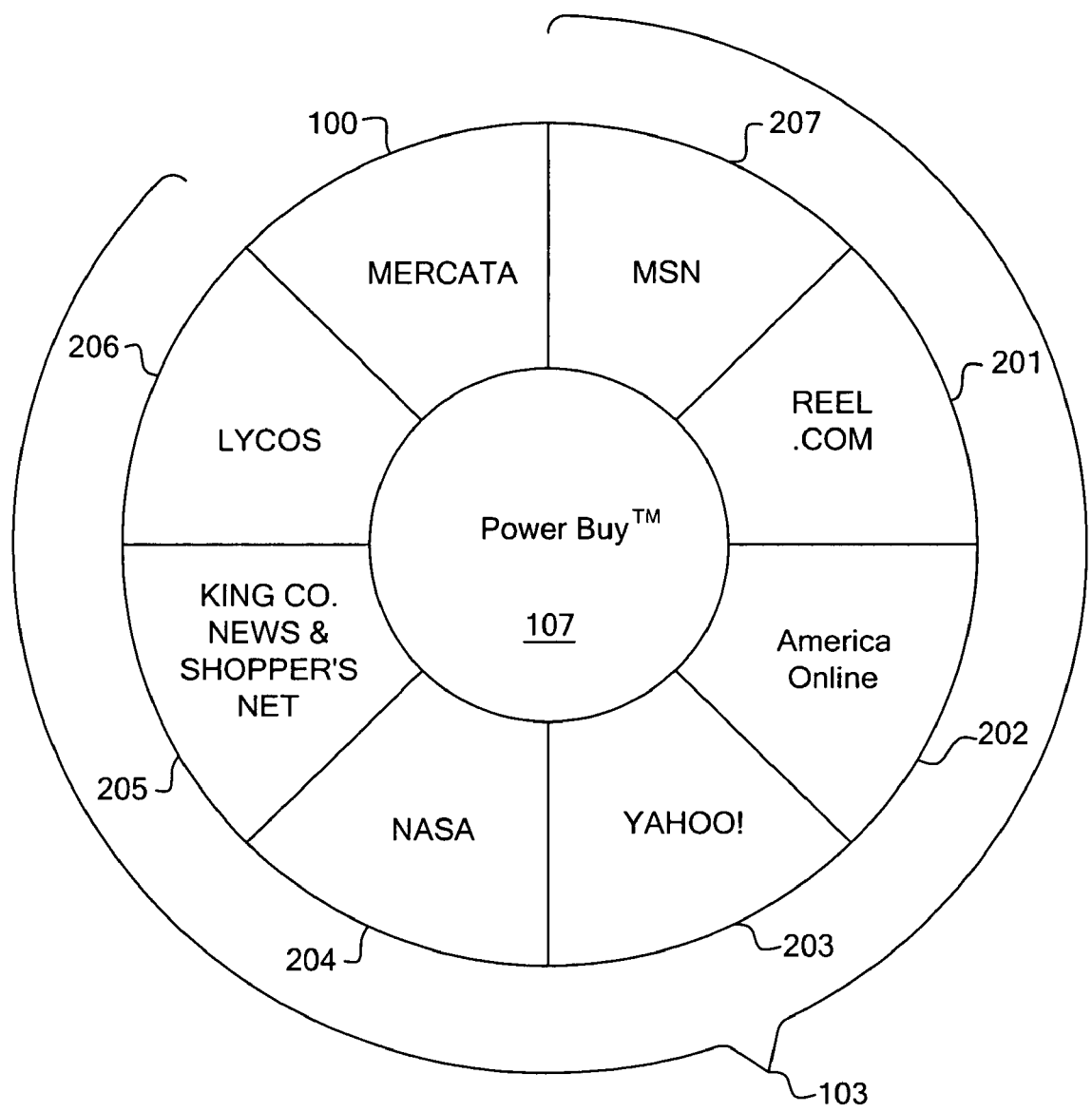
FIG. 2 is a corresponding simplified diagrammatic representation of the aggregation of a unique set of partner sites for each on-line group-buying sale item, according to an embodiment of the invention.

Traffic from the partner sites 103 can be channeled in a manner to efficiently aggregate demand on an on-line group-buying sale-by-on-line group-buying sale basis with the owner's main site 100 as shown in FIG. 2. Accordingly, partners 201-207 may combine with the owner's main site 100 to super aggregate demand for the on-line group-buying sale 107. Of course, each of the partners 201-207 will typically have indicated in some manner either their specific interest in the product/service of the on-line group-buying sale 107 or their general interest in a product/service category that includes the on-line group-buying sale 107. In some embodiments of the invention, the partners 201-207 may indicate their interest in the product/service of the on-line group-buying sale 107 by expressing interest in more general, or abstract, terms that describe the product/service. Such abstract terms may not necessarily represent a specific product/service or product/service category.

Figure 3:
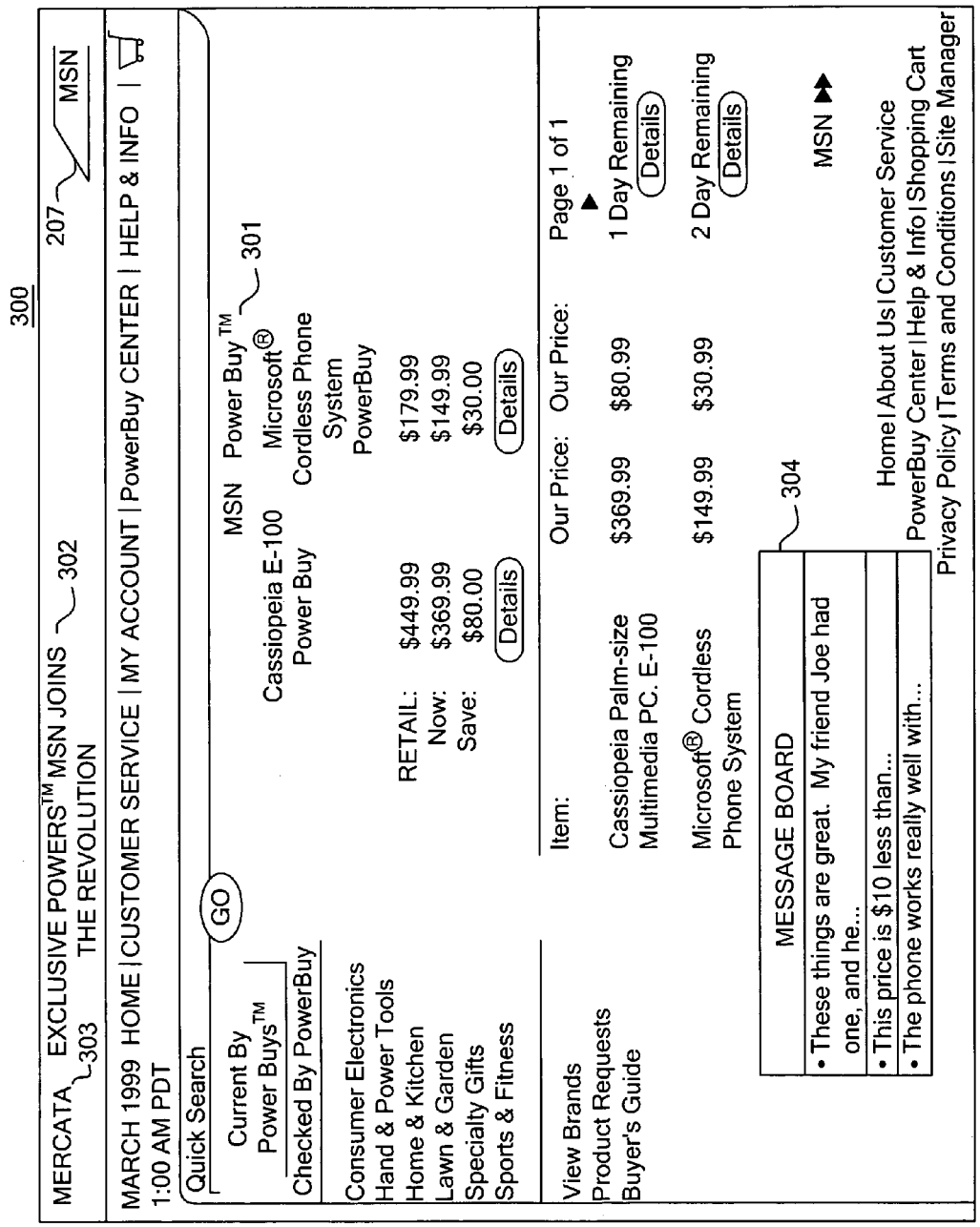
FIG. 3 is a screen shot showing exclusive on-line group-buying sales made available only to one partner site, according to an embodiment of the invention.

While an ideal on-line group-buying sale scenario calls for pooling partner site traffic, and therefore pooling purchasing power from all interested sources (e.g., customers of the partners 201-207), the owner's main site may permit exclusive on-line group-buying sales on partner sites, whereby all purchases will come from that site's traffic, rather than the shared aggregation shown in FIG. 2. FIG. 3 depicts an exemplary screen shot 300 that would be served up to visitors having access to an exclusive on-line group-buying sale.

The screen shot 300 includes exclusivity indicators 301, 302 and the partner identifier 207, as well as an owner's identifier 303. Of course, an ordinary artisan will recognize that providing an exclusive on-line group-buying sale to a given partner does not necessarily require logos identifying the owner, the partner, or even strict exclusivity. On the other hand, such features may render an exclusive scenario more attractive to either the partner and/or the owner.

A representative screen shot for nonexclusive on-line group-buying sales could be quite similar to the screen shot 300 albeit without the references to exclusivity 301, 302, according to an embodiment of the invention. Moreover, in a non-exclusive scenario, a customer's links back to an originating partner site may be tailored to the point of origin for each visitor viewing such page. An ordinary artisan will recognize the possibilities for other variations between complete exclusivity and complete non-exclusivity, including some form of limited aggregation whereby a product manufacturer or retailer could offer its merchandise to all partner sites except for direct competitors or vendors deemed unsuitable or inconsistent with the manufacturer or retailer's own business purposes.

The screen shot 300 also includes a group communications display 304 which allows customers to share ideas about the products offered on the screen shot 300. The group communications display 304 shown in FIG. 3 has the format of a message board in which customers may post messages about the products. As an ordinarily skilled artisan will recognize, other group communications media may be used, such as a chat facility.

FIG. 4 provides a simplified block diagram representing the technical schema underlying an embodiment of the invention. As shown in FIG. 4, an on-line group-buying sale set up tool 400 that creates on-line group-buying sales may also help define which particular on-line group-buying sales a partner site's visitor/customers may access. The on-line group-buying sale set up tool 400 may operate in conjunction with other on-line group-buying sale set up tools, such as those described in the commonly assigned applications incorporated by reference herein.

Partners 406-408 may access the on-line group-buying sale set up tool 400 to specify which product(s)/service(s) they wish displayed (or displayable) to their customers/visitors 409. As previously stated, the partners 406-408 may examine the on-line group-buying sale menu tree to select specific products/services or the partners 406-408 may select product/services categories. Selecting a product/service category typically renders all products in the category suitable for display. In addition, the partners 406-408 may tailor their selections through the use of abstract product/service terms, according to an embodiment of the invention. It is anticipated that the partners' selection process may be ongoing as on-line group-buying sales are continuously beginning and ending on the owner's main site. In addition, the partners 406-408 may change their product/service selections frequently.

An on-line group-buying sale close server 404 may start and stop on-line group-buying sales. When running an on-line group-buying sale, the on-line group-buying sale close server 404 accesses a data repository 403 containing on-line group-buying sale data, such as the data associated with the on-line group-buying sale menu tree. A graphical user interface treatment 405 provides descriptions regarding the appearance of on-line group-buying sales on both the owner's main site and on partner sites. A rules engine 401 determines which partner sites may display links to which presently active on-line group-buying sales by accessing the on-line group-buying sale menu tree. Accordingly, the customers 409 visiting partner sites 406-408 may receive the appropriate links to on-line group-buying sale product display pages 402a-402c.

On some occasions, multiple on-line group-buying sales may be suitable for display to a customer, but the partner site (or the customer) may be configured for display of only a single on-line group-buying sale at a time. In such instances, a display selector 410 determines which particular on-line group-buying sale(s) are actually displayed to a customer linked from a partner site. FIG. 4 shows the display selector 410 as contained within the rules engine 401; however, an ordinarily skilled artisan will recognize that the display selector 410 need not necessarily be contained within the rules engine 410.

Exclusive on-line group-buying sale items may not be generally available from the owner's on-line group-buying sale menu when partner sites make their on-line group-buying sale selections. Of course, the on-line group-buying sale setup tools may permit a range of exclusivity. In situations where a partner site (typically a product supplier or retailer) wishes to offer on-line group-buying sales of its own merchandise, such a partner may license and utilize the on-line group-buying sale set up and management tools described in the commonly assigned inventions referenced herein. This embodiment of the invention would permit such third parties to control which products will be featured items, the form of the price curve on which the product's sales price will be determined, and the extent of exclusivity desired with respect to other's access to its on-line group-buying sale items. However, all such decisions may be bounded by parameter limits set by the owner to ensure appropriate levels of consistency and customer satisfaction. Further details on the administration of this embodiment of the invention are available in the second commonly owned patent referenced above, U.S. Pat. No. 6,101,484.

FIG. 5 shows an exemplary tree structure 500 that may be used to retain on-line group-buying sale product/service data, such as for use in an on-line group-buying sale menu tree, according to an embodiment of the invention.

The tree structure 500 may represent any number of on-line group-buying sale categories/products. In a typical embodiment, each particular node represents a category, a product, or both. For example, a Category B 503 has two child nodes 507 and 515. The node 507 itself has two child nodes 508 and 509. The node 509 has two child nodes 510 and 514. The node 510 has three child nodes 511-513.

An operator of the owner's main site may modify the tree structure 500 to add new nodes to the tree structure 500, remove old nodes from the tree structure 500, and/or reorganize the tree structure 500. The operator may be a human or an automated support system. In addition, in some instances partners may be allowed to modify the tree structure 500 using the on-line group-buying sale setup tools. As an ordinarily skilled artisan will recognize, the on-line group-buying sale setup tools may include safety protocols that would prevent a partner (or the owner) from making harmful modifications to the tree structure 500. The tree structure 500 will typically include a single root node 501, although an ordinary artisan could easily develop a rootless tree structure and/or a multi-root tree structure.

Partners use the tree structure 500 to define the on-line group-buying sale products/services to display to customers visiting their partner sites. A partner may select a specific product, such as that represented by the node 511, an intermediate node such as the node 510, a category node 503, or the root node 501. The partner's site will display on-line group-buying sales associated with any selected node in the tree structure 500 and all the nodes depending from it. For example, by selecting the node 510, a partner's site may display on-line group-buying sales pertaining to the nodes 510-513. The display selector 410 determines which particular on-line group-buying sale(s) are actually displayed to a customer linked from a partner site when more than one on-line group-buying sale could be displayed to a customer configured to view only one display at a time.

The partner's selection of a particular category is a dynamic selection, with the actual on-line group-buying sale products/services displayed to customers depending upon the status of the tree structure at the customer's access instant. For example, if the owner, or a seller, later adds or removes products/services at or below the child 510, then the on-line group-buying sales displayable to the partner's site will be correspondingly updated. This mechanism provides greater flexibility to partners than selecting a static category or static product for which no on-line group-buying sales may exist on the owner's main site at a later time period, such as when a customer actually links to the owner's main site.

Of course, a partner may select more than one portion of the tree structure 500 to display on-line group-buying sale products/services. For example, a partner could select the node 502, the node 510, and the node 516.

The owner may store the tree structure 500 in a data repository, such as the data repository 403 shown in FIG. 4. As an ordinarily skilled artisan will recognize, a database represents but one suitable data repository.

FIG. 6 illustrates another exemplary tree structure 600 that may be used to categorize product/service data available for on-line group-buying sales, according to an embodiment of the invention. The tree structure 600 closely resembles the tree structure 500 but with specific on-line group-buying sale product/category entries.

In the tree structure 600, a root node 620 comprises two child nodes 601, 602. The node 601 pertains to the owner's set of products/services (i.e., "the Mercata General Store"), and the node 602 represents an exclusive set of products for a particular seller, "Big Animation Co."

The owner's sub-tree, that portion of the tree structure 600 at and below the Mercata General Store 601 comprises three categories 603, 604, and 614. The Home & Garden node 604 comprises two sub-categories, Seeds 605 and Tools 606. The Tools subcategory 606 comprises two specific products a Gucci Hand Trowel 607 and a Starbucks Rake 608.

The exclusive product/service sub-tree, that portion of the tree structure 600 at and below the Big Animation Co. 602 comprises two categories, Clothes 609 and Toys 611. The Clothes category 609 comprises a specific product, a Chubby Chuckles Sweater 610, while the Toys category 611 comprises two specific products, a Chubby Chuckles Doll 612 and a Sweet-Snuffy Puppet 613.

As discussed above, the Big Animation Co. sub-tree 602 may be made available on an exclusive basis, e.g., accessible only from the Big Animation Co. website. In this mode, a customer on the owner's main site would not be allowed to view the products/services on the sub-tree 602 or participate in on-line group-buying sales associated with the sub-tree 602 without first accessing the Big Animation Co.'s website.

Alternatively, the sub-tree 602 may be configured in a non-exclusive or in a semi-exclusive manner. In the non-exclusive configuration, a customer could access the sub-tree 602 from any location where the customer could also access the sub-tree 601. In the semi-exclusive configuration, a customer could access the sub-tree 602 from the owner's website and from the Big Animation Co.'s website but from no other location. An ordinarily skilled artisan could likewise develop a range of additional non-exclusive configuration options.

The tree structure 600 may be updated periodically by the owner and by sellers. For example, the Big Animation Co. could add to the Toys category 611 a Chubby Chuckles Tractor and a Chubby Chuckles Whistle and remove the Sweet-Snuffy Puppet 613. Accordingly, a partner site that had previously selected the Toys category 611 would no longer display on-line group-buying sales for the Sweet-Snuffy Puppet 613 but would now display on-line group-buying sales for the Chubby Chuckles Tractor and the Chubby Chuckles Whistle as well as the Chubby Chuckles Doll 612.

FIG. 7 further illustrates a partner's on-line group-buying sale product/service selections using the on-line group-buying sale setup tool 400, according to an embodiment of the invention. A partner, such as the partners 406-408, may access the on-line group-buying sale setup tool 400, which has been designed to aid in the selection of appropriate products/services for the partner's site. For example, the partner 406 may select one or more specific products/services, and/or one or more product/service categories, and/or one or more abstract terms that could be associated with a particular product/service. Regardless of how the partner 406 selects products/services of interest, the on-line group-buying sale setup tool 400 stores the partner's selections in a partner characteristics data set 701.

The partner characteristics data set 701 may contain other pertinent data regarding the partner and the partner's site. For example, the on-line group-buying sale setup tool 400 may also acquire from the partner 406 identification data for retention in the partner characteristics data set 701. A partner's first use of the on-line group-buying sale setup tool 400 may likely result in the input of considerably more data to the partner characteristics data set 701 than the partner's subsequent uses of the on-line group-buying sale setup tool 701.

The on-line group-buying sale rules engine 401 may access the partner characteristics data set 701 to determine which on-line group-buying sale products/services to display to customers/visitors entering the owner's main site via a link from a partner site, such as from the partners 406-408. Once the on-line group-buying sale rules engine 401 has accessed the partner characteristics data set 701 for a customer/visitor entering the owner's site, the on-line group-buying sale rules engine 401 may access an on-line group-buying sale menu tree 702 to determine which products/services presently being offered in on-line group-buying sales may be accessed by the visitor/customer. The on-line group-buying sale rules engine 401 may then display at least one selected product/service to the customer/visitor using the on-line group-buying sale Partner Product Display Page 402. Of course, multiple customers may enter the owner's main site from multiple partner sites at any given time. Accordingly, multiple on-line group-buying sale Partner Product Display Pages 402 may be used in any given time interval.

FIG. 8 shows an exemplary seller's screen 800 that may be used to describe a product/service for an on-line group-buying sale, according to an embodiment of the invention. As previously discussed, the invention enables a super demand aggregation for the sale of products. In addition, the invention allows a plethora of sellers to provide numerous products/services for sale via on-line group-buying sales. Accordingly, the seller's screen 800 could be used by sophisticated manufacturers and retailers for the sale of large quantities of goods, as well as by smaller scale sellers, such as clubs, artisans, and charities.

The seller's screen 800 includes a name field 801, an address field 802, a goods for sale field 803, a maximum quantity field 804, and a description of goods field 805. The name field 801 allows the seller to enter his/her business name. The address field 802 allows the seller to enter his/her address, e.g., an e-mail address and/or a mailing address. The goods for sale field 803 allows the seller to enter a name for the goods being sold, and the maximum quantity field 804 allows the seller to enter the amount of goods being sold, e.g., 64 boots. The description of goods field 805 allows the seller to describe the goods in greater detail, e.g., "Edmund Hillary hiking boots; rated AAA by the Am. Hikers Assoc., also known as 'Good-to-Go Boots.'" The description of goods field 805 may include a link to an HTML page or a digital photograph.

The seller's screen 800 may include an initial price field 806, a minimum price field 807, a minimum sale quantity 808, an order quantity limit 809, an offer reject threshold 810, and a pricing scheme 811. The initial price field 806 represents the on-line group-buying sale starting price. The minimum price field 807 represents the lowest price for which a good may be sold. The order quantity limit 809 represents the maximum number of goods which may be sold to a single customer. The offer reject threshold 810 represents the highest price for which an offer will be considered "reasonable." The pricing scheme 811 defines whether price curve is represented in line segments or step-wise.

The seller's screen 800 may include a cost curve 812, an ignore scheme 813, a window price 814, a seller's bonus program 815, a buyer's bonus program 816, and product delivery information 817. The cost curve 812 defines whether the cost curve is in line segments or step-wise. The ignore scheme 813 defines whether the ignore curve is line segments or step-wise. The window price 814 defines the height of the price window and is used to encourage customers to notify their friends of the on-line group-buying sale. The seller's bonus program 815 and the buyer's bonus program 816 may be part of a loyalty management program; e.g., "Mercata bucks" that may be used for subsequent on-line group-buying sales. The product delivery information 817 may be used to specify how purchased products are shipped and corresponding pricing information.

The seller's screen 800 may include an abstract for partner sites 818 and a seller security/certification data field 819. The abstract for partner sites 818 allows the seller to enter abstract terms that may be recognized by the on-line group-buying sale system in order to link the seller's products/services to partner sites interested in hosting on-line group-buying sales for products/services represented by the abstract terms. For example, a seller might use the abstract terms "hiking; boots." One partner site may be setup to host on-line group-buying sales related to "hiking" and another partner site may be setup to host on-line group-buying sales related to "boots." Accordingly, the seller will have super-aggregated demand to include two partner sites, in addition to the owner's site (e.g., customers visiting the owner's site). While "boots" might represent a product/service category in the on-line group-buying sale menu tree, more abstract terms such as "hiking" might not be specifically represented in the on-line group-buying sale menu tree, although products/services might well be describable by the term. The seller security/certification data field 819 allows a seller to provide information related to the seller's financial responsibility.

An ordinary artisan will recognize that the seller's screen 800 may include a different number of fields than shown in FIG. 8. In addition, an ordinary artisan will recognize that a streamlined screen may be provided to large-scale sellers who frequently provide products/services for on-line group-buying sales.

FIG. 9 shows an exemplary seller's screen 900 as completed by a particular seller, a Girl Scout troop from Bellevue, Wash., for the sale of a specific lot of goods, Girl Scout thin mint cookies, according to an embodiment of the invention.

The completed seller's screen 900 includes a name field 901, an address field 902, a goods for sale field 903, a maximum quantity field 904, and a description of goods field 905. The name field 901 provides the seller's name, "Troop 36—Bellevue." The address field 902 includes the seller's e-mail address, "troop36@msn.com." The goods for sale field 903 lists the item for sale as "cookies." The maximum quantity field 904 lists 200 boxes as being offered for sale. The description of goods field 905 allows the scouts to describe their cookies in greater detail, including providing an offer to donate some of their profits to charity.

The seller's screen 900 may include an initial price field 906, a minimum price field 907, a minimum sale quantity 908, an order quantity limit 909, an offer reject threshold 910, and a pricing scheme 911. The initial price field 906 indicates that the on-line group-buying sale starting price will be $5.00. The minimum price field 907 states that the lowest price for a box of cookies will be $3.00. The order quantity limit 909 indicates that any number of cookie boxes may be sold to a single customer. The offer reject threshold 910 indicates that any offer at or above $3.00 will be considered "reasonable."

The pricing scheme 911 states that the price curve is defined as on-line group-buying sale automatic mode; e.g., "PowerBuy™ automatic." As previously indicated in this application and related applications, the price curve may be defined in line segments or step-wise. To expand on-line group-buying sales to larger groups of sellers, certain features may be selected in an "automatic" mode so that sellers are not required to understand the intricacies of micro-economics or the pricing tool. In the automatic mode, the pricing tool will render all items selected as "automatic" to be consistent with all other related selections. The pricing tool may include a sophisticated automatic selection mechanism that makes appropriate selections based on the specific type of goods offered, for example, or the pricing tool may include lesser sophistication, such as simply defining the "automatic" mode as being either "line segments" or "step-wise" for all selections. In any configuration, the automatic mode frees the seller from having to understand precisely how the on-line group-buying sale will be conducted. The seller may also actuate a "show me" button 911*a* that illustrates precisely how the automatically selected feature will operate and provide the seller with greater information with which to make an informed choice.

The seller's screen 900 may include a cost curve 912, an ignore scheme 913, a window price 914, a seller's bonus program 915, a buyer's bonus program 916, and product delivery information 917. The cost curve 912 typically defines whether the cost curve is line segment or step-wise. As shown here, the cost curve 912 may be selected in an "automatic" mode that operates similarly to the "automatic" mode described in pricing curve 911. Likewise, the ignore scheme 913 and the window price 914 have also been established to operate in an automatic mode. Each automatic mode selection may include a corresponding "show me" button, e.g., "show me" buttons 911*a*-914*a*.

The sellers have indicated that their participation earns them points in a bonus program 915 while buyers do not automatically earn points in a bonus program 916. The product delivery information field 917 indicates that products will be shipped via UPS at a cost of 50 cents per box.

An abstract for traffic sites 919 field indicates that the sellers have entered the system recognized terms of "King County; Snohomish County; Girl Scouts; Charity; Youth, and Food." Accordingly, a partner site automatically linked to host on-line group-buying sales for one or more of these abstract terms could be configured to provide a link to the scouts' thin mint cookie on-line group-buying sale. Thus, the scouts should attain a super-aggregated demand for their cookie sales efforts. In the event that a particular partner does not operate in an abstract mode, then the partner will only display the scouts' on-line group-buying sale when the partner has selected a category/product in the on-line group-buying sale menu tree that contains the product "cookies."

A seller security/certification data field 919 indicates that the sellers have shown their financial responsibility by providing the name of their bank and a contact person at the bank.

An ordinary artisan will recognize that the seller's screen 900 may include a different number of fields than shown in FIG. 9. In addition, an ordinary artisan will recognize that a streamlined screen may be provided to large-scale sellers who frequently provide items for on-line group-buying sales.

FIG. 10 illustrates an exemplary partner screen 1000 that could be used by a partner to select which on-line group-buying sales to display, according to an embodiment of the invention. The screen 1000 may include the partner's name, such as the King County News Bureau and Shoppers' Net 203.

The screen 1000 contains a display on-line group-buying sale products/services field 1001 that allows the partner to specify a precise product/service. As shown in FIG. 10, the partner has selected to display the product category "food." In addition, if the partner actuates a Search on-line group-buying sale Menu Tree button 1012, then the partner may search all the products/categories in the on-line group-buying sale menu tree and may select additional products/services or categories.

The partner may also select on-line group-buying sales by using an abstract terms field 1002. The partner need not use the abstract terms field 1002, and the partner may select whether the abstract terms will be used either exclusively or non-exclusively with the products/services field 1001. As shown in FIG. 10, the partner has turned on the abstract terms field 1002 and indicated that it will be used non-exclusively with the products/services field 1001. In the abstract terms field 1002, the partner has selected "King County; All-weather gear; Boats/sailing; Computers; Huskies, and Food" as abstract terms. The screen 1000 may also contain a search abstracts button 1003 whose actuation will produce a list of selectable abstract terms. In some embodiments, the abstracts button 1003 may also indicate how many products/services are presently associated with the abstract term in the on-line group-buying sale menu tree. An ordinary artisan can easily develop a variety of alternative schemes, some based upon the volume of products/services available for on-line group-buying sales.

A display links field 1004 allows the partner to determine whether all links will be displayed for abstract terms 1005 by selecting a box 1006 or whether links will only be displayed for some selected number of common abstract terms 1007 by a selecting box 1008. For example, if a partner selected box 1006, then the partner would display on-line group-buying sales for all products/services located by a search of the abstract terms 1002. On the other hand, if the partner selected the box 1008, and indicated two abstract terms, then the partner would display on-line group-buying sales for all products/services having two or more of the abstract terms listed in the abstract terms field 1002. Referring to the partner sites field 919 of FIG. 9 and the abstract terms 1002, if the partner indicated that two abstract terms 1007 were necessary, then the Girl Scouts' thin mint cookies would be available via an on-line group-buying sale from the partner site 203. On the other hand, if the abstract terms 1007 required more than two similar terms, then partner site 203 would not display an on-line group-buying sale of the Girl Scouts' thin mint cookies. Of course, the partner has additionally selected the product/service "food," which may represent a category containing the product "cookies," in which case, the scouts' on-line group-buying sale would be displayed on the partner site 203.

The partner may also decide how the site displays on-line group-buying sale products/services by making a selection in a field 1010, such as selecting a "carousel" display mode in which displayed products/services rotate according a partner-selectable time field 1011, e.g., every 20 seconds. For example, once the partner has submitted this selection, then the rules engine 401 and the display selector 410 would have further guidance in determining which particular on-line group-buying sale to display at a given instance for customers arriving from the partner's site. Of course, one ordinarily skilled in the art can easily imagine other display schemes besides a carousel display mode, such as a weighted display mode where products/services are displayed for differing time periods on some particular basis, such as having a greater number of matching abstract terms than another displayable product/service. Other applicable schemes could include a "random" display scheme or a "shuffle" display scheme.

FIG. 11A illustrates a multi-seller, multi-partner system 1101, according to an embodiment of the invention. The system 1101 comprises an on-line group-buying sale platform 1102, multiple sellers 1104-1106, and multiple partners 1107-1108. A seller/traffic filter 1103 associated with the on-line group-buying sale platform 1102 includes rules for determining which partner sites receive which particular on-line group-buying sale product/service at any given instance. For example, using the thin mint cookie on-line group-buying sale shown in FIG. 9 and the partner site 203 having the characteristics shown in FIG. 10, the seller/traffic filter 1103 would determine when to display the thin mint cookie on-line group-buying sale on the partner site 203. An ordinarily skilled artisan can easily tell that the seller/traffic filter 1103 would perform a high volume of calculations in many multiple seller/multiple partner environments. For example, assume seller groups collectively place 12,000 products into the on-line group-buying sale platform 1102 having connections to 1,000 partner sites. Assume further that each partner site operates in either a carousel, random, or shuffle mode with updates/changes several times per minute. Accordingly, the seller/traffic filter 1103 will be required to provide at least one new display/link every few seconds, depending upon customer volume. Knowing the required throughput of the seller/traffic filter 1103, an ordinarily skilled artisan should be able to identify an appropriate calculation engine to drive the seller/traffic filter's operations. Of course, the seller/traffic filter 1103 could combine features of the rules engine 401 and the display selector 410.

FIG. 11A illustrates sellers inputting on-line group-buying sale product/service data into the on-line group-buying sale platform 1102 via the seller/partner filter 1103. FIG. 11B is a flowchart showing the seller/partner filter's processing of partner tags arriving at the on-line group-buying sale platform 1102 from customers at the partner sites, according to an embodiment of the invention.

The seller/partner filter 1103 receives a tag from a customer at a partner site, e.g. the partner site 1 1107 (step 1109). The seller/partner filter 1103 searches the on-line group-buying sale menu tree using the received tag to locate the respective partner's on-line group-buying sale products/services, e.g. the products, services and categories previously registered by the partner (step 1111).

The seller/partner filter 1103 determines if more than one on-line group-buying sale product/service is available for display to the customer (step 1113). For example, more than one product or service may be available when the partner has registered a product category having multiple products and more than one of those products are currently offered in on-line group-buying sales. If the seller/partner filter 1103 determines that only a single product/service is presently offered in an on-line group-buying sale, then the seller/partner filter 1103 displays to the customer a link to the selected on-line group-buying sale product/service (step 1123).

If the seller/partner filter 1103 determines that multiple products/services are available for display to the customer (step 1113), then the seller/partner filter 1103 examines the partner characteristics data to locate any filtering information provided by the partner hosting the partner site from which the customer's tag originated (step 1115). The seller/partner filter 1103 filters the available on-line group-buying sale products/services using the located partner filter (step 1117). For example, as previously discussed, a partner may indicate that on-line group-buying sale products/services will be displayed on the basis of a carousel arrangement. In such a situation, the seller/partner filter 1103 would determine which of the products/services presently being offered in on-line group-buying sales and previously selected by the partner as a displayable product/service is presently marked for carousel display.

Applying the partner's filter may not necessarily result in a single on-line group-buying sale product/service. Accordingly, the seller/partner filter 1103 determines whether more than one on-line group-buying sale product/service is still available for display (step 1119). If the seller/partner filter 1103 determines that only a single on-line group-buying sale product/service is available for display after filtering (step 1119), then the seller/partner filter 1103 displays to the customer the appropriate link to the on-line group-buying sale product/service (step 1123).

If the seller/partner filter 1103 determines that more than one on-line group-buying sale product/service is still available for display after filtering (step 1119), then the seller/partner filter 1103 applies logic from the on-line group-buying sale platform 1102 to reduce the on-line group-buying sale product/service choices down to a single on-line group-buying sale product/service (step 1121). For example, the on-line group-buying sale platform 1102 may have embedded rules for resolving multiple product/service choices down to a single choice. The seller/partner filter 1103 then displays a link to the on-line group-buying sale product/service to the customer (step 1123).

As previously indicated, the seller/partner filter 1103 will receive numerous tags from customers visiting partner sites. Accordingly, the seller/partner filter 1103 may process customer tags in an essentially endless loop. Of course, as one skilled in the art will recognize, the on-line group-buying sale platform 1102, and/or the seller/partner filter 1103, may contain an ability to terminate processing of the customer tags when necessary, such as a shut down of the on-line group-buying sale platform 1102 for maintenance.

An ordinarily skilled artisan will recognize that some partner sites may allow display of multiple on-line group-buying sale links. In such circumstances, the seller/partner filter 1103 will not need to select a single on-line group-buying sale product/service but will instead determine which of the partner's previously selected products/services are presently active in on-line group-buying sales and display all pertinent links to the customer.

FIG. 12 illustrates the on-line group-buying sale platform 1102 hosting an exclusive on-line group-buying sale, according to an embodiment of the invention. As shown in FIG. 3, the on-line group-buying sale platform may be used to host exclusive on-line group-buying sales for particular manufacturers, merchants, or other sellers. In such arrangements, the on-line group-buying sale platform 1102 essentially partitions a portion of its site off for an exclusive on-line group-buying sale 1202. The Big Animation Co. category 602 provides an exemplary exclusive on-line group-buying sale 1202.

In a completely exclusive on-line group-buying sale, customers 1200 access a Partner Site 1201 where they can access a link 1203 to the exclusive on-line group-buying sale 1202 hosted on the on-line group-buying sale platform 1102. For example, the Partner Site 1201 may represent an entity who does not have the sophistication, or computing power, to host an on-line group-buying sale without resort to the facilities provided by the on-line group-buying sale platform 1102. In addition, the owner of the on-line group-buying sale platform 1102 may decline to license the on-line group-buying sale technology to the Partner Site 1201. In the alternative, the owner can license the on-line group-buying sale technology to the Partner Site 1201 which can then host its own on-line group-buying sales without necessity for using the Power Buy Platform 1102.

FIG. 13 shows a representative data flow that occurs when on-line group-buying sales are selected by an operator of a partner site for use in connection with that site, according to an alternative embodiment of the invention. The data flow shown in FIG. 13 is applicable to both non-exclusive and exclusive on-line group-buying sales. The data flow shown is applicable to the embodiment of the invention in which administration of the on-line group-buying sale is carried out by the owner.

A partner uses the on-line group-buying sale setup tool 400 to indicate in an on-line group-buying sale table 1301 which particular product(s) the partner wants displayed to customers who link to the owner's main site from the partner's site. When the on-line group-buying sale close server 404 begins an on-line group-buying sale, the on-line group-buying sale close server 404 accesses a product table 1302 to determine which partners may display the on-line group-buying sale. Accordingly, the on-line group-buying sale Partner Product Display Page 402 will display the on-line group-buying sale to partners 406-408 provided the partner is identified in the Product Table 1302.

As discussed above, especially with regard to FIGS. 8 and 9, the owner may allow sellers, especially relatively small sellers, to enter products/services into the owner's site for an on-line group-buying sale. The specification thus far has described how the owner may provide facilities for sellers to enter products/services on their own without the specific assistance of the owner in a self-service fashion. Once the products/services have been entered by the seller, then the products/services may be scheduled for an on-line group-buying sale and/or made available for customers to review and study. FIGS. 8 and 9 additionally describe a specific embodiment in which sellers' self-service entries may be selected and/or filtered by partners based on various criteria.

Figure 14:
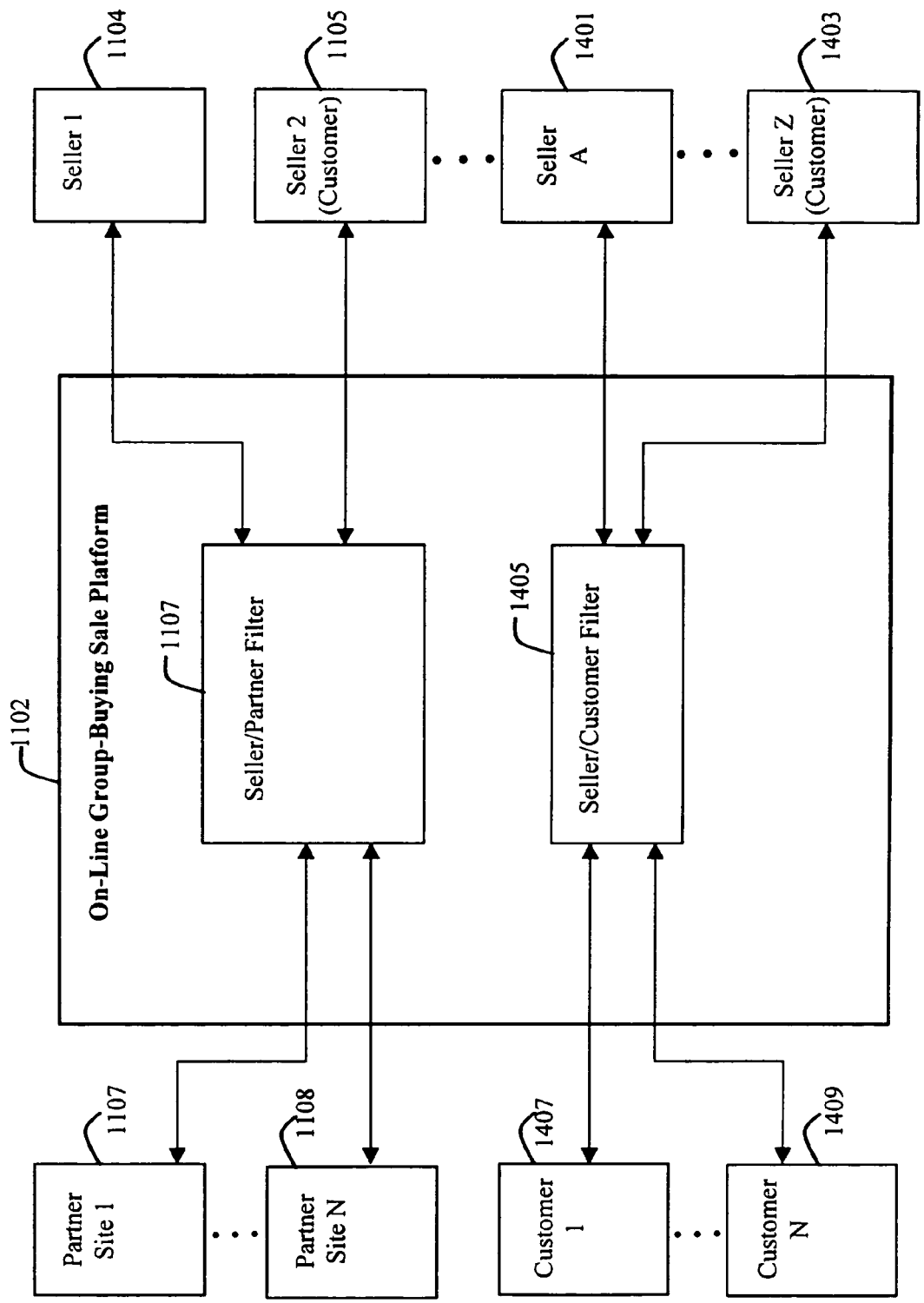
FIG. 14 illustrates an embodiment of the invention in which sellers 1-2, A-Z may use both a seller/customer filter 1405 and the seller/partner filter 1103 when select and entering products/services for customers in on-line group-buying sales on the on-line group-buying sale platform 1102.

FIG. 14 illustrates another embodiment of the invention in which sellers 1-2 1104, 1105 and sellers A-Z 1401, 1403 enter products/services for on-line group-buying sales on the on-line group-buying sale platform 1102. The sellers 1104-1105 may represent any type of seller but typical represent rather sizeable seller/manufacturers whose association with an on-line group-buying sale may often come to the specific attention of the owner and/or specific partners. For example, the seller 1104 may negotiate specific arrangements for selling products/services via on-line group-buying sale with the owner. In other instances, the seller 1105 may also be a partner (e.g., the partner site 1107) such that the seller/partner filter 1103 will direct customers visiting the partner site 1107 to the seller/partner's own products/services offered for sale by on-line group-buying sale (either exclusively or non-exclusively) on the owner's site. In contrast, the seller 1401 and the seller 1403 may represent smaller sellers (e.g., girl scout troop 36 of FIG. 9) who may not have customers visiting a website of their own and/or cannot afford to have customers at their site redirected to the owner's site. Of course, the sellers 1401, 1403 could also represent larger commercial concerns who just choose for a particular sale(s) not to have their product/service available for filtering through the seller/partner filer 1103.

Figure 17:
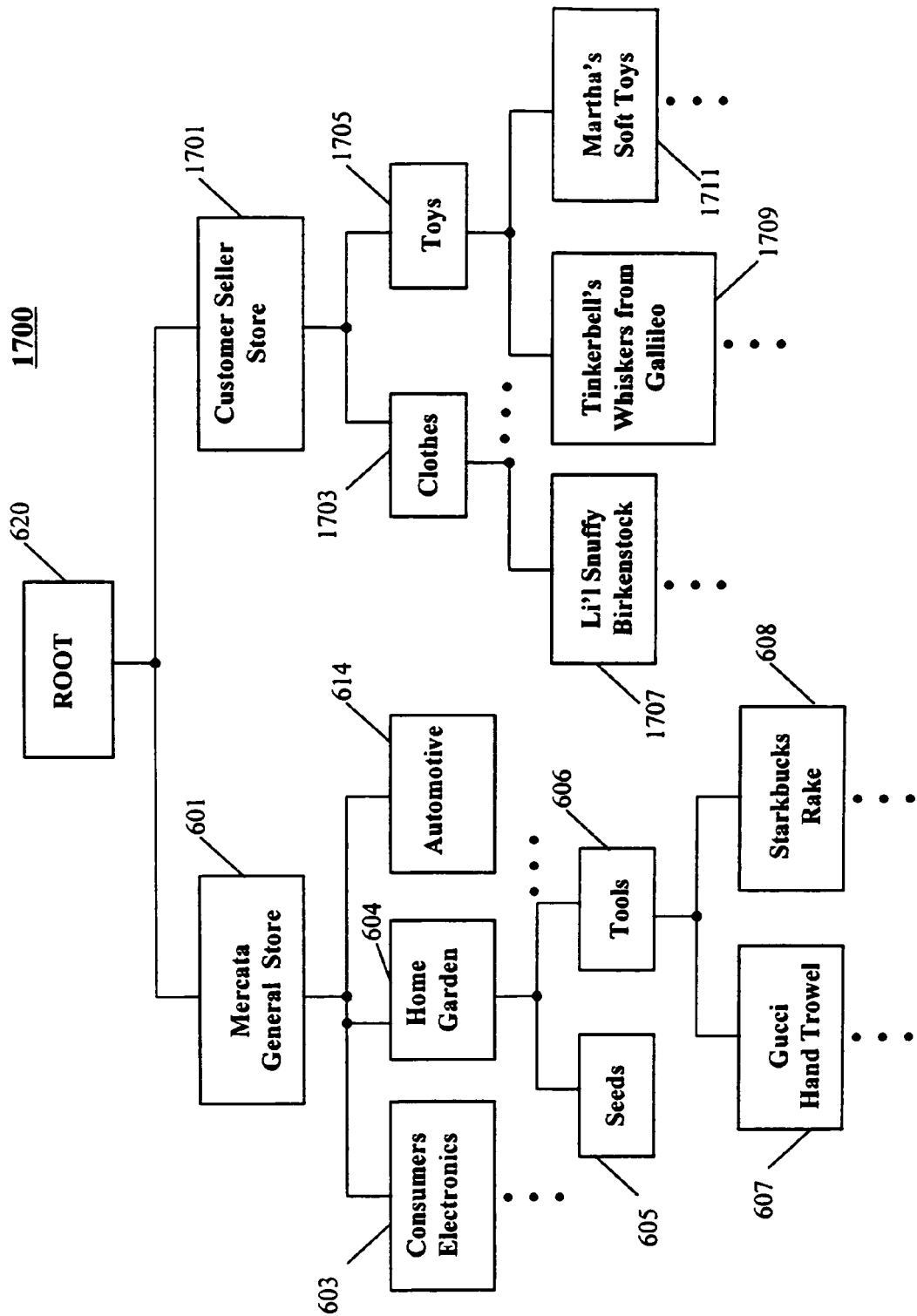
FIG. 17 shows an exemplary tree structure 1700 that may be used to retain on-line group-buying sale product/service data, such as for use in an on-line group-buying sale menu tree, according to an embodiment of the invention.

The owner may arrange for a form of filter other than the seller/partner filter 1103 for the sellers 1401, 1403. A seller/customer filter 1405 may simply represent content of a section of the owner's on-line group-buying sale database that has been marked for non-owner, non-exclusive (partner) on-line group-buying sales, e.g., a sellers' marketplace. The seller/customer filter 1405 may function as a customer self-directed navigation tool configured to follow the product category/featured item logic imparted by the sellers/owner upon the sellers' marketplace. (The customer/seller store 1701 of FIG. 17 represents an exemplary sellers' marketplace.) The owner may create various categories within the sellers' marketplace such that customers 1407, 1409 visiting the owner's site may navigate to specific portions of the sellers' marketplace to see what product/service offerings are available. The customers 1407, 1409 may also arrive at a specific portion of the sellers' marketplace by conducting a search. For example, a customer might enter criteria such as "Appliance . . . Microwave . . . <$250" and receive a list of all the microwave appliances having prices under $250. Of course, the owner need not necessarily partition access to the owner's site on the basis of the owner's own sales (e.g., the Mercata general store), partner sales (e.g., the Big Animation Co.), and sellers' marketplace sales, but such an arrangement is preferred, especially when the volume of expected sales on the owner's site is large, e.g., more than 100 on-line group-buying sales per day. In addition, the sellers may assist the customers in exploring the sellers' marketplace through various product placement choices, as well as various advertisement and featured item display choices. For example, featured items may be listed in bold text and/or may contain a photograph of the featured item.

The seller/customer filter 1405 may operate in an informal manner based on the seller's description of the product/service and the customer's requested criteria, whether through search or navigation through the owner's site. The seller/customer filter 1405 may also accept abstract terms, such as those used in conjunction with the seller's sales of FIGS. 8 and 9. Of course, the owner may provide a sophisticated seller/customer filter 1405 that aids particular sellers on the basis of product placement within the owner's site, such as at locations where many of the customers will likely visit like a homepage and/or in terms of how the seller's description of the product/service is displayed. The owner may further create more elaborate seller/customer filters in which product/services are targeted for particular groups of customers, e.g., on a geographic and/or demographic basis. In additional, the seller/customer filter 1405 may operate in a manner similar to the partner/seller filter in that customers are predirected to particular featured items and/or sets of featured items based upon some known characteristic of the customer, instead of, or in addition to, allowing the customer to navigate about the sellers' marketplace.

Figure 15:
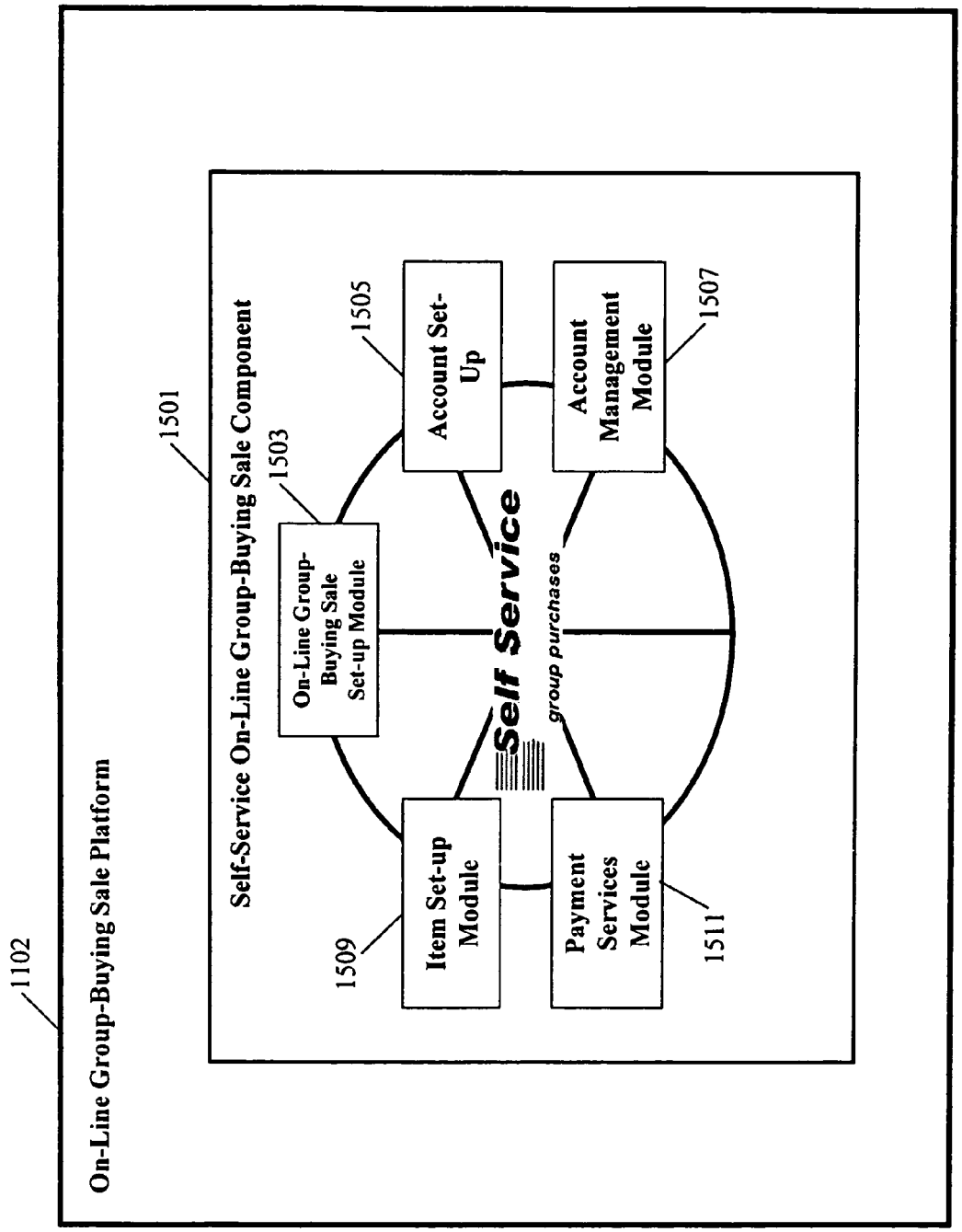
FIG. 15 illustrates various sub-components associated with a self-service on-line group-buying sale component 1501 on the on-line group-buying sale platform 1102, according to an embodiment of the invention.

FIG. 15 illustrates various modules associated with a self-service on-line group-buying sale component 1501 on the on-line group-buying sale platform 1102, according to an embodiment of the invention. Self-service on-line group-buying sale group purchases, such as those operating in conjunction with the seller/customer filter 1405, may include a number of modules, such as an on-line group-buying sale set-up module 1503, an Account set-up module 1505, an account management module 1507, an item set-up module 1509, and a payment services module 1511. The on-line group-buying sale set-up module 1503 provides a capability for sellers to enter the data that directs the course of an on-line group-buying sale for a given product/service or set of products/services. The account set-up module 1505 allows sellers to establish accounts with the owner and the owner's site. The account management module 1507 assists sellers in maintaining their accounts with the owner's site. The payment services module 1511 assists sellers in providing payment to the owner for services provided. The item set-up module 1509 assists sellers in entering the data that describes a given product/service or set of products/services. Each of these modules may be associated with various data entries provided by the customer and/or reporting information provided by the owner. Functionality provided by the modules 1503-1511 will be discussed further hereinbelow and the associated drawings. For example, the account set-up module 1505 typically provides the functionality behind the displays shown in FIGS. 24A-24B. The item set-up module 1509 typically provides the functionality behind the displays shown in FIGS. 31A-31D. The on-line group-buying set-up module 1503 typically provides the functionality behind the displays shown in FIGS. 33-35. The payment services module 1511 typically provides the functionality behind displays such as those shown in FIGS. 39-41. The account management module 1507 typically provides the functionality behind displays such as that shown in FIG. 29.

Figure 16A:
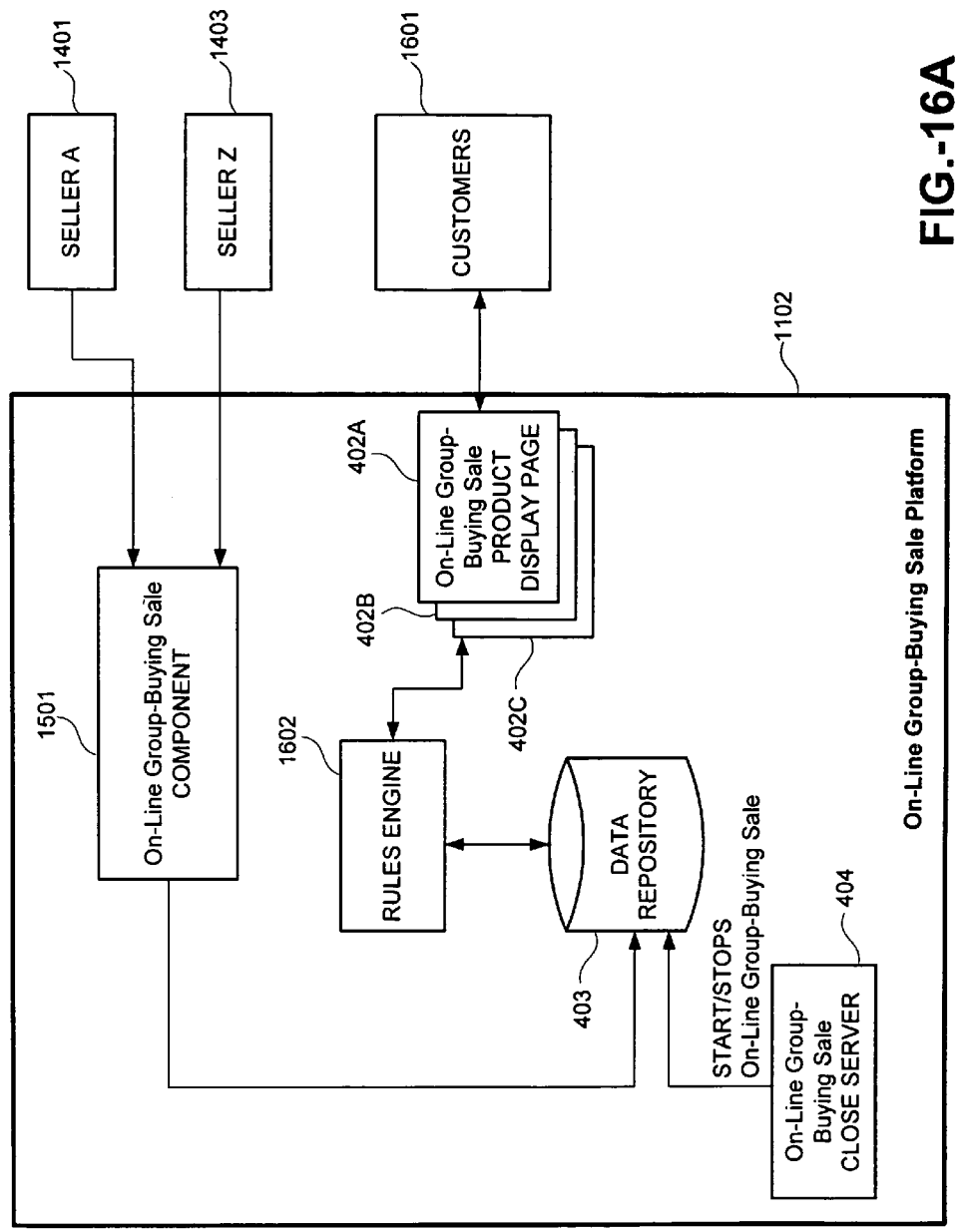
FIG. 16A illustrates how sellers 1401, 1403 may interact with the self-service on-line group-buying sale component 1501 to provide products/services for sale by on-line group-buying sales on the owner's site, according to an embodiment of the invention.

FIG. 16A illustrates how sellers 1401, 1403 may interact with the self-service on-line group-buying sale component 1501 to provide products/services for sale by on-line group-buying sales on the owner's site, according to an embodiment of the invention. As previously discussed, the sellers may use the on-line group-buying sale component 1501 to enter product/services for sale without necessarily having to contact a representative of the owner; e.g., face-to-face negotiations over the terms of the on-line group-buying sale of the seller's featured item. The self-service on-line group-buying sale component 1501, which typically operates on the on-line group-buying sale platform 1102, may operate in conjunction with other on-line group-buying sale tools described in the commonly assigned applications incorporated by reference herein.

From the self-service on-line group-buying sale component 1501, sellers may examine the on-line group-buying sale menu tree, typically stored in the data repository 403, to select specific product/service categories for the featured items they are entering for on-line group-buying sale. As previously discussed, the self-service on-line group-buying component 1501 may include functionality similar to that of the graphical user interface treatments 405 and the on-line group-buying sale setup tool 400. The graphical user interface treatments 405 typically provides instructions regarding the appearance of on-line group-buying sales established through the self-service on-line group-buying sale component 1501, and the on-line group-buying setup tool 400 defines the characteristics of the on-line group-buying sale. FIGS. 18-41 will further describe various aspects of user interfaces that may be associated with self-service on-line group-buying sales.

Customers 1601 may access the on-line group-buying sale platform 1102 and view particular on-line group-buying sale product display pages 402a-402c. A rules engine 1602 typically receives the customers' requests and locates the appropriate information in the data repository 403 so that it may be appropriately displayed to the customers 1601. The customers 1601 may include any group or subsets of the customers discussed herein, such as the customers 104, 105, and 409.

FIG. 16B illustrates how sellers may interact with the self-service on-line group-buying sale component 1501 to provide products/services for sale by on-line group-buying sales on the owner's site and in association with the seller's partners, according to another embodiment of the invention. As previously discussed, the sellers may use the on-line group-buying sale component 1501 to enter featured items for sale without necessarily having to contact a representative of the owner; e.g., face-to-face negotiations for the terms of the on-line group-buying sale of the seller's featured item. Of course, the sellers 1401, 1403 need not necessarily have an association with the partners 406-408, although some customers (e.g., the seller 1403) may maintain such associations. Moreover, as previously discussed, the partners 406-408 are not themselves precluded from accessing the self-service on-line group-buying sale component 1501. The self-service on-line group-buying sale component 1501 may operate in conjunction with other on-line group-buying sale tools described in the commonly assigned applications incorporated by reference herein.

Sellers may examine the on-line group-buying sale menu tree to select specific product/service categories for the featured items they are entering for on-line group-buying sale when accessing the self-service on-line group-buying sale component 1501. In a manner similar to that previously discussed, the graphical user interface treatments 405 may provide descriptions regarding the appearance of on-line group-buying sales established through the self-service on-line group-buying sale component 1501. FIGS. 18-41 will further describe various aspects of user interfaces that may be associated with self-service on-line group-buying sales.

FIG. 17 shows an exemplary tree structure 1700 that may be used to retain on-line group-buying sale product/service data, such as for use in an on-line group-buying sale menu tree, according to an embodiment of the invention. The tree structure 1700 may represent any number of on-line group-buying sale categories/products. In a typical embodiment, each particular node represents a category, a product/service, or both. An operator of the owner's main site may modify the tree structure 1700 to add new nodes to the tree structure 1700, remove old nodes from the tree structure 1700, and/or reorganize the tree structure 1700. The operator may be a human or a computerized support system. In addition, in some instances other parties, such as specific customers, may be allowed to modify the tree structure 500 using the on-line group-buying sale setup tools. As an ordinary artisan will recognize, the on-line group-buying sale setup tools 400 may include safety protocols that prevent a customer-seller (and/or the owner) from making harmful modifications to the tree structure 1700. The tree structure 500 will typically include a single root node 501, although an ordinary artisan could easily develop a rootless tree structure and/or a multi-root tree structure.

Sellers (e.g., customer-sellers) may use the tree structure 500 to define the on-line group-buying sale products/services to display to other customers visiting the owner's site. The owner may store the tree structure 500 in a data repository, such as the data repository 403 shown in FIG. 4. As an ordinary artisan will recognize, a database represents but one suitable data repository.

The tree structure 1700 provides specific on-line group-buying sale product/category entries. In the tree structure 1700, a root node 1720 comprises two child nodes 601, 1701. The node 601 pertains to the owner's set of products/services (i.e., "the Mercata General Store"), and the node 1701 represents products/services submitted by sellers who have accessed the self-service on-line group-buying sale component 1501. Thus, the Customer-Seller Store 1701 represents a root node for sales associated with the self-service on-line group-buying sales.

The customer-seller store 1701 comprises two sub-categories, Clothes 1703 and Toys 1705. The Clothes category 1703 comprises a specific product, a Li'l Snuffy Birkenstock 1707, while the Toys category 1705 comprises two specific products, a Tinkerbell's whiskers from Galileo 1709, and Martha's soft toys 1711. The tree structure 1700 may be updated periodically by the owner and by sellers. For example, Galileo could add to the Toys category 1705 a Chubby Chuckles Tractor and a Chubby Chuckles Whistle and remove the Tinkerbell's whiskers 1709. An ordinary artisan will recognize that the customer seller store 1701 could be combined with the node 601 such that all product/service listings were combined. In fact, the featured item lists could also include the partner selections, as well, such as the partner selections not made available on an exclusive basis. An ordinary artisan will likewise recognize that the customer seller store 1701 could be divided into a number of different stores based on other criteria, such as geographic or interest-based divisions.

Figure 18:
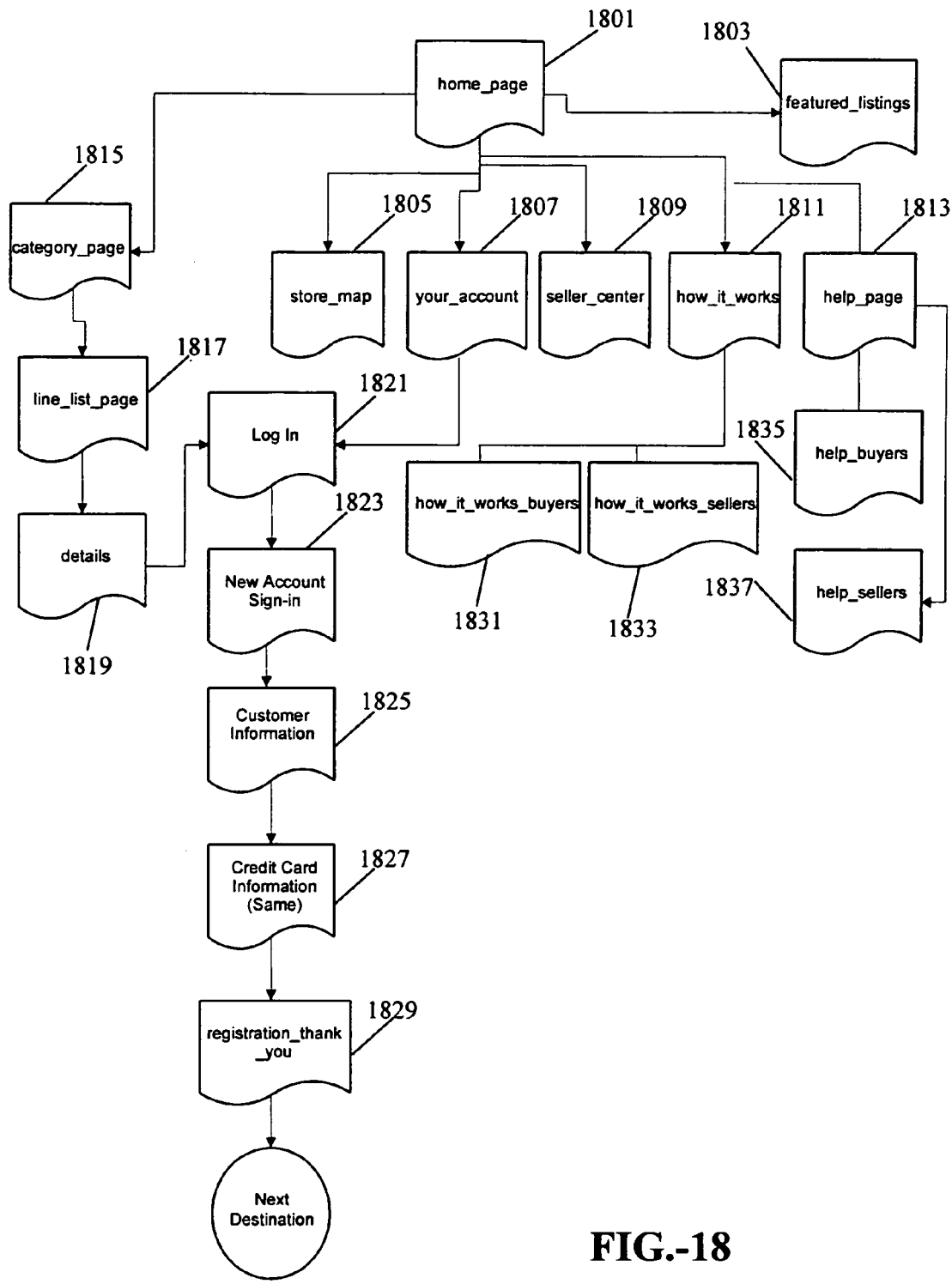
FIG. 18 shows a high-level chart 1800 representing various data entry tasks and status information that a customer may perform on the owner's site, according to an embodiment of the invention.

As previously discussed, the sellers accessing the self-service on-line group-buying sale component 1501 may typically have a number of data entry steps to perform in order to facilitate providing one or more products/services for sale by on-line group-buying sale. FIG. 18 shows a high-level chart 1800 that represents the various data entry tasks and information retrieval tasks that customers (in either the role of buyer or seller) may perform in using the facilities provided by the owner's main site, including the self-service on-line group-buying sale component 1501, according to an embodiment of the invention. The chart 1800 also illustrates an exemplary set of connections (e.g., links) between customer data entry and information retrieval tasks, such as the type typically represented by a site map facility on the owner's site. An ordinary artisan will recognize that the data entry tasks shown in the chart 1800 and the connections between them could be performed in a variety of other ways while still accomplishing the invention.

A home page entry 1801 provides information to customers typically upon their entry into either the owner's site and/or the portion of the owner's site associated with the self-service on-line group-buying sale component 1501. For example, as shown in FIG. 18, the home page entry 1801 is the highest entry-level position. A featured listings entry 1803 provides a list of products/services that the owner, typically, has singled out for special recognition, especially by buyers. The featured listings entry 1803 may include products/services for which sellers have paid the owner a fee in order to be listed in such a presumably prominent location. A store map entry 1805 may describe the self-service on-line group-buying sale facilities, the arrangement of the customer-seller store 1701, and/or the arrangement of the owner's site. As previously mentioned, some owners may choose not to segregate the various on-line group-buying sale types/formats offered on their site (e.g., a Mercata general store, a Big Animation Co., and a customer-seller store). An account entry 1807 provides information to customers about their accounts with the owner, which may include both their accounts as buyers and their accounts as sellers. A seller center entry 1809 provides functionality that assists customers in selling products/services by self-service on-line group-buying sale. The seller center entry 1809 is further described in FIG. 25.

An explanation entry 1811 provides customers with information about on-line group-buying sales. The explanation entry 1811 may provide customers with information about selling products/services as well as buying them via on-line group-buying sale. A help page entry 1813 may provide customers with information to assist them in the proper use of the owner's site. A category entry 1815 provides customers with information related to the product/service categories available on the owner's site. A line list entry 1817 provides customers with information about featured items in a particular category typically in the format of a list of featured items that fall under the category heading. The entry 1817 is typically organized either alphabetically or based on newest featured items listed first. Of course, an ordinary artisan will realize that other list organization schemes may be used. The entry 1817 may even include some items that have been called out for special attention by the owner. Special attention may be indicated by a bold entry or an entry in a different color, for example, as well as listing a featured item higher in the entry 1817 than it would otherwise occur. Such special attention may often be attained due to the payment of a fee to the owner. The product/service details entry 1819 provides customers with information pertaining to details about the line list entry 1817, e.g., information about a specific product/service.

Customers may log in to their accounts from a variety of locations, such as the product/service details entry 1819 and the account entry 1807. A log-in entry 1821 provides a location from which customers may enter the appropriate information necessary for accessing their account, e.g., a user name and a password. A new account sign-in 1823 may be provided to customers who have not previously established an account with the owner. The owner may provide various information of interest to customers using a customer information entry 1825. A credit card entry 1827 may provide customers with a location for entering payment data, such as a credit card number. Of course, customers may use means of paying for on-line group-buying sale services other than credit cards, e.g., bank account routing information, check cards, etc. Owners may provide a customer recognition entry, such as the registration thank you entry 1829. The entry 1829 may be shown to customers before they arrive at their next destination.

In association with the explanation entry 1811, the owner's site may include a buyer's explanation entry 1831 and a seller's explanation entry 1833. The entry 1831 may provide buyers with information about on-line group-buying sales from a buyer's viewpoint while the entry 1833 provides sellers with information about on-line group-buying sales from a seller's viewpoint. Likewise, the help entry 1813 may include a buyer's help entry 1835 and a seller's help entry 1837. The entry 1835 may provide buyers with help services oriented toward a buyer's viewpoint while the entry 1837 provides sellers with help services oriented toward a seller's viewpoint.

Figure 19:
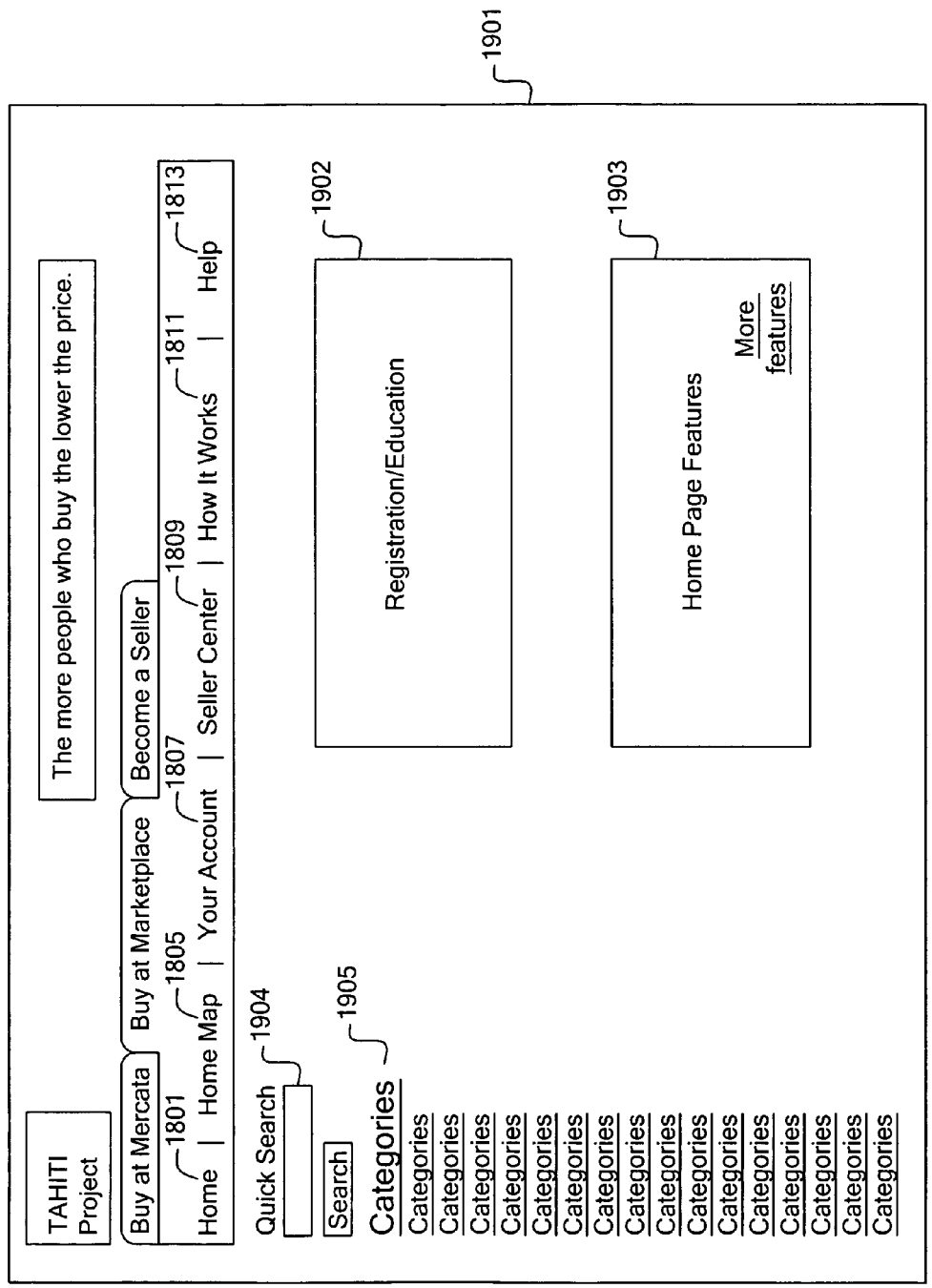
FIG. 19 provides a representative home page display 1901 that would be suitable for display of the home page entry 1801, according to an embodiment of the invention.

FIG. 19 illustrates a representative home page display 1901 that would be suitable for the home page entry 1801, according to an embodiment of the invention. The display 1901 may include a registration and education portion 1902, a home page feature section 1903, a search facility 1904, and a list of on-line group-buying sale categories 1905. As an ordinary artisan will recognize, the display 1901 may include more or fewer sections depending upon a variety of factors, including the owner's perception of customer needs. For example, the education section of the portion 1902 may not be necessary on the portion 1902 if the owner perceives a sufficient degree of sophistication among its customers. The entry 1901 may also include other selections such as a link to the home page entry 1801, a link to the seller center entry 1809, a link to the account entry 1809, a link to the explanation entry 1811, the help entry 1813, and the store map entry 1805. Of course, accessing each of these links typically provides for the user (e.g., customer) an appropriate display based upon the entry selected. The other selections, such as those running across the top of FIG. 19, such as the link to the help entry 1813, may be provided on many of the displays associated with an embodiment of the self-service on-line group-buying sale component 1501 as a way to simplify customer navigation and even as a way to provide the self-service component with a consistent thematic format.

Figure 20:
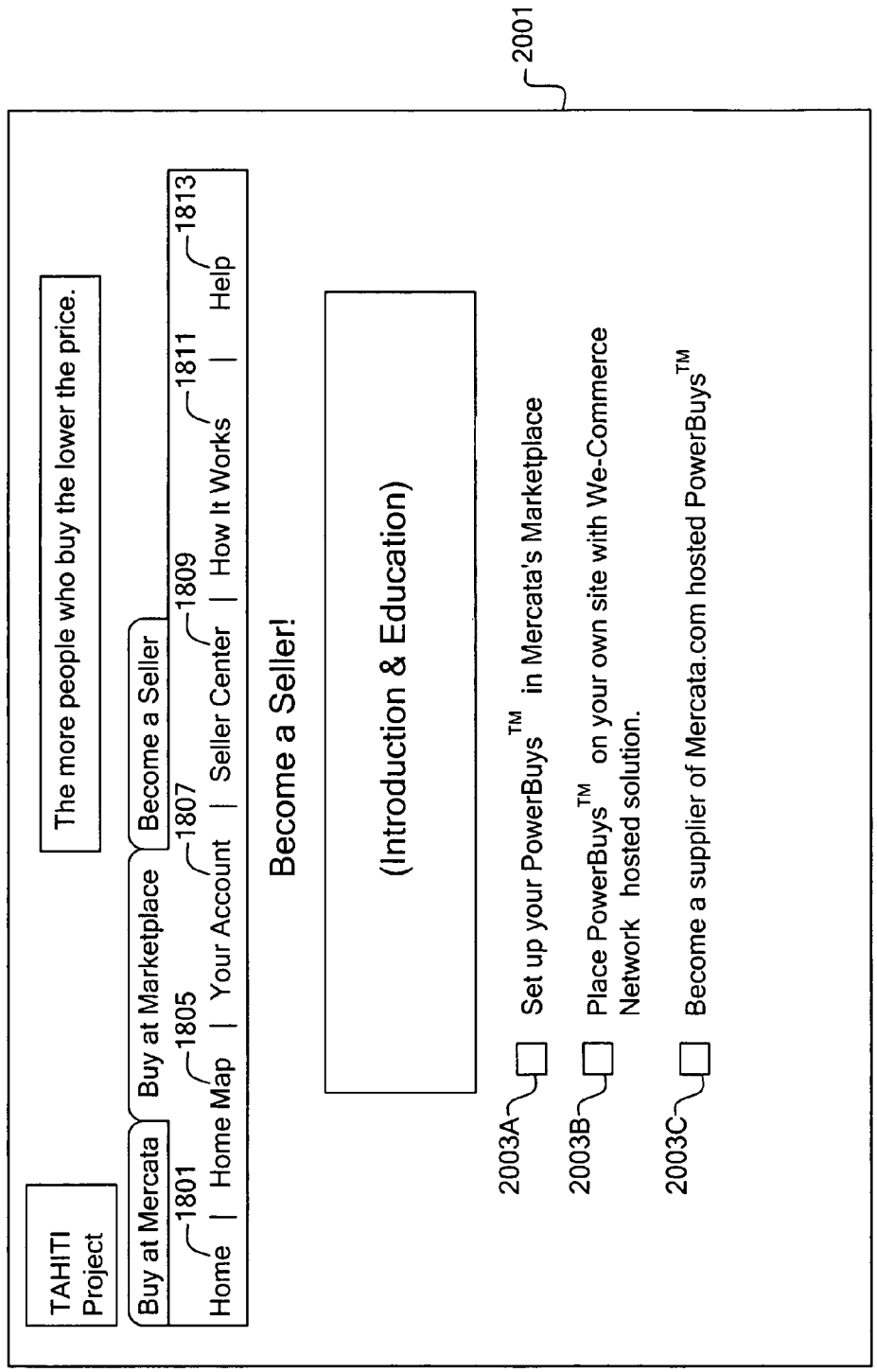
FIG. 20 illustrates a representative seller explanation display 2001 that provides the seller explanation entry 1833, according to an embodiment of the invention.

As discussed above, the owner may provide a variety of help and education entries for the customers. FIG. 20 illustrates a representative seller explanation display 2001 that provides the seller explanation entry 1833, according to an embodiment of the invention. The display 2001 provides an introduction to the concepts and procedures associated with self-service on-line group-buying sales, and the display 2001 also offers sellers more detailed education about self-service on-line group-buying sales. The display 2001 may include hypertext links and/or check boxes 2003a, 2003b, 2003c that facilitate a customer's ability to access the self-service on-line group-buying sale component 1501, such as instructions for setting up an on-line group-buying sale on the owner's site, placing an on-line group-buying sale on the owner's site, and additional information about becoming a seller associated with the owner.

Figure 21:
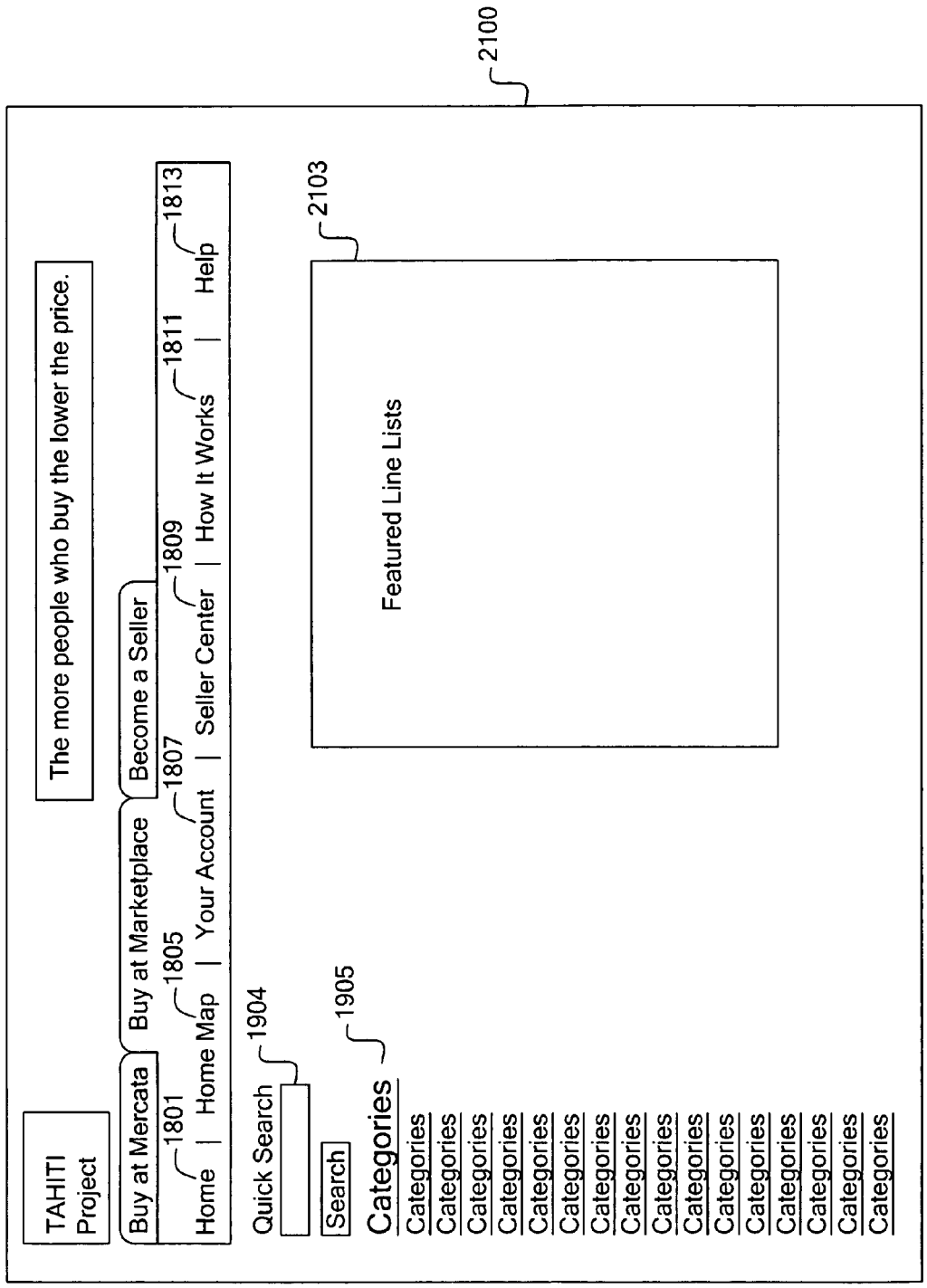
FIG. 21 illustrates a representative category display 2100 that provides the category entry 1815, according to an embodiment of the invention.

FIG. 21 illustrates a representative category display 2100 that provides the category entry 1815, according to an embodiment of the invention. The owner may choose to place listings for particular products/services 2103 on the category page and may charge a fee to sellers for such placements since the volume of customer traffic on the display 2100 is likely to be large. The display 2100 may include the search functionality 1904 and links to other entries available on the owner's site, such as the seller center entry 1809, a link to the account entry 1807, a link to the explanation entry 1811, the help entry 1813, and the store map entry 1805.

Figure 22:
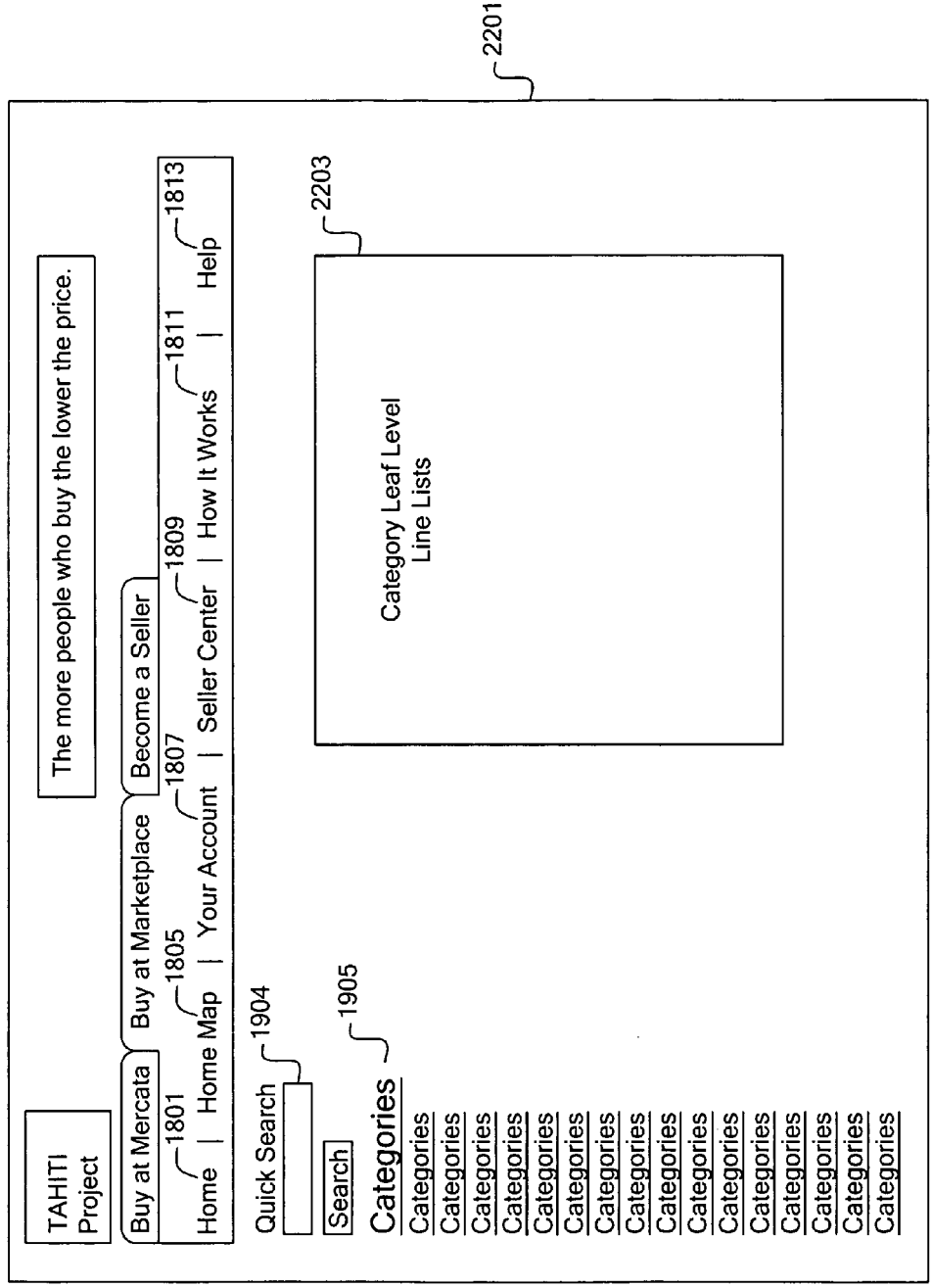
FIG. 22 illustrates a representative line display 2200 that provides lower-level category listings, according to an embodiment of the invention.

FIG. 22 illustrates a representative line display 2200 that provides lower-level category listings 2203, according to an embodiment of the invention. The owner's site is likely to contain a great many products/services. Accordingly, the owner may choose to arrange these products/services in a number of categories and sub-categories, such as those discussed with regard to the tree structure 1700. In at least one embodiment, the owner's site may be arranged such that a customer may select a general category (e.g., "Appliances") from the display 2100 and then be directed to the display 2200 where the customer may then select a narrower category (e.g., "Dishwashers"). Eventually, the customer should arrive at a line list of featured items (e.g., all featured items that satisfy any submitted criteria) from which the customer may then review more detailed information about the featured items that the customer finds interesting. The display 2200 may include a search functionality and links to other entries available on the owner's site, such as the seller center entry 1809, a link to the account entry 1807, a link to the explanation entry 1811, the help entry 1813, and the store map entry 1805.

Figure 23:
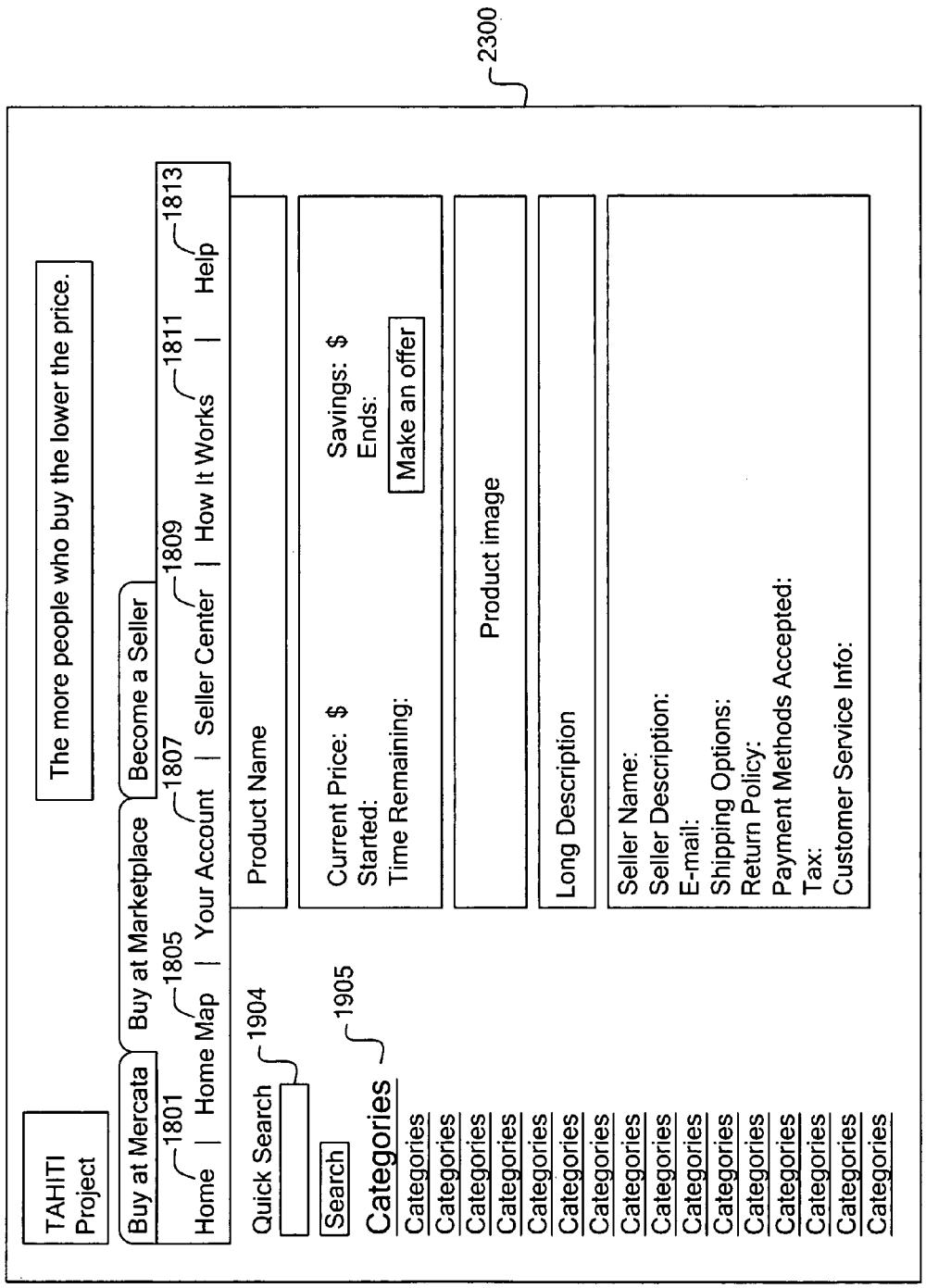
FIG. 23 illustrates a product/service display 2300 that provides the details entry 1819, according to an embodiment of the invention.

The customer may eventually reach a listing for a particular featured item of interest available on the owner's site, e.g., through the owner's own products/services, the partner product/services, or the customer-seller store. As previously mentioned, the owner may choose to segregate the owner's site such that the customer selects a particular store (e.g., the customer-seller store) at some point during the product/service selection procedure such that the products/services listed for the customer's review pertain to the selected store. FIG. 23 illustrates a product/service display 2300 that represents the product/service details entry 1819, according to an embodiment of the invention. The display 2300 may include the product/service's name, information pertaining to the on-line group-buying sale associated with the product/service, the product/service's image, a detailed description of the product/service, and information about the seller. The display 2300 may include other customer-selectable options, as well as an entry into a searching tool available from the owner. For example, the display 2300 may include the search functionality 1904 and links to other entries available on the owner's site, such as the seller center entry 1809, a link to the account entry 1807, a link to the explanation entry 1811, the help entry 1813, and the store map entry 1805.

Figure 24A:
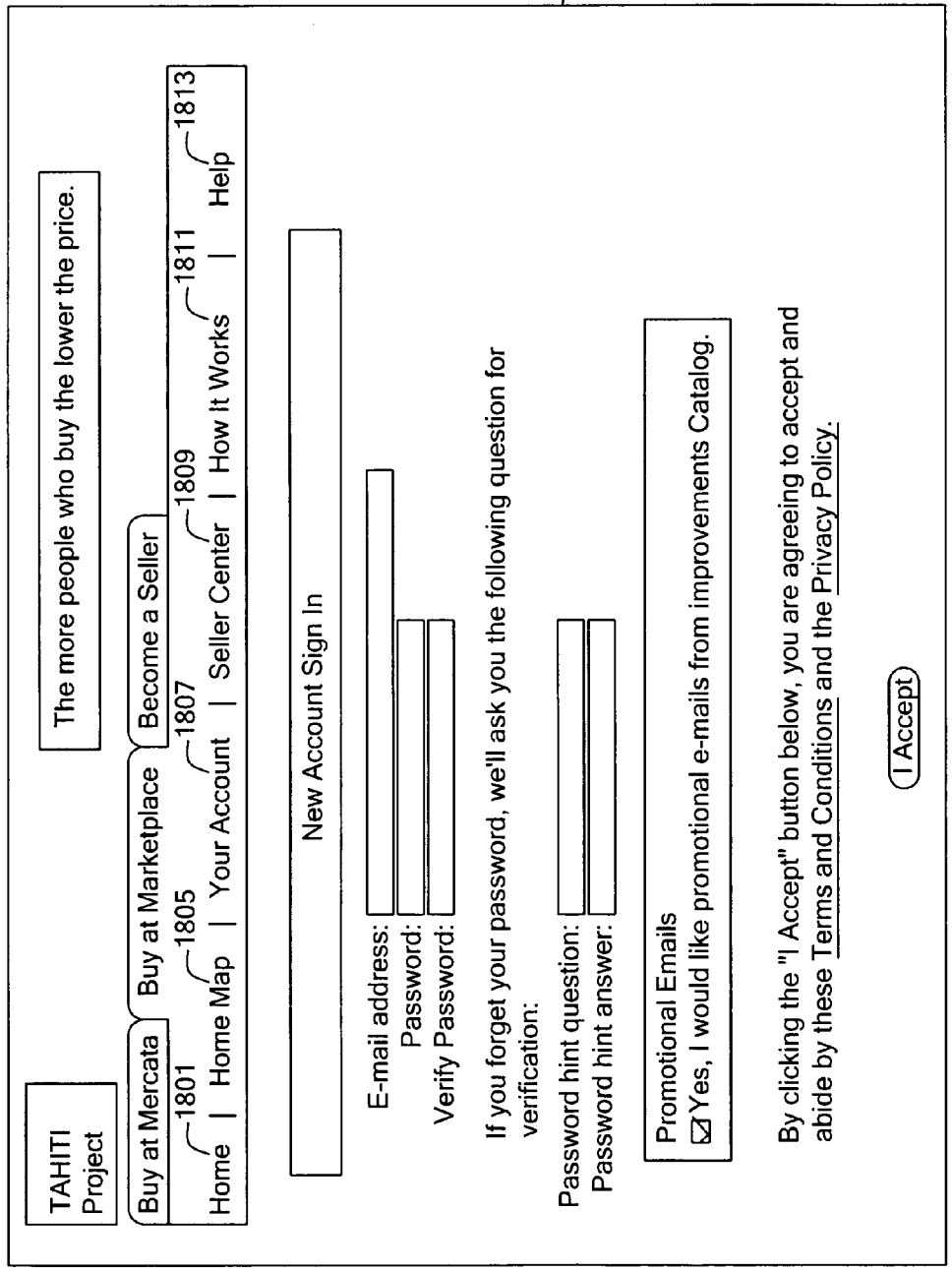
FIG. 24A illustrates a new account display 2400 that provides a portion of the new account entry 1823, according to an embodiment of the invention.
Figure 24B:
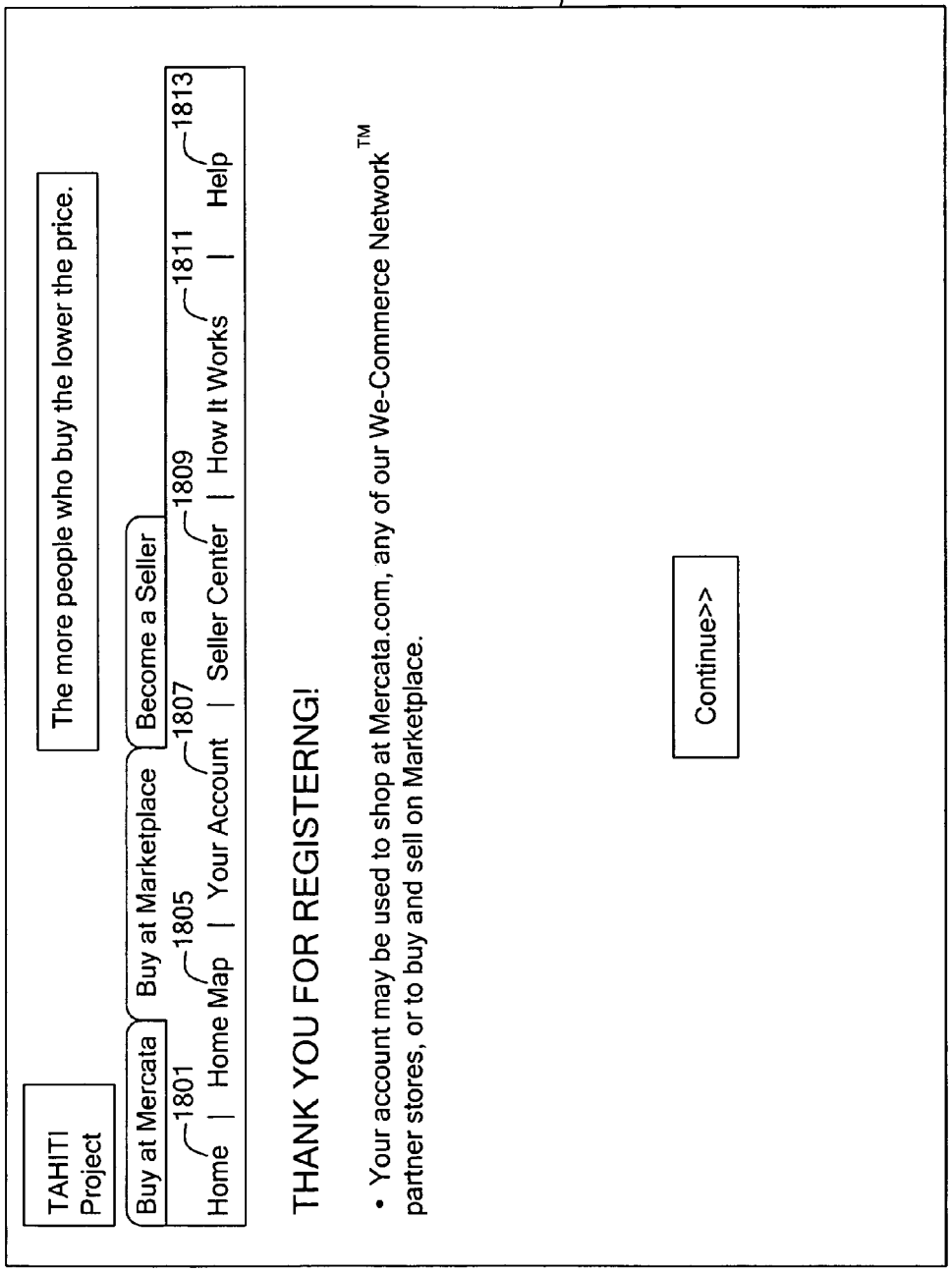
FIG. 24B illustrates a new account display 2401 that represents another portion of the new account entry 1823, according to an embodiment of the invention.

FIG. 24A illustrates a new account display 2400 that represents a portion of the new account entry 1823, according to an embodiment of the invention. The display 2400 receives the customer's identification entries, such as the customer's e-mail address, a password for the new customer, and hint questions and answers for the customer in case the password is forgotten. The display 2400 may also allow the customer to select receipt of additional information and services from the owner, such as receiving the owner's promotional materials. In addition, the display 2400 also asks the customer to confirm his/her acceptance of the owner's terms and policies related to use of the owner's site, which may include any special rules the owner has for self-service on-line group-buying sales. FIG. 24B illustrates a new account display 2401 that represents another portion of the new account entry 1823, according to an embodiment of the invention. The display 2401 may include a "thank you" that may be provided by the owner to the customer upon the customer's completion of the entry procedure. In some embodiments, the display 2401 may be sent to the customer immediately upon the customer's completion of the entries in the display 2400. As an ordinary artisan will recognize, the displays 2400 and 2401 may also be operated in conjunction with various error displays that may be generated when the customer enters incorrect or seemingly inconsistent information.

Figure 25:
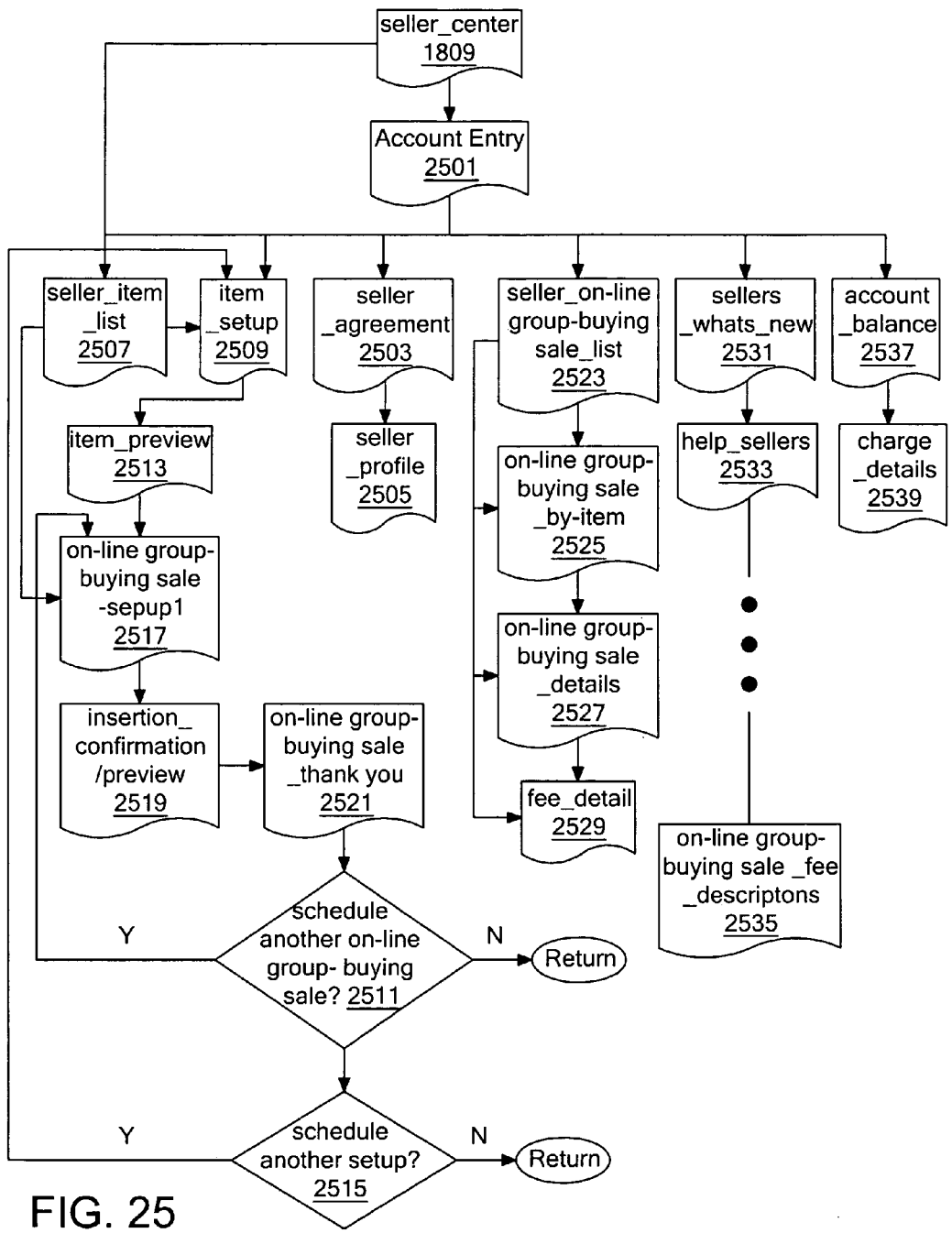
FIG. 25 shows a representative data flow and sub-entries for the seller center entry 1809, according to an embodiment of the invention.

FIG. 25 shows a representative data flow for the seller center entry 1809 and sub-entries related to the seller center entry 1809, according to an embodiment of the invention. The representative data flow shown between entries 2501-2539 illustrates linkages between entries as they could be presented to a prospective seller, according to an embodiment of the invention. An ordinary artisan will recognize that the entries 2501-2539 could be linked together in other manners while still accomplishing the invention.

As previously discussed, the seller center entry 1809 represents a portion of the owner's site designed primarily to assist sellers in the processes and procedures associated with self-service on-line group-buying sales. Accordingly, the seller center 1809 contains a number of sub-entries that may be of interest to sellers during tasks such as registering as sellers, registering products/services for sale by on-line group-buying sale, and monitoring ongoing on-line group-buying sales, as well as other tasks.

A brief overview of the entries 2501-2539 will be provided here, although representative displays related to these entries are discussed in greater detail in FIGS. 26-41. An account entry 2501 allows sellers to establish accounts. A seller agreement entry 2503 provides the owner's seller agreement for review and acceptance by the seller. Sellers may reach the entry 2503 from a number of locations, including the entry 1823. A seller profile entry 2505 allows sellers to submit information about themselves that may be necessary for establishing an account with the owner, as well as providing information to prospective customers.

A seller item list entry 2507 allows sellers to review descriptions of products/services that they have previously submitted for on-line group-buying sale on the owner's site. An item set-up entry 2509 allows sellers to enter new products/services. For example, the item set-up entry 2509 may even be configured to allow sellers to enter their own stock keeping units ("SKUs") for products/services on the owner's site. An item preview display 2513 allows sellers to preview how displays of products/services will appear to customers visiting the owner's site. An on-line group-buying sale set up entry 2517 allows sellers to provide the specific characteristics for one or more on-line group-buying sales of products/services that the seller has provided on the owner's site. An insertion confirmation preview entry 2519 allows sellers to review the on-line group-buying sale characteristics that they have established. An on-line group-buying sale thank you entry 2521 represents the owner's acknowledgement of the seller's entries. The owner may ask the seller via decision point 2511 and decision point 2515 if the seller would like to schedule another on-line group-buying sale and/or enter another product/service. The decision points 2511 and 2515 may save the seller from the trouble of having to re-negotiate through the owner's site to reach the point where new product/services may be entered and/or on-line group-buying sales scheduled.

A seller on-line group-buying sale list entry 2523 provides a list of scheduled and ongoing on-line group-buying sales for a given seller. An on-line group-buying sale by item entry 2525 provides a list of on-line group-buying sales for a given product/service. As previously discussed, a seller may choose to have more than one on-line group-buying sale for a given product/service. Sellers may find that customer feedback (e.g., specific comments and exhibited customer demand) from earlier sales helps the seller "fine tune" the specific characteristics of later sales. An on-line group-buying sale details entry 2527 may provide detailed information about past, present, and future on-line group-buying sales. A fee detail entry 2529 may provide information regarding the various fees that may be assessed by the owner for providing on-line group-buying sale services to sellers.

A new services entry 2531 may provide information to sellers about new procedures and/or services offered by the owner. A seller's help entry 2533 offers advice and assistance to questions that sellers may have. An on-line group-buying sale fee descriptions entry 2535 may provide information regarding the owner's fees and may even include testimonials from other sellers regarding the reasonableness of the fees and/or how selecting some additional owner-offered service improved the various sellers' on-line group-buying sale results.

An account balance entry 2537 provides information to sellers regarding the status of the seller's account. A charge details entry 2529 may provide a specific list of charges that the owner has assessed against the seller.

In a given embodiment of the invention, the entries 1809, 2501-2539 may each be implemented as a specific display(s)

to be presented to customers visiting the owner's site. The displays provided in FIGS. 25-41 may be developed in such a manner so as to provide sellers with a web-based interface into the owner's site, according to a preferred embodiment of the invention. While an ordinary artisan will recognize that other seller interfaces (displays) could be developed, a web-based interface has the advantage of simplifying a seller's interactions with the owner's site. A web-based interface should also free most sellers from having to acquire and/or learn any new software tools in order to conduct on-line group-buying sales on the owner's site since the seller may simply use a familiar program such as a web browser.

FIG. 26 is a representative seller center display 2601 that would be shown to sellers upon selecting the seller center entry 1809, according to an embodiment of the invention. The display 2601 serves as an entry portal through which sellers may reach the portions of the seller center of interest to them. The display 2601 also provides introductory information to sellers about self-service on-line group-buying sales and offers the sellers an opportunity to find answers to their questions about self-service on-line group-buying sales and other related topics. The display 2601, like other self-service on-line group-buying sale displays, may contain ways for the sellers to relocate to other entries (e.g., links to the owner's home page entry 1801), as well as viewing a map of the seller center 1805, to receive information about an existing account 1807, to receive information about the seller center 1809, to read a discussion of how self-service on-line group-buying sales work 1811, and to enter into a help section 1813.

Figure 27A:
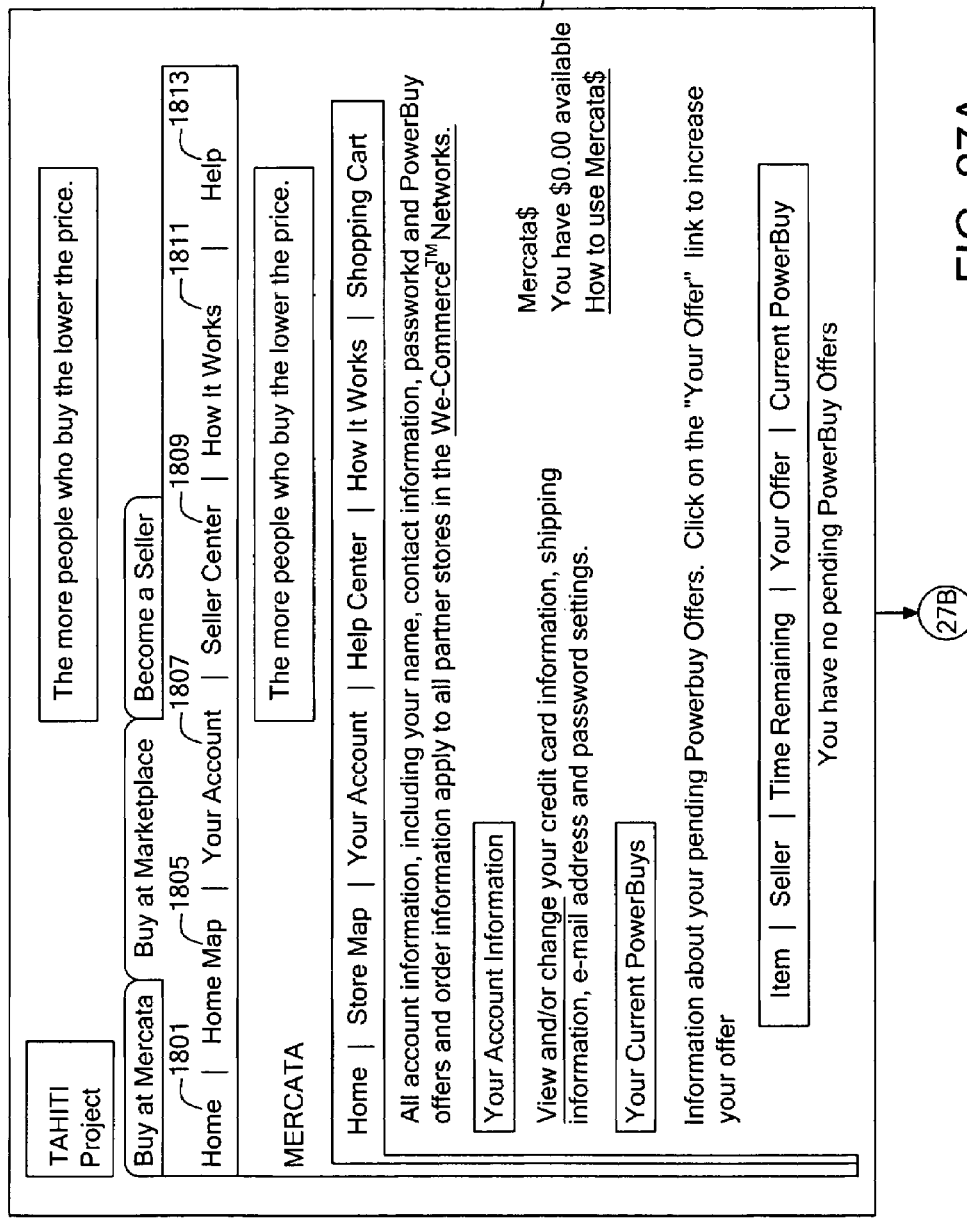
FIG. 27 is an account display 2701 that may be shown to a seller who has selected the account portion entry 2501, according to an embodiment of the invention.

From the display 2601, a seller may choose to navigate to information about the seller's account, such as the account portion entry 2501 that may present a user interface similar to that shown in account display 2701 in FIG. 27. The account display 2701 may provide general information about the seller's account, on-line group-buying sales offered by the seller, orders placed by the seller for other products/services, and account history information. Of course, not all of this information needs to be displayed, and in some embodiments additional information may be provided. The account display 2701 may also include links to other portions of the self-service on-line group-buying sale component 1501 as well as to other functionality.

In a preferred embodiment, the account display 2701 is produced by a JavaScript Page ("JSP"), which is also known as a JavaServer Page. JSPs provide a programming vehicle for displaying dynamic content on a Web page, which represents a preferred data display page for self-service on-line group-buying sales. An ordinarily skilled artisan will recognize that other programming tools may provide similar functionality, such as Microsoft Active Server Pages ("ASPs").

The seller may next choose to review the owner's seller agreement entry 2503, such as that shown in agreement display 2801 in FIG. 28. While the seller may typically review the seller agreement entry 2503 at any time, the agreement entry 2503 must normally be completed by the seller before the owner will permit the seller to provide products and/or services for sale by an on-line group-buying sale. The seller agreement entry 2503 may contain terms that the owner deigns appropriate and may typically include affirmations by the seller that the seller is of legal age, that the seller understands that the agreement is binding, and that the seller intends to conduct himself or herself in a legitimate manner. As an ordinary artisan will recognize, the terms of the seller agreement entry 2503 may change over time and by location due to changes in the laws and legal interpretations related to such agreements.

After completing the seller agreement entry 2503, the seller may create a seller profile entry 2505 such as that provided by profile display 2901 shown in FIG. 29. The profile display 2901 contains background information about the seller, such as the seller's name, a description of the seller's business, the seller's e-mail address, the seller's preferred shipping options, the seller's return policies, payment methods accepted by the seller, where taxes may apply, and customer service information. Of course, the profile entry 2505 does not necessarily need to contain all the information shown in the display 2901, and in some instances, the profile entry 2505 may even contain more information than that shown in the profile entry 2505. The seller may typically alter and/or update previously submitted profile information at any time.

Figure 30:
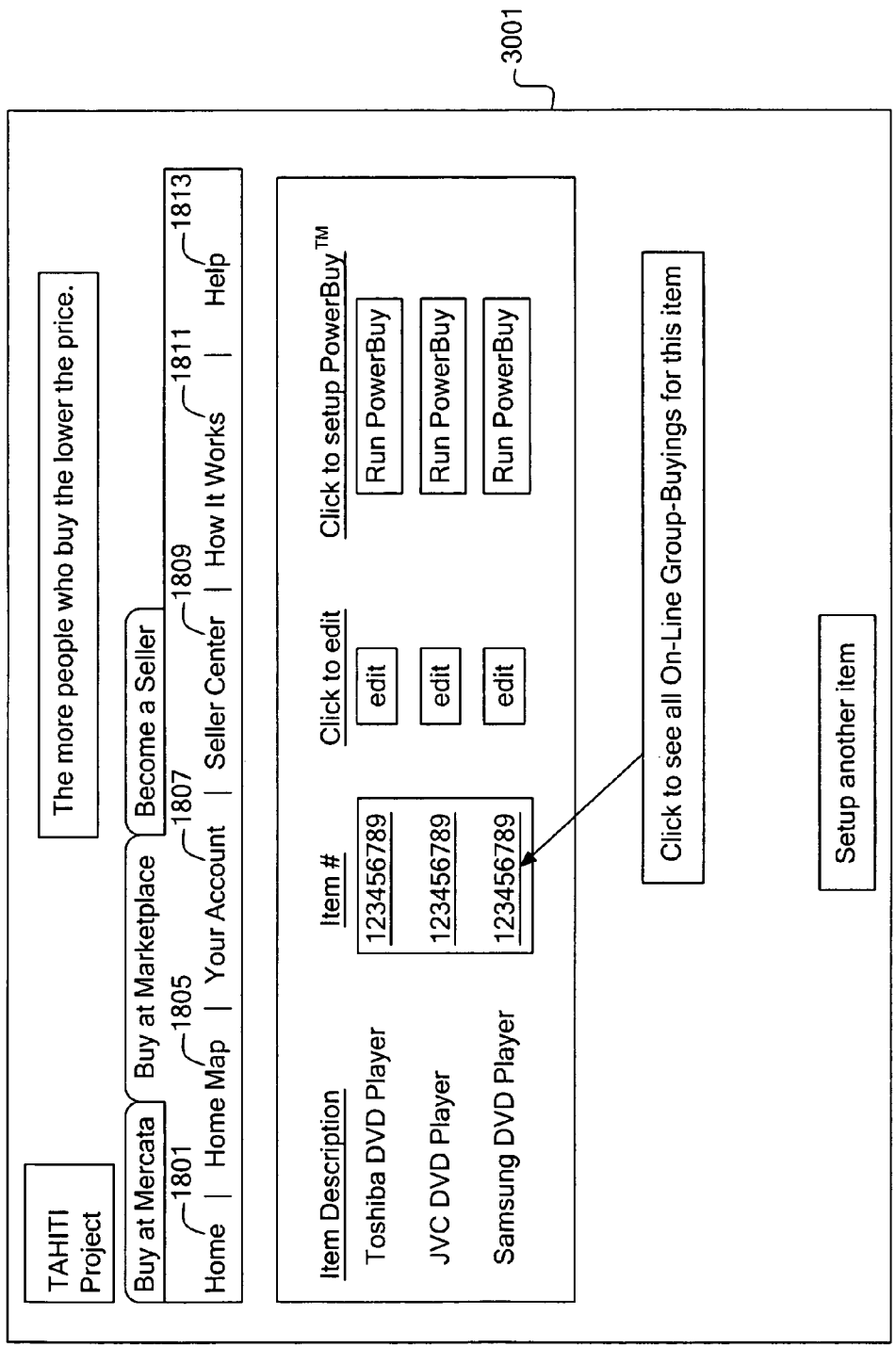
FIG. 30 is an on-line group-buying sale display 3001 of the seller's on-line group-buying sale list entry 2507, according to an embodiment of the invention.

From time to time, the seller may wish to review a display of the seller item list entry 2507 that contains previously submitted on-line group-buying sales, such as on-line group-buying sale display 3001 shown in FIG. 30. The display 3001 allows the seller to initiate modification of the description for previously submitted products/services and also allows the seller to modify the on-line group-buying sale setup for sale of these featured items. The display 3001 may also contain a link that allows the seller to navigate to the data entry point for describing new products/services for on-line group-buying sales. As an ordinary artisan will recognize, the display 3001 may be produced in a variety of ways and does not necessarily need to use hypertext as a technique for allowing a seller to retrieve information. The owner's site may include functionality that deletes seller product/service entries and/or seller on-line group-buying sales after some period of inactivity. In addition, the owner may even terminate a seller's account after a given period of inactivity.

Figure 31A:
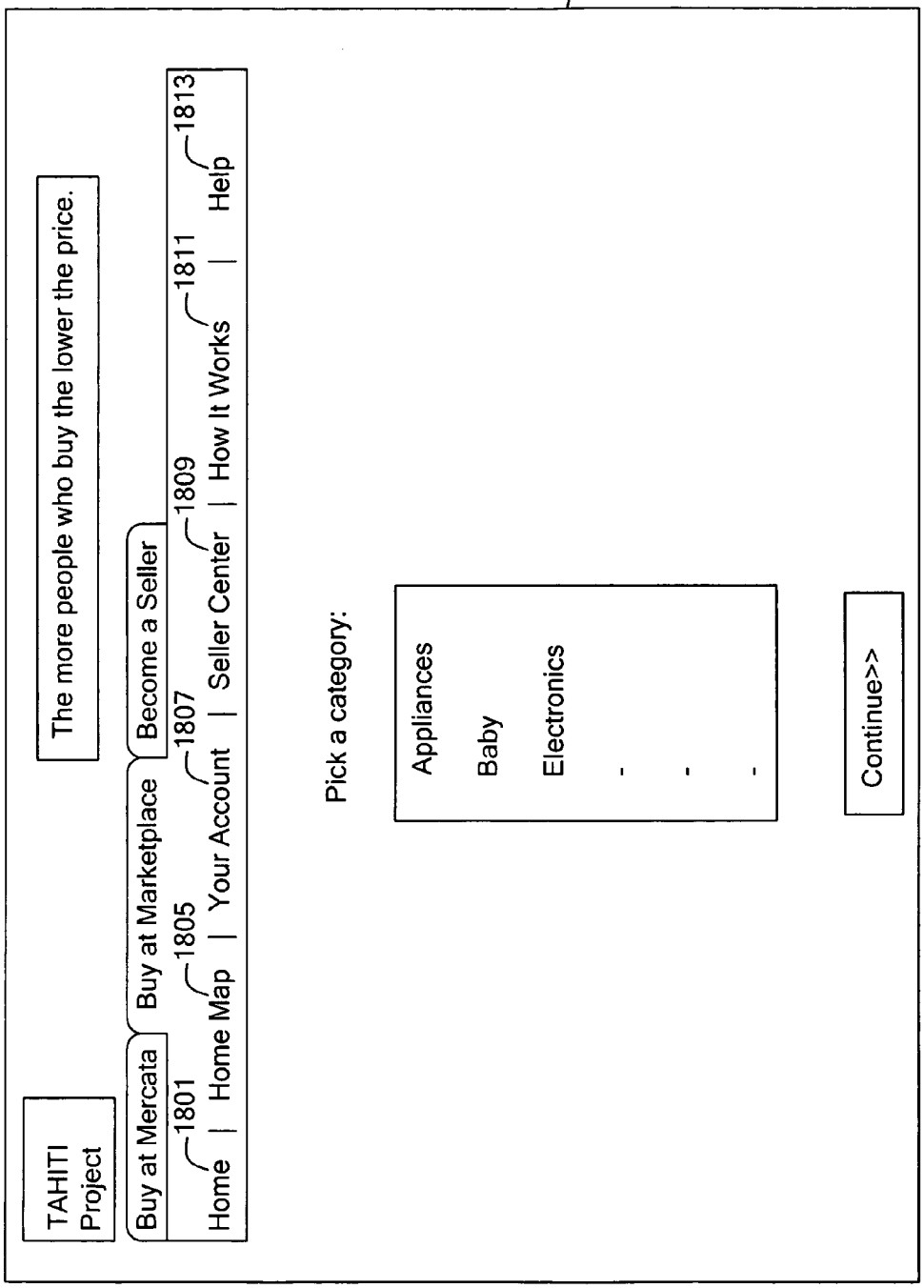
FIGS. 31A-31D provide exemplary displays that may help a seller select product/service categories and other entries associated with self-service on-line group-buying sales, according to an embodiment of the invention.
Figure 31B:
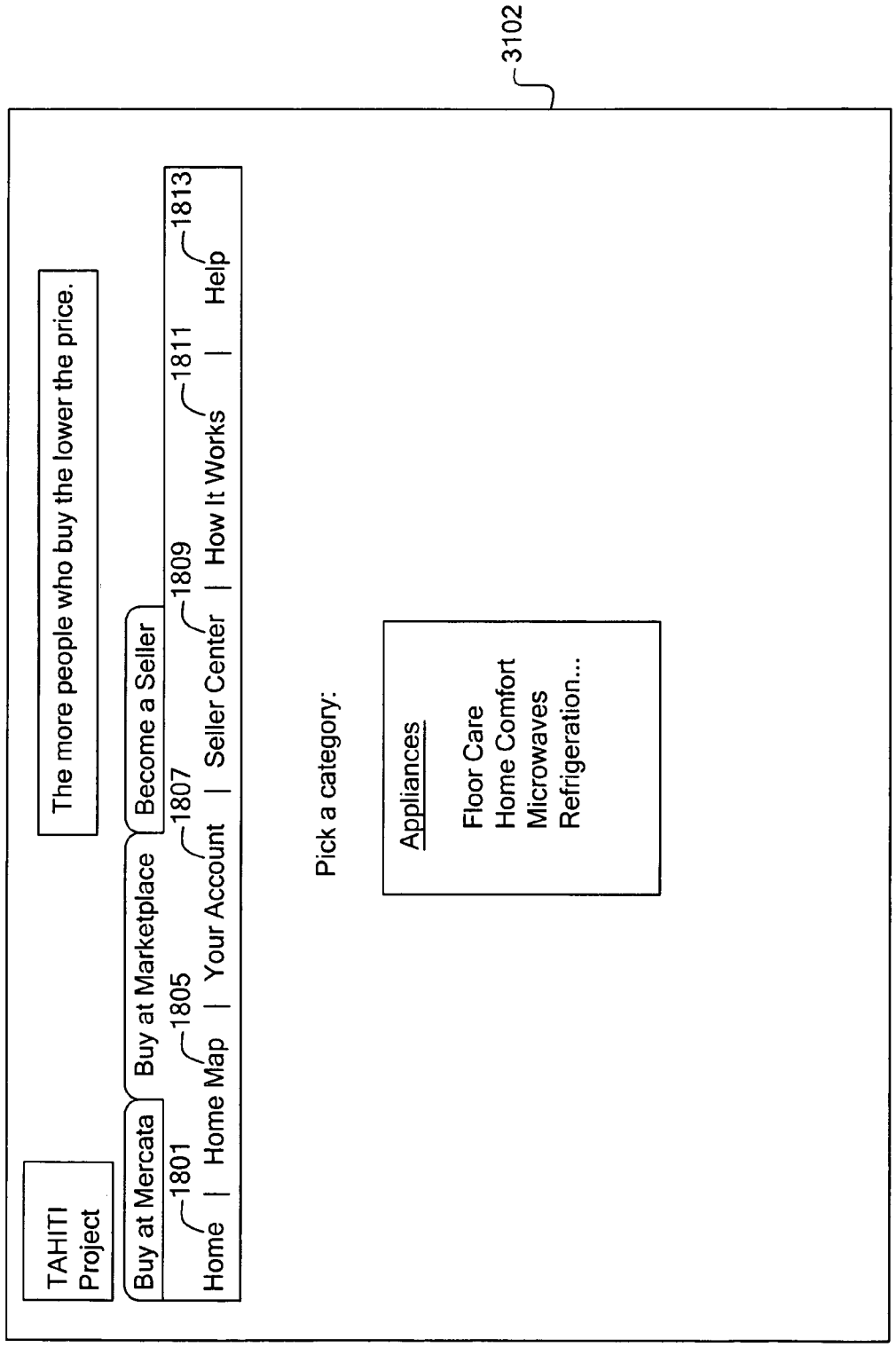
Figure 31C:
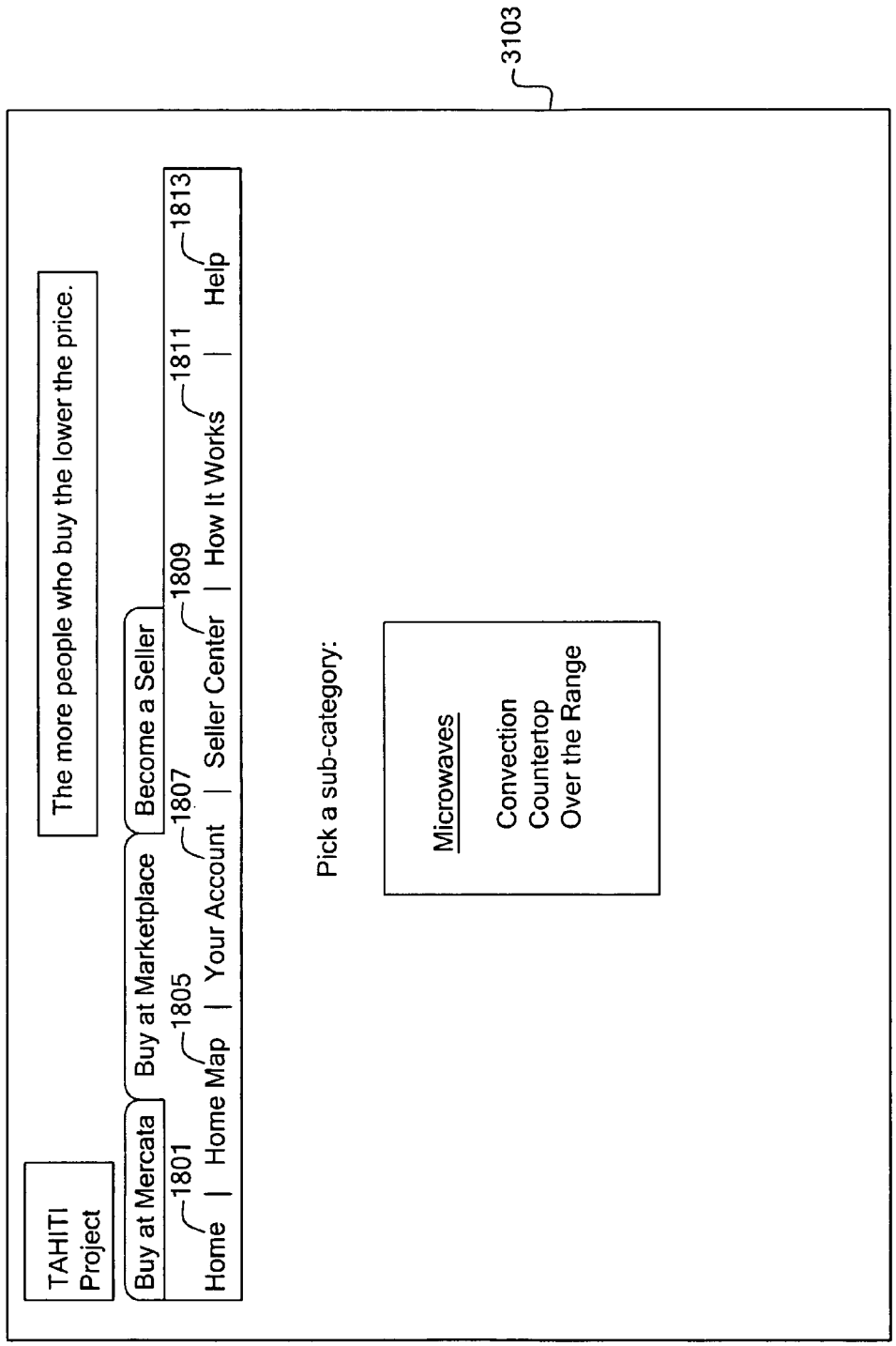
Figure 31D:
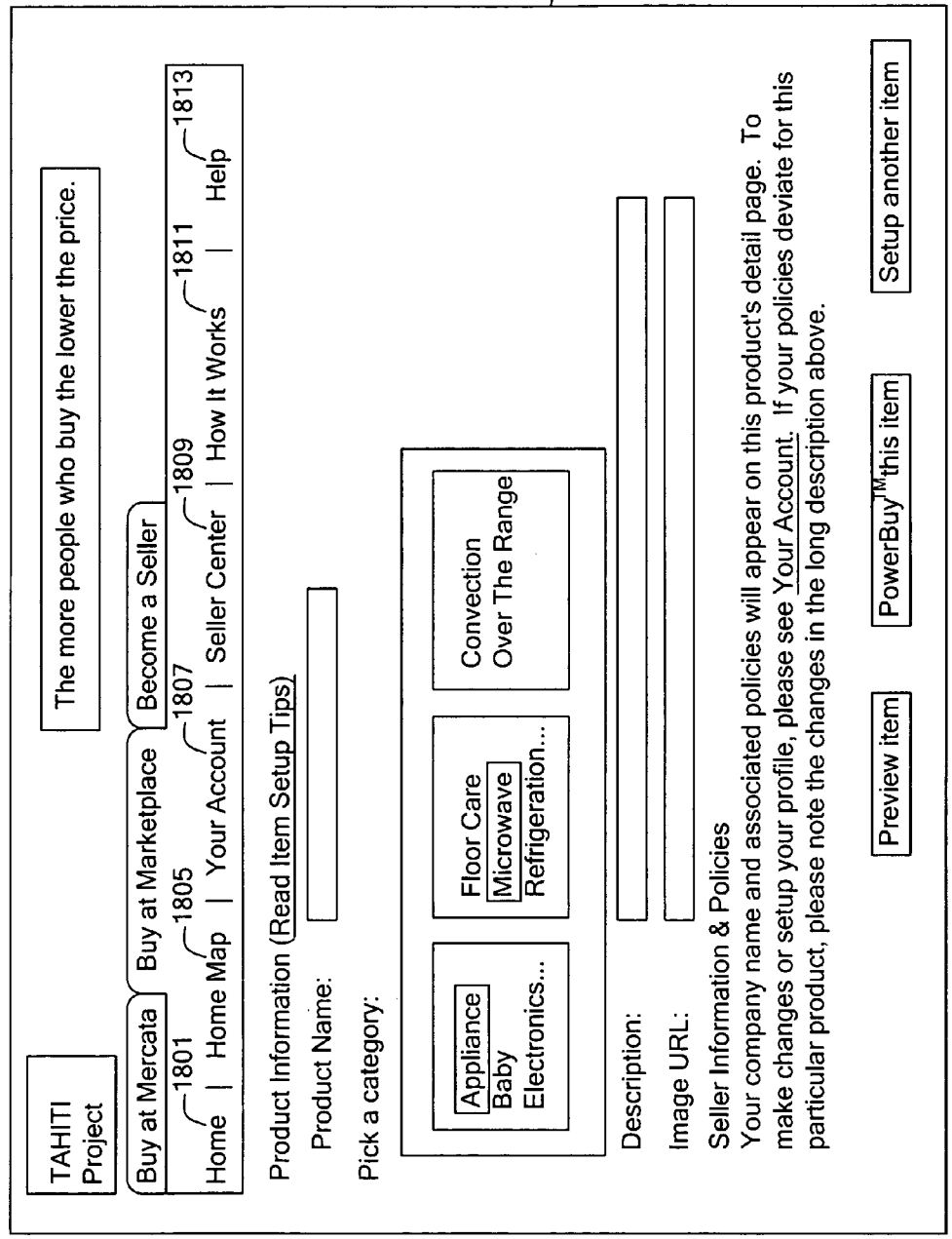
Figure 32:
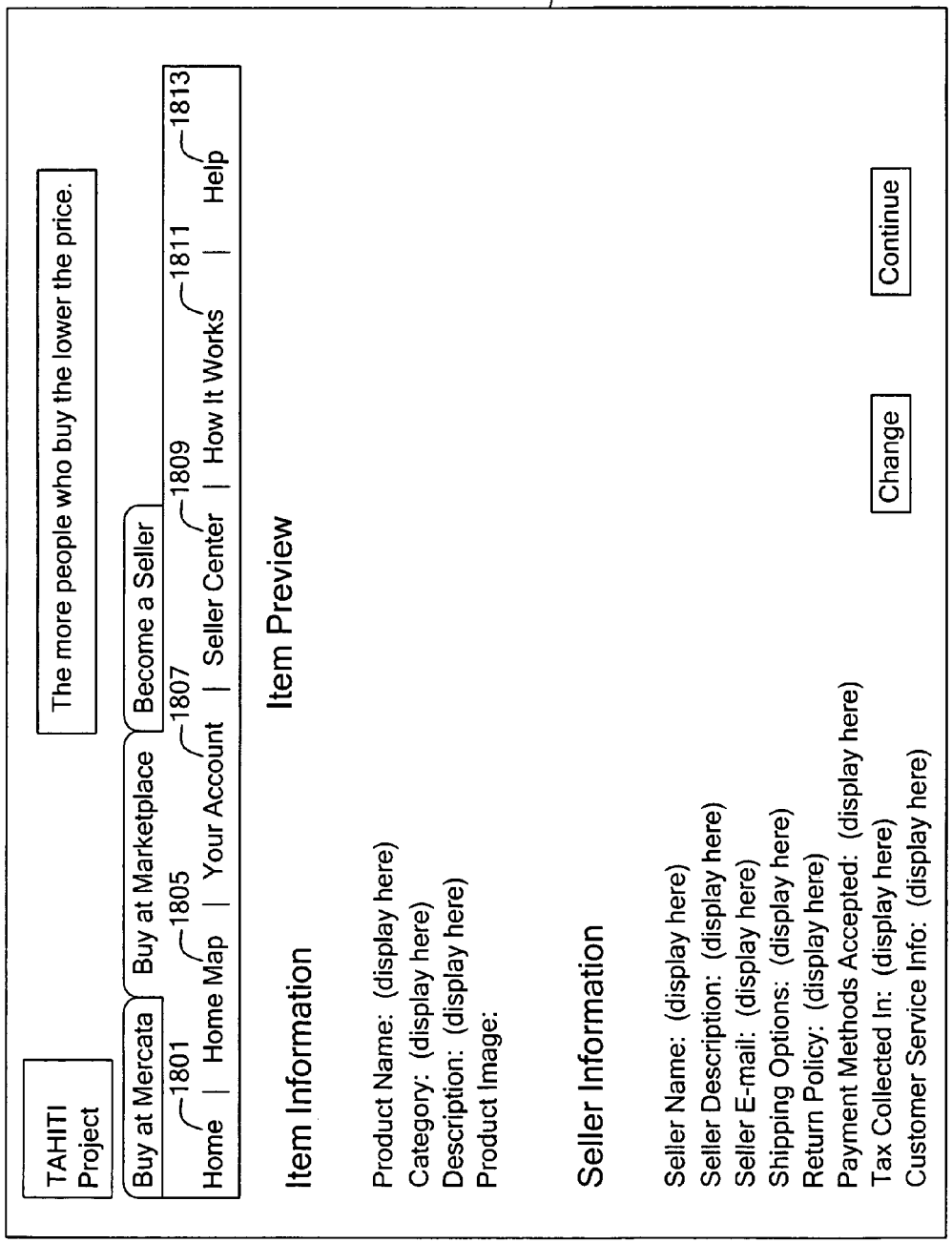
FIG. 32 is a preview display 3201 that provides sellers with the item preview entry 2513, according to an embodiment of the invention.

Sellers may also provide descriptions of new products/services for sale by on-line group-buying sales. A seller may first select a general category in which to list the product/service to be sold, according to an embodiment of the invention. For example, display 3101 shown in FIG. 31A provides exemplary categories such as "Appliances," "Baby," and "Electronics." After selecting a general category, the seller may then be asked to select a somewhat more specific category. For example, display 3102 shown in FIG. 31B provides exemplary categories such as "Floor Care," "Home Comfort," "Microwaves," and "Refrigeration" under the general category of "Appliances" (see FIG. 31A). When a large number of products/services are made available for sale by on-line group-buying sales, the owner may consider having many subcategories, with each subcategory typically representing increasing product/service specificity. For example, display 3103 shown in FIG. 31C provides the additional subcategories of "Convection," "Countertop," and "Over the Range" under the category of "Microwaves" (see FIG. 31B). As an ordinary artisan will recognize, the owner/operator of the on-line group-buying sale platform may choose to configure the product menu tree, or a similar structure, in a variety of ways, some of which may provide more or fewer product/service categories than others. An ordinary artisan will also recognize that the owner may allow the seller to list the same product/service in more than one category. For example, the seller may choose to list blank videotapes in both a "Media" category and a "Video" category.

The seller's ability to enter new products/services may be facilitated by the ability of the seller's computer to access and use programs and/or scripting languages designed to facilitate client-server applications across an electronic network, such as Java and Javascript. Of course, the seller may interact with the owner's site without such capabilities, although it is preferable that the seller's computer has an ability to use such applications, which are commonly associated with web browsing programs. The seller will not necessarily need to write programs in the client-server programming language, rather the seller's computer may access client-server programs on the owner's site that facilitate the seller's ability to enter new products/services. Given the general state of the art in the relevant field(s), an ordinary artisan should have sufficient skill to understand how to write such programs for an embodiment of the invention in light of the description provided herein. Of course, the owner will typically provide alternate procedures for sellers who cannot access programs written in languages such as Javascript.

Along with selecting an appropriate product/service placement category, the seller may also choose to provide a description of the product/service. Accordingly, embodiments of the self-service on-line group-buying sale may include a set-up display entry such as set-up display 3104 shown in FIG. 31D. The display 3104 provides the seller with a place in which to provide a name for the product/service offering, a space for providing a description of the product/service, and a space in which to provide a link to an image of the product/service, such as a link to a Universal Resource Locator ("URL"). The display 3104 may also provide the seller with an overview of the seller's product/service placement selections for the featured item. The display 3104 may further provide the seller with information about the forthcoming on-line group-buying sale for the featured item, allow the seller to preview the on-line group-buying sale description, permit the seller to link to a data entry point for specifying data about the on-line group-buying sale characteristics, and allow the seller to setup another item for sale by on-line group-buying sale, according to an embodiment of the invention.

Once the seller has completed the setup procedure, the seller may want to review how the product/service description will appear to potential buyers on the owner's site. Thus, the self-service on-line group-buying sale component 1501 may provide the item preview entry 2513, such as item preview display 3201 shown in FIG. 32, according to an embodiment of the invention. The display 3201 may provide the product's name, its category, a written description, and an image of the product. The display 3201 may also include information about the seller, such as the seller's name, a description of the seller's business and policies, the seller's e-mail address, payment methods, shipping policies, whether and where tax may be collected, and other customer service information. The display 3201 preferably includes an editing function configured to allow the seller to change information that is incorrect or inapplicable to a given sale.

Sellers may also indicate the sale characteristics for a given on-line group-buying sale. For example, the on-line group-buying sale setup entry 2517 may be provided to the seller in a format such as on-line group-buying sale setup display 3301 shown in FIG. 33. The display 3301 allows the seller to enter the product/service's name, an item number for the product/service (if the seller or the owner has assigned one), the quantity of the product/service available for sale, a starting price, a minimum price floor (this price typically represents the price that that on-line group-buying sale cannot go below without first obtaining the seller's permission), the maximum number of units that may be sold to a particular buyer, the date on which the sale should begin, and a time duration for the on-line group-buying sale. To assist the seller in selecting appropriate information for the product/service's on-line group-buying sale, the display 3301 may include helpful information, such as the time and time zone during which the owner begins and ends on-line group-buying sales. Of course, the owner may allow sellers to select a precise time for beginning an on-line group-buying sale in some embodiments of the invention.

The display 3301 may further include other seller selections for display of the on-line group-buying sale to potential buyers, such as providing a listing in bold text, whether the product/service will be included as a category feature (e.g., listing a particular seller's Microwave Oven at the beginning of the Appliances category), whether the product/service will be displayed on the owner's homepage as a featured item, and whether the product/service will be listed as being a special bargain (e.g., a "Hot Icon"). According to a preferred embodiment of the invention, each of these additional selections will typically be made available to sellers upon payment of a fee. For example, having an item provided as a category feature may cost $10 per day.

As previously discussed, some partners may arrange for their on-line group-buying sales to be presented to a restricted customer set; e.g., customers who arrive at the owner's site via the partner's site. In addition, partners may also use the self-service on-line group-buying sale component 1501, as previously discussed. Accordingly, the display 3301 may also include an on-line group-buying sale exclusivity box 3304 that allows the seller to indicate a level of exclusivity for a featured item's on-line group-buying sale.

Similarly, sellers may also use the exclusivity box 3304 with coupon codes. In this embodiment, the exclusivity box 3304 can be used by a seller to limit access to an on-line group-buying sale to only those customers having a particular coupon code. The customer (e.g., buyer) might obtain the coupon code through a number of mechanisms, e.g., from a particular ad or by virtue of being a member in a particular club, etc. In this embodiment, the seller could use the exclusivity box 3304 to indicate that prospective buyers may need to enter a coupon code to participate in the on-line group-buying sale and may even provide the code that the buyers may need to enter.

Of course, the owner need not necessarily use the exclusivity box 3304 in the self-service on-line group-buying sale component 1501, and even when the owner's chooses to use the exclusivity box 3304, the owner need not necessarily make the box 3304 available to all sellers. However, the box 3304 would typically be used by the owner's partners who provide featured items for self-service on-line group-buying sales and/or other sellers who make more than casual use of the on-line group-buying sale component 1501. The owner may charge a fee to the sellers for use of the exclusivity box 3304. As an ordinary artisan will recognize, the box 3304 could be located on a display other than the display 3304.

Embodiments of the invention may provide a facility that links the self-service on-line group-buying sale features with the partner selection features, as discussed, for example, in connection with FIGS. 10-12. Moreover, the owner may allow some sellers to use the self-service on-line group-buying sale feature and also provide a partner (who may also be one of the same sellers) with an exclusive on-line group-buying sale of the product/service entered by one or more of the sellers.

From the display 3301, the seller may also elect to insert the product/service into the list of forthcoming on-line group-buying sales. Accordingly, the display 3301 may include on-line group-buying sale insertion functionality (e.g., a "continue" button) whose actuation will cause the self-service on-line group-buying sale component 1501 to insert the seller's product/service into the list of forthcoming on-line group-buying sale sales on the owner's site.

As previously discussed, the owner's self-service on-line group-buying sale capabilities may be designed to assist sellers who have limited computing facilities. For example, a web-based interface may be used. In addition, at the conclusion of an on-line group-buying sale, the seller may receive an e-mail that contains the names and addresses of the customers who have purchased the seller's products/services. The display 3301 may include a check box, or other similar functionality, for allowing the seller to indicate that an e-mail list of purchases would be desirable. In addition, the owner might provide hypertext that would present other similar options to the seller. Likewise, the seller may ask to receive update e-mails from the owner during the on-line group-buying sale of the seller's products/services. Sellers may find the update e-mails helpful with regard to how they conduct present and future on-line group-buying sales.

The self-service on-line group-buying sale component 1501 typically provides the seller with the insertion confirmation report entry 2519, which may have a format similar to confirmation display 3401 shown in FIG. 34. The display 3401 repeats the product/service information to the seller, such as the product's name, along with the seller's policies, such as the seller's accepted payment methods, according to an embodiment of the invention. The display 3401 may include functionality such as a "confirm" button whose actuation sends an indication to the self-service on-line group-buying sale component 1501 that the seller acknowledges the correctness of the information provided in the display 3401.

Figure 35:
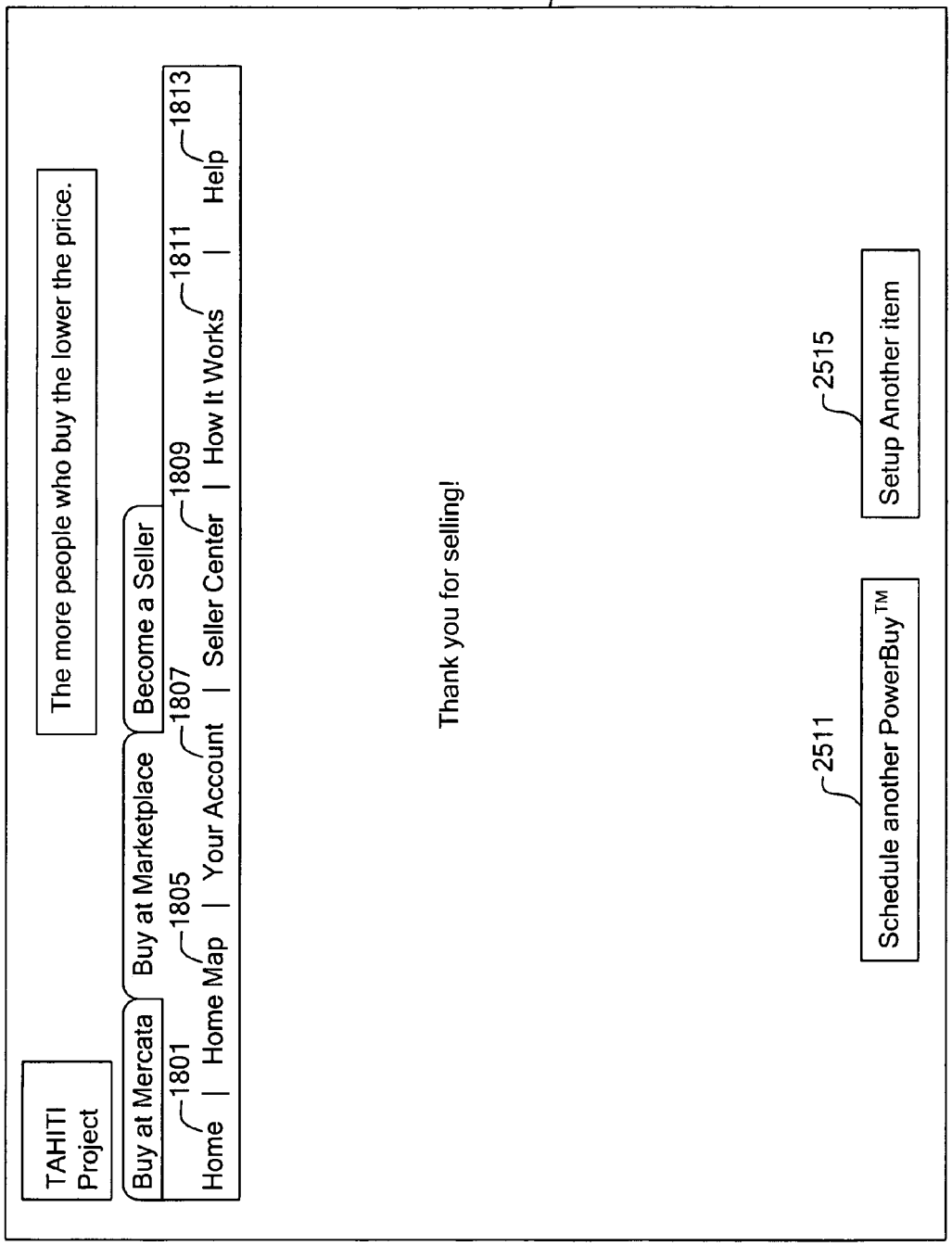
FIG. 35 is an acknowledgement display 3501 that provides sellers with the self-service on-line group-buying sale acknowledgement report 2521, according to an embodiment of the invention.

When the seller initiates the scheduling of a product/service for an on-line group-buying sale, the self-service on-line group-buying sale component 1501 may provide the acknowledgement report entry 2521 in a format such as display 3501 shown in FIG. 35. The display 3501 acknowledges and thanks the seller for scheduling an on-line group-buying sale, and the display 3501 allows the seller to optionally return to either the data entry points for scheduling another on-line group-buying sale 2511 or the data entry points for setting up a product/service for an on-line group-buying sale 2515. Of course, the seller may elect to engage yet another activity instead.

The seller may wish to review the on-line group-buying sale list entry 2523 which may contain information related to the seller's current, future, and/or past on-line group-buying sales. FIG. 36 illustrates an exemplary list display 3601 that displays a given Seller's on-line group-buying sales. The display 3601 includes operating instructions, such as explaining that the seller may use hypertext links to review more detailed information like a breakdown the on-line group-buying sale fees. The seller may review and, where necessary, edit data such as the on-line group-buying sale start and end times, the item number, and the product/service description. The seller may also monitor an ongoing on-line group-buying sale and review information such as the number of committed offers from buyers and the total number of buyer offers received for the product/service. The seller may also review items such as the current price of the featured item in the on-line group-buying sale, the quantity available for sale, and the owner's fees for providing on-line group-buying sale services to the seller. The seller may also be able to view the actual or prospective revenue from an on-line group-buying sale, which would typically be calculated as:

Revenue=(Committed Offers×Current Price)−Fees

As stated above, the owner may provide the seller with a capability for reviewing individual on-line group-buying sale data, such as the item list entry 2525. FIG. 37 provides an exemplary item display 3701 that shows information related to a series of on-line group-buying sales for a given product/service over time. As previously discussed, a seller may wish to provide products/services in more than one on-line group-buying sale. The item display 3701 shows historical data for on-line group-buying sale sales of a specific type of DVD player by a seller. The display 3701 includes the starting and ending dates for the on-line group-buying sales, the number of committed offers, the total number of offers, the final price, the number of units sold, the seller's inventory available for the sale, and the fees assessed for the sale. The display 3701 may also include information such as the seller's revenue for each sale. As previously discussed, sellers may find that review of historical data for on-line group-buying sales allows them to more precisely determine consumer demand and/or times when consumer demand for a product/service reaches optimum levels for the seller's overall sales goals.

Figure 38:
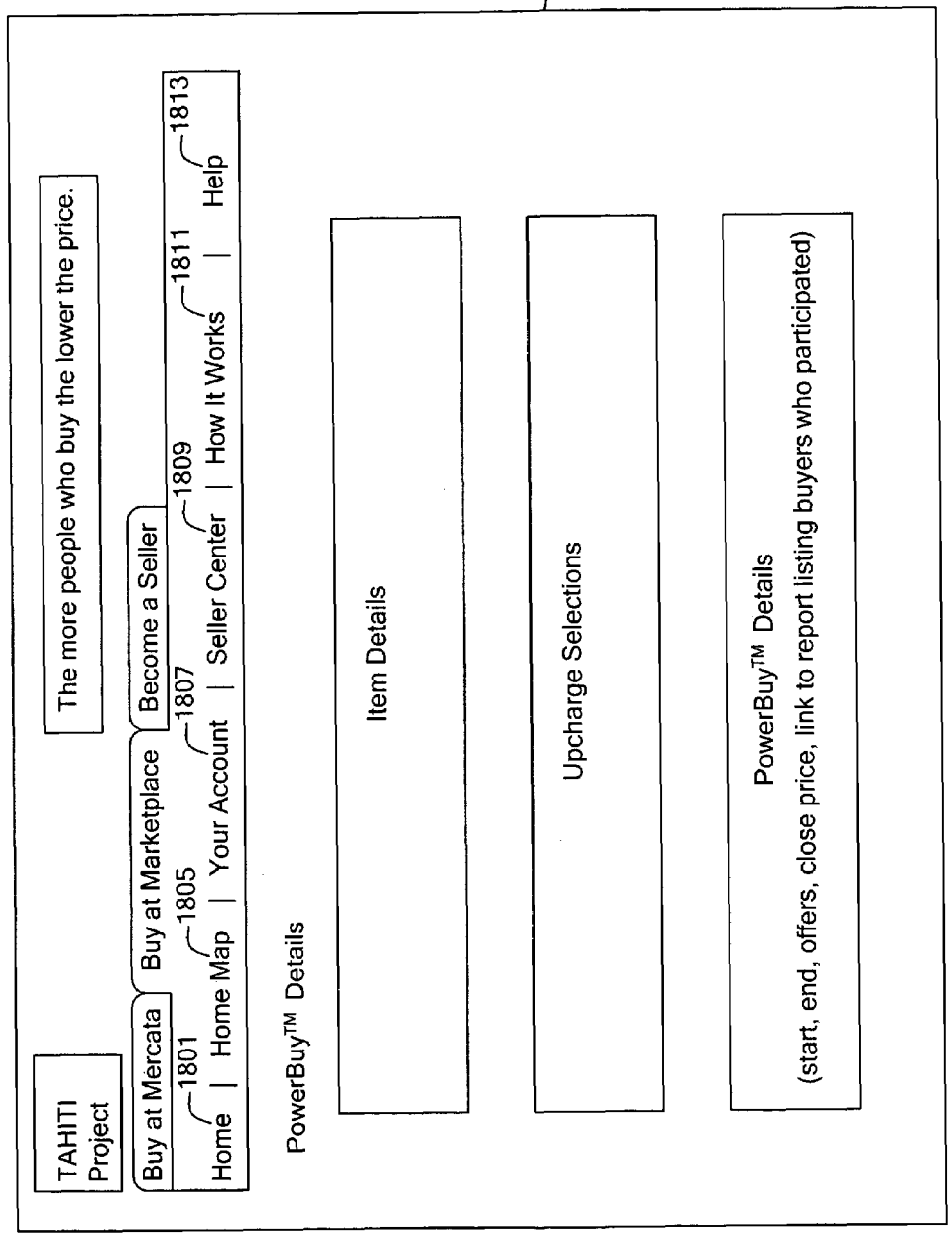
FIG. 38 shows an exemplary details display 3801 that provides detailed information about various products/services, upcharge selections, and the details of particular on-line group-buying sales, according to an embodiment of the invention.

The seller may also choose to review details for on-line group-buying sales on a basis other than item-by-item. Thus, the seller may choose to review the on-line group-buying sale details chart entry 2527. FIG. 38 shows an exemplary details display 3801 that includes details about various items, upcharge selections, and the details of particular on-line group-buying sales. The on-line group-buying sale details may include showing the starting time, ending time, offers received, and a closing price, as well as a report listing buyers who participated in an on-line group-buying sale.

As previously discussed, the owner may assess various fees from sellers. The fee chart entry 2527 may provide the seller with a detailed breakdown of the fees associated with a particular on-line group-buying sale or the fees assessed in general. FIG. 39 provides an exemplary fee detail display 3901 for an on-line group-buying sale associated with a grooming product. The display 3901 shows fees for inserting the on-line group-buying sale into the owner's active on-line group-buying sale list, a fee for placing the seller's announcement in a gallery position, a fee for placing the seller's announcement in a category entry, a fee for providing a bold display, and a fee for a final value. As an ordinary artisan will recognize, the owner may assess more or fewer fees depending on the owner's revenue expectations. The owner may even choose to waive fees. In addition, the owner may add new fees corresponding with newly added services. The fee display 3901 may also include a variety of help and fee explanatory information for the seller's review.

Sellers may also wish to review status information for their accounts, such as that provided by the account balance entry 2529. FIG. 40 shows a balance display 4001 for a particular seller that includes the seller's past charges and the seller's pending charges. The display 4001 offers the seller a variety of hypertext links from which the seller may obtain either more detailed information or more specific information related to charges assessed against the seller.

Sellers may further wish to review the owner's fee details entry 2529. FIG. 41 shows a fee display 4101 for a given owner's site. The display 4101 includes fees for inserting the on-line group-buying sale into the list of active on-line group-buying sales, the owner's fee for special placement of the seller's announcement in both the gallery and in a specific category, fees for bold titles, final value fees, additional insertion fees, and other fee information. As previously discussed, the owner may choose to assess more or fewer fees than those shown in the display 4101. The owner may choose to assess charges from sellers periodically by using a "micropayment" system in which the seller's charges are billed to the seller (e.g., the seller's credit card).

As discussed above, the owner may provide the sellers with a web-based interface. Of course, other interfaces are possible. In addition, the owner may also accept data from sellers in a variety of formats. For example, sellers may send the owner product/service data in a bulk format that can be automatically formatted by the self-service on-line group-buying sale component 1501 into one or more product/service entries and/or on-line group-buying sales. The seller may also provide the owner with various product/service tracking information associated with the seller's products/services. The tracking information could be used to help customers receive information on the shipment of purchased products/services, especially in those instances where the owner provides shipping services.

Embodiments of the invention may further include a help system, including a wizard that directs a seller through the steps of completing any or all of the on-line group-buying sale screens or configurable parameters.

The owner's main site and its related functions may be written for operation with any computer operating system and for operation in any computing environment. In addition, the on-line group-buying sale system, and/or the self-service on-line group-buying sale component, may be designed using CORBA, ACTIVEX® controls, and/or Java applets. According to one embodiment of the invention, Java applets may provide a plug-in on-line group-buying sale production system for use with another application on both a single computer and in a networked embodiment. An ordinary artisan will recognize that alternative and replacement languages and systems to those named above may also be used.

The on-line group-buying sale screens may be displayed using any application user interface technique but will preferably utilize the "what-you-see-is-what-you-get" ("WYSIWYG") display paradigm. A skilled artisan may easily recognize numerous alternate approaches to providing a user interface to receive the information needed to support an on-line group-buying sale.

Under embodiments of the invention, a remote customer computing system having browsing software may participate in the on-line group-buying sale system, including the self-service on-line group-buying sale component, via Hypertext Markup Language ("HTML") documents, Dynamic Hypertext Mark-Up Language ("DHTML") documents, Extensible Mark-Up Language ("XML") documents, and/or other similar formats over an electronic network, such as the World Wide Web. A remote computing system associated with the self-service on-line group-buying sale component may further utilize protocols such as SNMP, TCP, and UDP/IP in order to send instructions and otherwise communicate with various other on-line group-buying sale components. The on-line group-buying sale system may operate with protocols and languages in addition to those specifically disclosed herein. Similarly, the on-line group-buying sale system may be developed using an object-oriented programming methodology or using any other programming methodology that results in a computing system having equivalent functionality.

The invention has been discussed in terms of computer programs but is equally applicable for systems utilizing hardware that performs similar functions, such as application specific integrated circuits ("ASICs"). Likewise, the owner's site may comprise a single computer installation or several separate installations. Depending upon the volume of customer traffic, the owner may even decide that optimal performance for the owner's site may require one computing system for the owner's product/service offerings, another computer system for the partner product/service offerings, and another computer system for the self-service on-line group-buying sales. An ordinary artisan will recognize other possible ways of establishing computing systems adequate for serving the owner's requirements for appropriate customer, seller, and partner performance.

An ordinary artisan should require no additional explanation in developing the methods and systems described herein but may nevertheless find some possibly helpful guidance in the preparation of these methods and systems by examining standard reference works in the relevant art.

Embodiments of the invention may also include additional systems and methods described in the following pending, commonly owned applications:

"System and Method for Enhancing Buyer and Seller Interaction During a Group-Buying Sale," U.S. application Ser. No. 09/596,921, filed on Jun. 19, 2000, in the names of Tom Van Horn, Dale A. Woodford, Richard V. Halbert, and Kevin Dean Wampler, the disclosure of which is incorporated herein by this reference, and "System and Method for Attaining Product Inventory Groupings for Sales in a Group-Buying Environment," U.S. Application No. 60/206,566, filed on May 23, 2000, in the names of Tom Van Horn, Richard V. Halbert, and Linda S. Perkins, the disclosure of which is incorporated herein by this reference.

All U.S. patents and applications are incorporated herein by reference as if set forth in their entirety.

The invention has been discussed in terms of goods/services offered for sale by an on-line group-buying sale business method. Of course, other embodiments of the invention are applicable to the sales of goods/services using other business methods, including but not limited to the sale of goods by auction.

These and other changes can be made to the invention in light of the above detailed description. In general, in the following claims, the terms used should not be construed to limit the invention to the specific embodiments disclosed in the specification and the claims, but should be construed to include all electronic commerce systems that operate under the claims set forth hereinbelow. Accordingly, the invention is not limited by the disclosure, but instead its scope is to be determined entirely by the following claims.

What is claimed is:

1. A computer-implemented method for providing information from a seller about an on-line group buying sale to a website for referring potential buyers to the on-line group buying sale, the method comprising:

receiving item data from each of a plurality of sellers that defines a featured item for an on-line group-buying sale, wherein each seller transmits the item data over an electronic network to a computerized facility configured to conduct a plurality of on-line group-buying sales for the featured items defined by the received item data over the electronic network;

receiving sales data from each of the plurality of sellers that provides each seller's directions for the on-line group-buying sale of the featured item, wherein each seller transmits the sales data over the electronic network to the computerized facility;

storing the item data and the sales data received from each seller in a data repository, wherein the computerized facility uses received sales data to conduct the plurality of on-line group-buying sales of featured items defined by received item data;

receiving instructions for selecting an on-line group buying sale from the plurality of on-line group buying sales for a website for referring potential buyers to an on-line group buying sale;

receiving from the referring website a request for information comprising a tag associated with the referring website;

receiving exclusivity preferences from the referring website;

responsive to the request for information, the tag, the instructions for selecting an on-line group buying sale, and the exclusivity preferences, using a filter to select for the referring website an on-line group buying sale from the plurality of on-line group buying sales;

generating a display associated with the selected on-line group buying sale;

generating a link to the display; and providing the link to the referring website, whereby a potential buyer accessing the referring website can access the link, and thereby access the display associated with the selected on-line group buying sale and participate in the selected on-line group buying sale.

2. The method of claim 1 wherein the request for information from the referring website contains a sales criterion, and selecting for the referring website an on-line group buying sale is performed responsive to the sales criterion.

3. The method of claim 2 wherein the sales criterion comprises at least one of: a timing criterion, a price criterion, a keyword criterion, and an item criterion.

4. The method of claim 1 wherein the selected on-line group buying sale is offered exclusively to potential buyers who access the selected on-line group buying sale through the link provided to the referring website.

5. The method of claim 1 further comprising receiving instructions for displaying an on-line group buying sale from the referring website, and wherein generating a display is performed responsive to the instructions for displaying.

6. The method of claim 5 wherein the instructions for displaying specify displaying the selected on-line group buying sale in one of: a carousel scheme, a random scheme, and a shuffle scheme.

7. The method of claim 1 wherein the display comprises a link back to the referring website.

8. A computer program product for providing an on-line group buying sale to a referring website, the computer program product comprising a computer-readable medium encoded with computer program code for, causing a computer component to perform the steps of:

receiving item data from each of a plurality of sellers that defines a featured item for an on-line group-buying sale, wherein each seller transmits the item data over an electronic network to a computerized facility configured to conduct a plurality of on-line group-buying sales for the featured items defined by the received item data over the electronic network;

receiving sales data from each of the plurality of sellers that provides the seller's directions for the on-line group-buying sale of the featured item, wherein each seller transmits the sales data over the electronic network to the computerized facility;

storing the item data and the sales data received from each seller in a data repository, wherein the computerized facility uses received sales data to conduct the plurality of on-line group-buying sales of featured items defined by received item data;

receiving instructions for selecting an on-line group buying sale from the plurality of on-line group buying sales for a website for referring potential buyers to an on-line group buying sale;

receiving from the referring website a request for information comprising a tag associated with the referring website;

receiving exclusivity preferences from the referring website;

responsive to the request for information, the tag, the instructions for selecting an on-line group buying sale, and the exclusivity preferences, using a filter to select for the referring website an on-line group buying sale from the plurality of on-line group buying sales;

generating a display associated with the selected on-line group buying sale;

generating a link to the display; and providing the link to the referring website, whereby a potential buyer accessing the referring website can access the link, and thereby access the display associated with the selected on-line group buying sale and participate in the selected on-line group buying sale.

9. The computer program product of claim 8 wherein the request for information from the referring website contains a sales criterion, and wherein the code for selecting for the referring website comprises code for selecting responsive to the sales criterion.

10. The computer program product of claim 9 wherein the sales criterion comprises a timing criterion.

11. The computer program product of claim 8 wherein the selected on-line group buying sale is offered exclusively to potential buyers who access the selected on-line group buying sale through the link provided to the referring website.

12. The computer product of claim 8 further comprising code for receiving instructions for displaying an on-line group buying sale from the referring website, and wherein the code for generating comprises code for generating a display responsive to the instructions for displaying.

13. The computer product of claim 12 wherein the instructions for displaying specify displaying the selected on-line group buying sale in a carousel scheme.

14. The computer product of claim 8 wherein the display comprises a link back to the referring website.

15. The computer program product of claim 9 wherein the sales criterion comprises a price criterion.

16. The computer program product of claim 9 wherein the sales criterion comprises an item criterion.

17. The computer product of claim 12 wherein the instructions for displaying specify displaying the selected on-line group buying sale in a random scheme.

18. The computer product of claim 12 wherein the instructions for displaying specify displaying the selected on-line group buying sale in a shuffle scheme.

* * * * *